(12) United States Patent
Bauer et al.

(10) Patent No.: US 7,870,184 B2
(45) Date of Patent: Jan. 11, 2011

(54) COMMUNICATIONS SERVICES FOR BUSINESS PROCESS DESIGN

(75) Inventors: David L. Bauer, Cherry Hills Village, CO (US); Cynthia Hiatt, San Jose, CA (US); Erik J. Johnson, Campbell, CA (US); Praveen Kumar Mamnani, Westminster, CO (US); Mai-Huong Nguyen, Rockville, MD (US); Janis Rae Putman, Hillsborough, NJ (US); Ross Yakulis, Los Gatos, CA (US)

(73) Assignee: Avaya Inc., Basking Ridge, NJ (US)

( * ) Notice: Subject to any disclaimer, the term of this patent is extended or adjusted under 35 U.S.C. 154(b) by 1233 days.

(21) Appl. No.: 11/099,242

(22) Filed: Apr. 5, 2005

(65) Prior Publication Data

US 2005/0256732 A1 Nov. 17, 2005

Related U.S. Application Data

(60) Provisional application No. 60/559,622, filed on Apr. 5, 2004.

(51) Int. Cl.
*G06F 15/16* (2006.01)
(52) U.S. Cl. ....................................... 709/201
(58) Field of Classification Search .................. 709/201
See application file for complete search history.

(56) References Cited

U.S. PATENT DOCUMENTS

2002/0091533 A1* 7/2002 Ims et al. ........................ 705/1
2004/0054690 A1* 3/2004 Hillerbrand et al. ...... 707/104.1
2004/0201611 A1* 10/2004 Bagsby ........................ 345/733
2005/0096960 A1* 5/2005 Plutowski et al. .............. 705/8
2006/0163338 A1* 7/2006 Allen et al. .................. 235/375
2008/0086564 A1 4/2008 Putman et al.

OTHER PUBLICATIONS

J. Greenfield and K. Short "Software Factories. Assembling Applications with Patterns, Models, Frameworks and Tools", OOPSLA 2003, Anaheim, CA USA.*
Sebastian Thone, Ralph Depke, and Gregor Engels "Process-Oriented, Flexible Composition of Web Services with UML", 2002, University of Paderborn, 33098 Paderborn, Germany.*
J. Greenfield and K. Short "Software Factories. Assembling Applications with Patterns, Models, Frameworks and Tools", OOPSLA 2003, Anaheim, CA USA.*

(Continued)

*Primary Examiner*—William C Vaughn, Jr.
*Assistant Examiner*—Boris Gorney
(74) *Attorney, Agent, or Firm*—Joseph B. Ryan; Jason Paul DeMont; Wayne S. Breyer

(57) ABSTRACT

A business process software program is executed in a processing element comprising a memory and a processor coupled to the memory. The processor is operative to identify within the software program one or more communications services inserted as generic design elements therein, and for each of the identified communications services, to initiate the execution of one or more corresponding communications tasks. At least one of the communications services may comprise a composite communications service which itself comprises a plurality of communications services.

8 Claims, 58 Drawing Sheets

OTHER PUBLICATIONS

Sebastian Thone, Ralph Depke, and Gregor Engels "Process-Oriented, Flexible Composition of Web Services with UML", 2002, University of Paderborn, 33098 Paderborn, Germany.*

F. Leymann, D. Roller, M.-T. Schmidt "Web services and business process management", IBM Systems Journal, vol. 41, No. 2, 2002.*

F. Leymann, D. Roller, M.-T. Schmidt "Web services and business process management", IBM Systems Journal, vol. 41, No. 2, 2002.*

J. Greenfield and K. Short "Software Factories. Assembling Applications with Patterns, Models, Frameworks and Tools", OOPSLA 2003, Anaheim, CA USA.*

Sebastian Thone, Ralph Depke, and Gregor Engels "Process-Oriented, Flexible Composition of Web Services with UML", 2002, University of Paderborn, 33098 Paderborn, Germany.*

OASIS Open, Inc., "Web Services Business Process Execution Language" (BPEL4WS), Working Draft 01, wsbpel-specification-draft-01, 15 pages, Sep. 2004.

IBM, "IBM DeveloperWorks: Web Services: Web Services Articles," Business Processes: Understanding BPEL4WS, Part 1, 4 pages, Aug. 2002.

The Parlay Group, "Parlay 4.0, Parlay X Web Services Specification," Version 1, pp. 1-89, May 2003.

* cited by examiner

FIG. 3

LEVERAGE NORMAL EXECUTION OF WEB SERVICES

INTERACTION MONITORING AND RECORDING

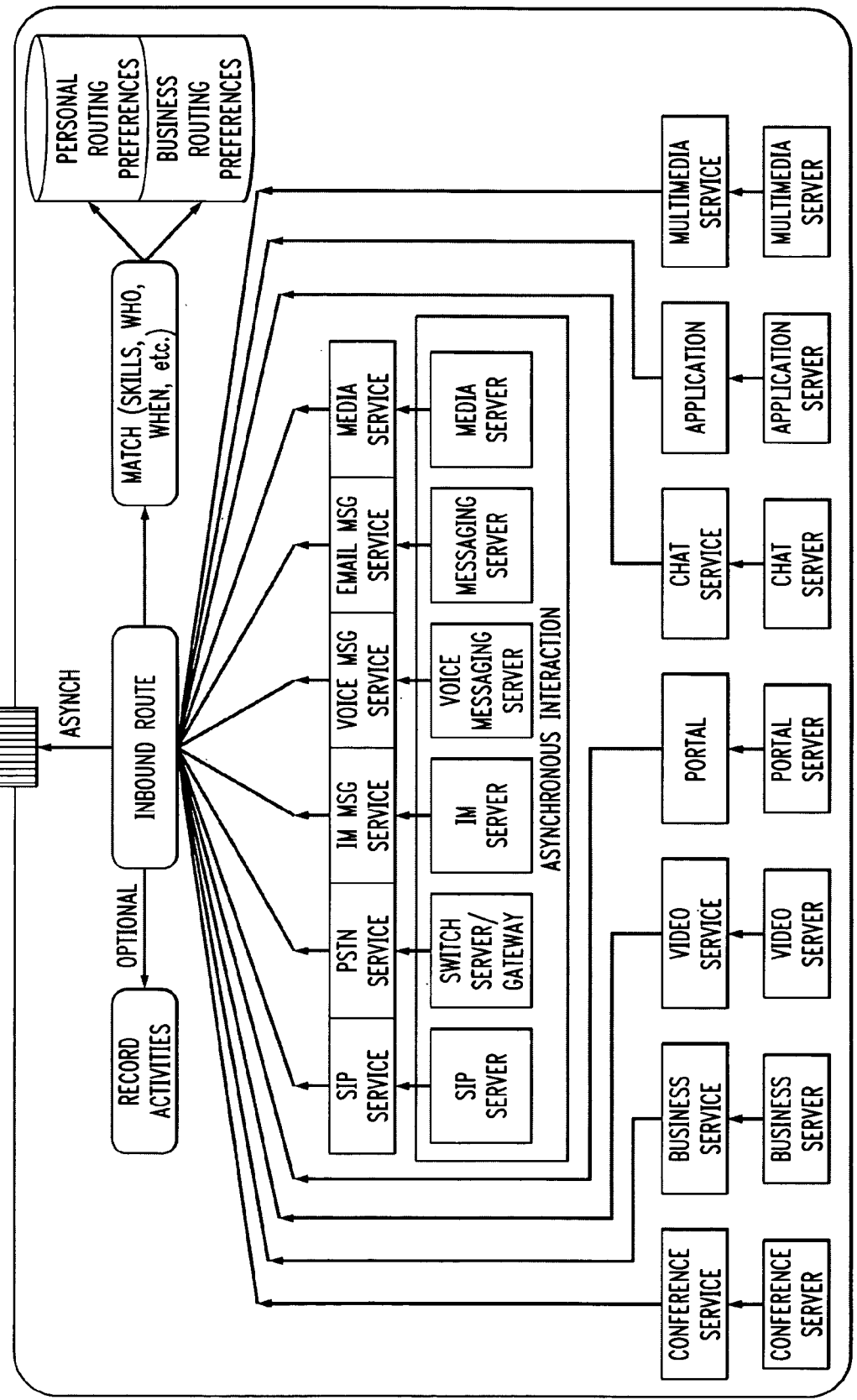
FIG. 8K MULTICHANNEL INBOUND

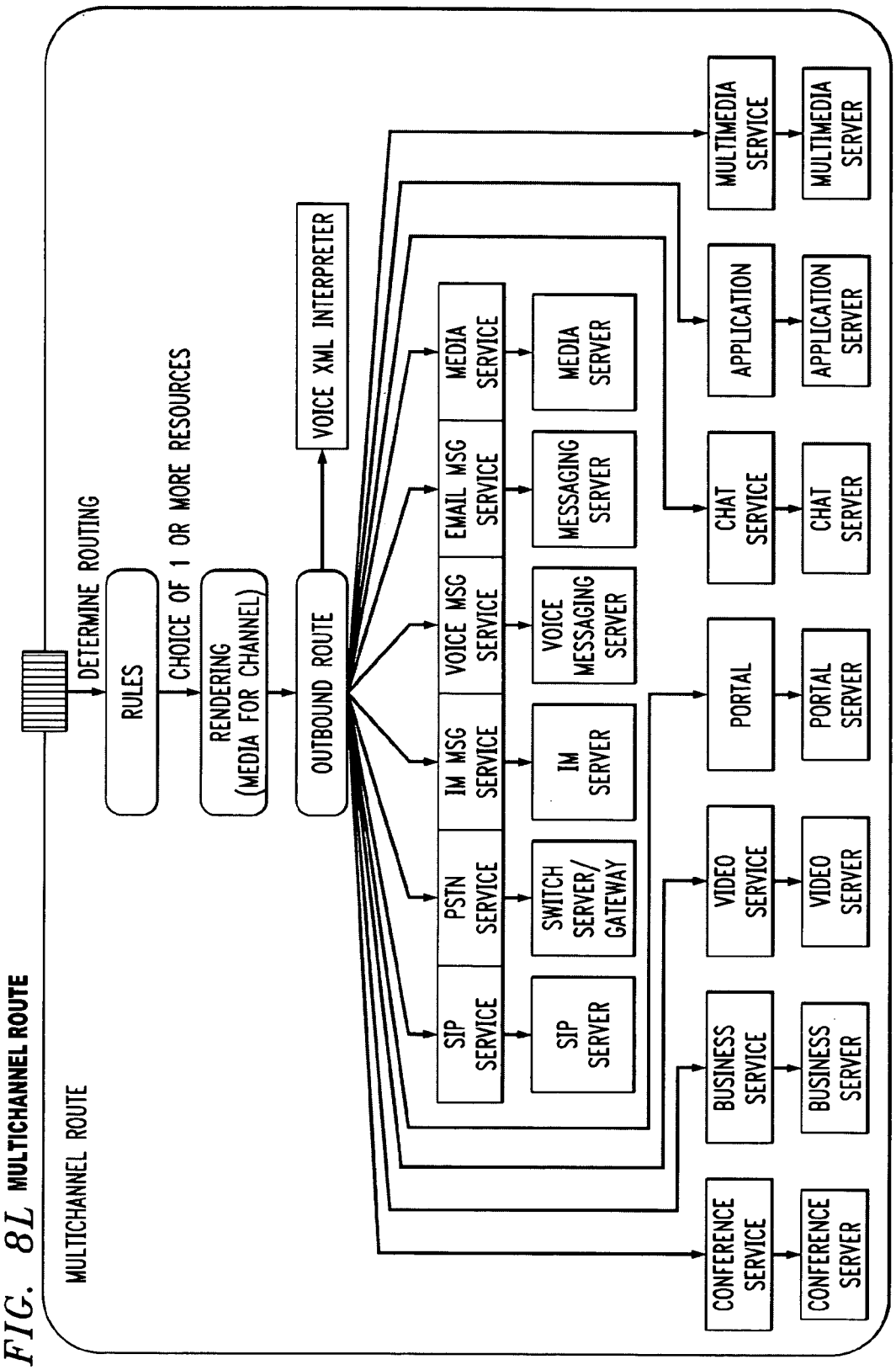
FIG. 8L MULTICHANNEL ROUTE

TELEPHONY: MAKE CALL, TRANSFER, HOLD, DROP, CONFERENCE

COMMUNICATIONS SERVICES FOR BUSINESS PROCESS DESIGN

RELATED APPLICATION(S)

The present application claims the priority of U.S. Provisional Patent Application Ser. No. 60/559,622 filed Apr. 5, 2004 in the name of inventors D. L. Bauer et al. and entitled "Communications Services for Generic Business Process Design Embodying Generic Communications Flow and Execution Capabilities," which is incorporated by reference herein.

The present application is also related to U.S. patent application Ser. No. 10/484,400, filed Jan. 21, 2004 in the name of inventors J. R. Putman et al. and entitled "Communication Application Server for Converged Communications Services," which is commonly assigned herewith and incorporated by reference herein.

FIELD OF THE INVENTION

The present invention relates generally to the field of communication systems, and more particularly to techniques for incorporation of communications flow and execution capabilities into business processes.

BACKGROUND OF THE INVENTION

As is well known, business processes are often implemented using software running on computer systems. It is frequently necessary for such processes to interact with communication systems, for example, in order to handle customer communications, locate and contact employees, coordinate conferences or meetings, and so on.

Conventional business process design approaches may use a standard business process execution language (BPEL). For example, Web Services BPEL (BPEL4WS) is described in Working Draft 01, wsbpel-specification-draft-01, 08 Sep. 2004, OASIS Open, Inc. BPEL4WS provides a language for the formal specification of business processes which permits such processes to interact with one another through Web Services interfaces. Web Services is an industry standard for application integration, and is described in greater detail in W3C, 2003c, "Web Services Architecture," http://www.w3.org/TR/ws-arch, which is incorporated by reference herein. It leverages existing open standards, such as Hypertext Transfer Protocol (HTTP), Transmission Control Protocol/Internet Protocol (TCP/IP), eXtensible Mark-up Language (XML), Universal Description, Discovery and Integration (UDDI), Web Services Description Language (WSDL) and Simple Object Access Protocol (SOAP), and it is language and platform independent.

Although conventional approaches based on BPEL4WS or other similar techniques have facilitated interaction between different business processes, they fail to provide an efficient and flexible means for incorporation of generic communications flow and execution capabilities into the business processes. As a result, such approaches often result in business software applications which are unduly limited in terms of the particular communications channels, devices or protocols with which they can operate. There is generally little or no ability in conventional practice to integrate generic communications flow and execution capabilities into a business process flow design in a manner that is independent of the particular channels, devices, protocols or other characteristics of a given communication system.

Accordingly, it is apparent that a need exists for improved techniques for incorporating communications flow and execution capabilities into business processes.

SUMMARY OF THE INVENTION

The present invention provides improved techniques for incorporating communications flow and execution capabilities into business processes.

In accordance with one aspect of the invention, a business process software program is executed in a system processing element comprising a memory and a processor coupled to the memory. The processor is operative to identify within the software program one or more communications services inserted as generic design elements therein, and for each of the identified communications services, to initiate the execution of one or more corresponding communications tasks. At least one of the communications services may comprise a composite communications service which itself comprises a plurality of communications services inserted as generic design elements therein. The composite communications service may be expressed as a communications flow comprising a designated sequence of a plurality of communications tasks. Certain of the communications services may comprise primitive communications services, which do not themselves incorporate any other communications service.

In an illustrative embodiment, the communications service comprises an interface which facilitates access to the communications service by the business process software program. More specifically, the interface comprises a Web Services interface.

The communications service may comprise a synchronous communications service. In such an arrangement, the business process software program generates a request for the service, the request is forwarded to an execution environment of the service via a Web Services interface of the service, and a synchronous response to the request is returned from the execution environment of the service to the software program via the Web Services interface.

Alternatively, the communications service may comprise an asynchronous communications service. In such an arrangement, the business process software program generates a request for the service, the request is forwarded to an execution environment of the service via a Web Services interface of the service, and an asynchronous response to the request is returned from the execution environment of the service to the software program via another Web Services interface. An asynchronous response may comprise, for example, information that is returned to the software program and characterizes an action or event related to the communications service. Such information may include, again by way of example, an indication that a particular party has been bridged into a conference.

Advantageously, the communications services may be inserted as generic design elements in the business process software program in such a manner that the particular channels, devices, protocols or other characteristics of a given communication system used to execute the corresponding communications tasks need not be explicitly specified in the business process software program.

In the illustrative embodiment, the generic design elements comprise templates having respective communication functions associated therewith. These may include, by way of example, Alert, Conference on Demand, Contact, Escalate, Interaction Monitoring and Recording, Interrupt, Locate, Message, Multichannel Access, Multichannel Inbound, Multichannel Route, Notify, Progress Monitoring, Resident Expert, and Telephony.

BRIEF DESCRIPTION OF THE DRAWINGS

FIG. 3 shows exemplary creation and execution environments for communications services in an embodiment of the invention.

DETAILED DESCRIPTION OF THE INVENTION

The present invention will be illustrated herein as implemented in exemplary computer and communication systems. It should be understood, however, that the invention does not require the use of the particular business processes or system configurations shown, and is more generally suitable for use in conjunction with any business process or associated communication system for which improved processing efficiency is desired.

The term "business process" as used herein is intended to be construed generally, so as to include, without limitation, a business workflow, a business application, a portal application, or other sequence or arrangement of processing steps associated with a business activity or function. Thus, a "business process software program" may be a software program associated with a business workflow, a business application, a portal application, etc.

The term "business" is also intended to be construed generally, and may include, in addition to for-profit entities, other types of entities or organizations in which individuals interact to achieve particular goals.

Figure 1A:
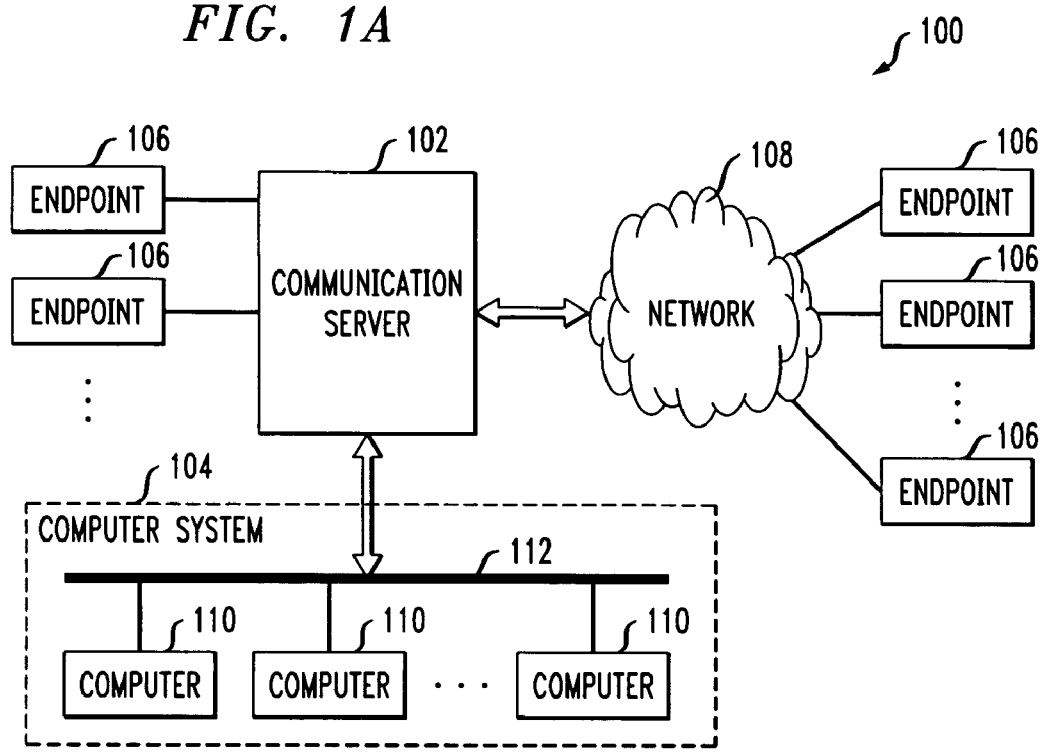
FIG. 1A is a simplified block diagram of an illustrative embodiment of a system in which the present invention may be implemented.

FIG. 1A shows a system 100 comprising a communication server 102 coupled to a computer system 104. The server 102 is coupled directly to a number of endpoints 106, and via network 108 to additional endpoints 106. The computer system 104 comprises a plurality of computers 110 coupled to a network 112.

The system 100 may be associated with a business or other enterprise. For example, the computers 110 of computer system 104 may comprise servers, workstations or other computers of the enterprise. The server 102 may be resident at the enterprise. The endpoints 106 directly coupled to server 102 may represent local endpoints, physically present at the enterprise location, while the other endpoints may represent remote endpoints.

The server 102 may include elements for supporting real-time communications, such as conventional telephony and IP telephony, non-real-time communications, such as email and messaging, and near-real-time communications, such as instant messaging, chat and short message services.

The server 102 may comprise a communication application server (CAS) configured to provide converged communications services of the type described in the above-cited U.S. patent application Ser. No. 10/484,400.

The server 102 may also or alternatively comprise a communication system switch, such as an Avaya Call Processing (ACP) Enterprise Communication Service (ECS) switch available from Avaya Inc. of Basking Ridge, N.J., USA.

Although not limited to use with any particular communication protocol, a given illustrative embodiment of the invention may make use of the Session Initiation Protocol (SIP), described in Internet Engineering Task Force (IETF) Request for Comments (RFC) 3261, "SIP: Session Initiation Protocol," June 2002, http://www.ietf.org/rfc/rfc3261.txt, which is incorporated by reference herein. For example, the above-noted ACP ECS switch may be used as a SIP-enabled call feature platform, supporting SIP proxy, registrar, media gateway, and signaling gateway functions, as well as Avaya 4624 and Avaya 4630 Screen Phones functioning as SIP phones, with multi-modal, instant messaging (IM), and presence capabilities, or a SIP application server supporting VoiceXML and rules-based notification, integrated with a business application. These are examples of Avaya products, but it should be understood that the invention does not require the use of any particular product, nor does it require the use of products from any particular vendor. Numerous other arrangements of communication hardware and software, from a wide variety of vendors, can be utilized in implementing the invention.

As indicated above, the invention can use a wide variety of alternative communication protocols, and is not limited in this regard.

The computer system 104 may comprise, by way of example, one or more enterprise servers which run enterprise software applications providing functions such as customer relationship management (CRM), supply chain management, employee resource management, sales force automation, databases, back office applications, etc.

The endpoints 106 may comprise one or more end user communication devices such as wired telephones, mobile telephones, IP soft phones, Bluetooth devices, pagers, personal digital assistants (PDAs), desktop or portable personal computers, or other types of communication system endpoints, or more generally any other type of processor-based devices suitably configured for communication within system 100, in any combination.

The term "endpoint" as used herein is thus intended to encompass any device capable of communication, including appliances, sensors, electrical or electronic devices, end user communication devices, etc. The term "appliance" as used herein is intended to refer to a type of endpoint.

The networks 108, 110 may comprise switch, circuit or packet network components in any combination. For example, one or both of the networks 108, 110 may comprise a local area network, a wide area network, a global network, an IP network, a public switched telephone network (PSTN), a wireless network, a cable network, a cellular network, a satellite network, or portions or combinations of these or other types of networks.

Conventional aspects of the operation of elements 102, 104, 106, 108, 110 and 112 are well known in the art and therefore not described in further detail herein.

It is to be appreciated that the invention does not require the system configuration shown in FIG. 1A, or any particular system configuration. A wide variety of alternative configurations suitable for providing the functionality described herein will be readily apparent to those skilled in the art. Thus, the system 100 may include additional elements not explicitly shown in the figure, such as routers, gateways or other network elements.

In one possible implementation, the system 100 runs one or more software programs of a business process which incorporates generic communications flow and execution capabilities as described herein.

In another implementation, computer system 104, or a portion thereof, comprises a business flow design system which permits the design of business processes incorporating generic communications flow and execution capabilities as described herein.

The present invention may thus be implemented, by way of example and without limitation, in a system which is used to design a business process, or a system which executes the resulting business process. The simplified system 100 is intended to be illustrative of either such exemplary implementation.

A given illustrative embodiment may be implemented at least in part on a general-purpose computer or other data processing platform which comprises a processor coupled to a memory and one or more network interfaces. The term "processor" as used in this context is intended to be construed generally so as to encompass any arrangement of one or more microprocessors or other digital data processing devices configured in a conventional manner. The memory may include Random Access Memory (RAM), Read-Only Memory (ROM), disk-based storage or other types of storage devices, including one or more persistent store elements, also configured in a known manner, and in any combination. The business process design and communications processing functions described herein are implemented at least in part in the form of one or more software programs which are stored in the memory and executed by the processor.

Figure 1B:
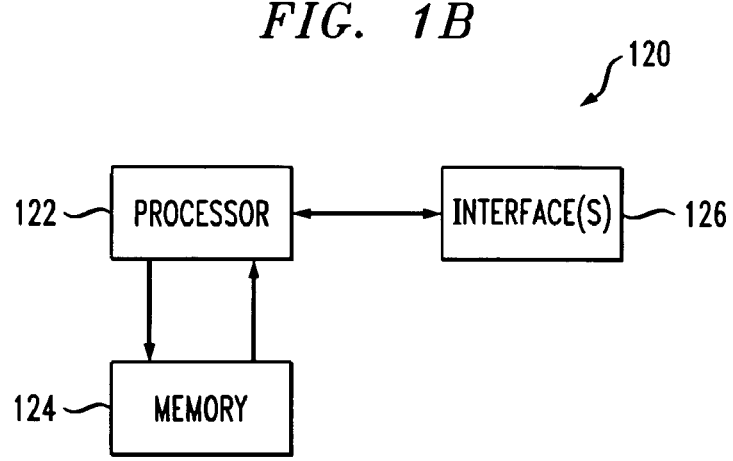
FIG. 1B is a simplified block diagram of a particular processing element of the FIG. 1A system.

FIG. 1B shows one possible implementation of a given processing element of the FIG. 1A system. The processing element 120 of FIG. 1B may represent, by way of example, at least a portion of server 102, computer system 104, one of the endpoints 106, or other processing element of the system 100.

The processing element 120 as shown in the figure includes a processor 122 coupled to a memory 124 and one or more network interfaces 126. The techniques of the present invention may be implemented at least in part in the form of software, such as business applications programs, business desktop productivity tools, or other business process software programs, that are storable in the memory 124 and executable by the processor 122 in the processing element 120. The memory 124 may represent RAM, ROM, optical or magnetic disk-based storage, or other storage elements, as well as portions or combinations thereof.

Those skilled in the art will recognize that the individual elements of FIG. 1B as shown for illustrative purposes may be combined into or distributed across one or more processing devices, e.g., a microprocessor, an application-specific integrated circuit (ASIC), a computer or other device(s).

It should be noted that the processing element as shown in FIG. 1B may also represent a combination of multiple elements of the system 100, or a combination of various portions of different elements of the system. The term "processing element" as used herein is intended to be broadly construed, and need not have a one-to-one relation with any particular element of system 100.

In accordance with one aspect of the invention, a processing element of the system 100 of FIG. 1A, which includes a processor and a memory as shown in FIG. 1B, executes at least a portion of at least one software program of a business process. In the course of executing the software program, the processor identifies within the software program one or more communications services inserted as generic design elements therein, and for each of the identified communications services, initiates the execution of one or more corresponding communications tasks. The term "execution" in this context is intended to include, for example, direct execution, that is, execution by the processing element itself, or indirect execution via directing, controlling or otherwise initiating execution by another system element.

In an illustrative embodiment, generic communications services serve as building blocks which allow business processes to incorporate sequences of communications tasks in a particularly efficient and flexible manner. This approach advantageously permits the business process developer to dynamically link communications tasks with their business processes, without limiting the processes in terms of particular communications channels, devices or protocols. Such an illustrative embodiment thus provides an arrangement in which generic communications flow and execution capabilities can be integrated into a business process flow design in a manner that is independent of the particular channels, devices, protocols or other characteristics of a given communication system.

Such communications services generally comprise either a primitive communications service or a flow which is itself a communications service. In other words, a communications service is a primitive capability or a composite capability, realized by a particular flow of actions. This will be illustrated in conjunction with FIGS. 2A, 2B and 2C below.

Figure 2A:
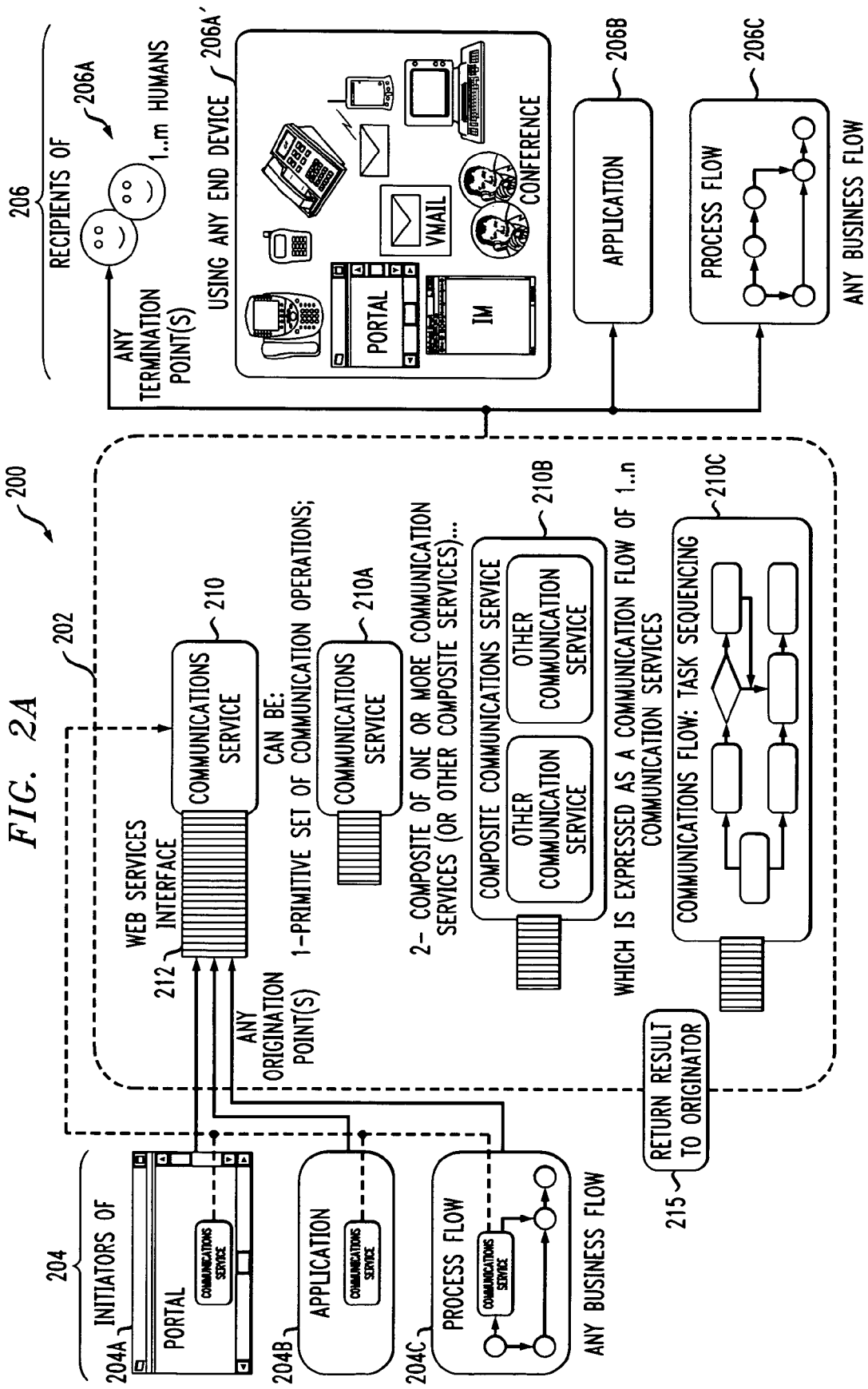
FIGS. 2A through 2C illustrate communications services aspects of the invention.

FIG. 2A depicts the general concept of communications services in an illustrative embodiment of the invention. In a given business process 200, one or more initiators 204 of a communications service 202 invoke the service from, for example, a portal 204A, an application 204B, or a process flow 204C. The communications service or services invoked by any of these origination points may be directed to any of a number of termination points 206, which may comprise 1 to m users 206A associated with respective endpoint devices 206A', an application 206B, or a process flow 206C.

The communications service 202 more specifically comprises a communications service 210 having a Web Services interface 212. The initiators 204 invoke the service via the Web Services interface 212. A result may be returned to the particular initiator(s) as indicated at 215. A given communications service may comprise a primitive set of one or more communications services 210A, or a composite communications service 210B. The composite communications service 210B comprises a plurality of other communications services, one or more of which may also represent composite communications services. The composite communications service 210B may be in the form of a communications flow, such as that shown at 210C, which comprises a plurality of communications tasks arranged in a particular sequence.

Generally, the particular interface symbol denoted by element 212 in FIG. 2A is utilized in other figures to denote communications services interfaces or other similar interfaces.

Figure 2B:
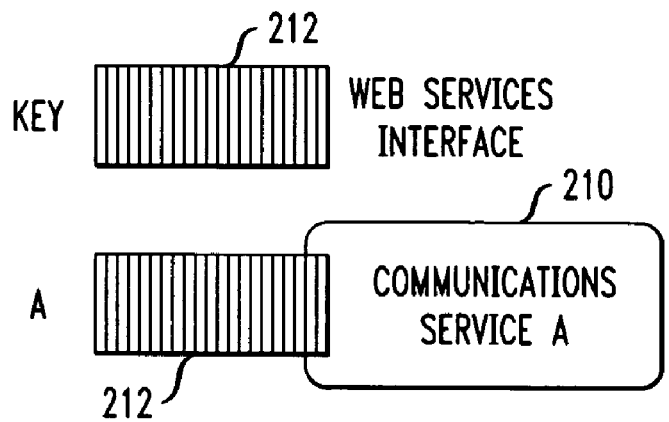

FIG. 2B illustrates that any communications service, such as communications service A or 210, has an associated Web Services interface 212 through which the service is accessed or otherwise invoked by the business process in which it is inserted.

Figure 2C:
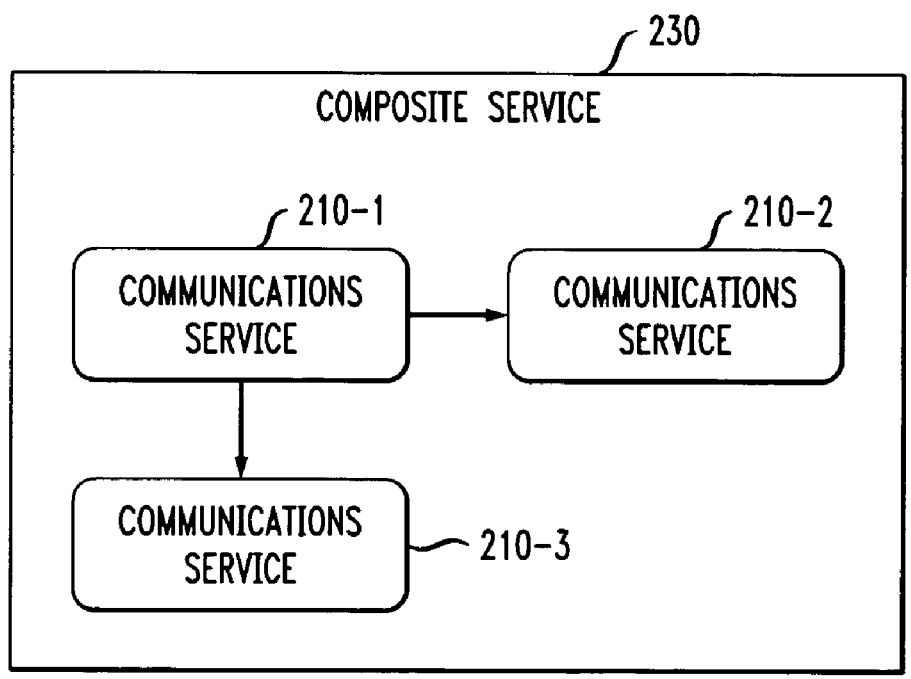

FIG. 2C shows an example of a composite communications service 230 which includes a first communications service 210-1 which invokes two other communications services 210-2 and 210-3. One or both of the invoked communications services 210-2 and 210-3 may comprise composite services. A composite communications service in accordance with the present invention can utilize any arrangement of nested or otherwise interconnected communications services.

A composite communications service may comprise a combination of communications services and other information, such as business data services, that collectively form a business or communication step that can be reused in multiple business processes.

A given composite communications service provides a Web Services interface and WSDL definition. There is effectively no limit to the manner in which services may be combined to create new types of communications service abstractions. The composite communications service defines the sequence relationships among the constituent elements of the composite communications service. This can be accomplished by using a communications flow development environment tool, a business process workflow tool, or defined as part of the composite communications service execution processing.

Communications services advantageously allow communications tasks to be integrated, in a particularly efficient and flexible manner, into business process software programs. Such business process software programs may comprise, for example, business solutions, business applications, workflow tasks, desktop productivity tools, portals, software on end devices, administration software, maintenance software, business activity monitoring software, business process management software, etc. Communications services allow converged communication to be achieved in a manner that is transparent to such business software by hiding the processing complexities required to realize particular communications tasks.

Communications services in an illustrative embodiment leverage Web Services technologies. Communication characteristics of asynchrony, real-time, near-real-time, and numerous communications specific capabilities (e.g., echo cancellation, call redirect, etc.) are all available through the "lens" of the Web Services interface. It is the backend protocol specific servers that perform the essence of communication, interacting with the communications service processing elements to achieve the higher level of abstraction, used by the business process software. Choices of communication server protocols, changes in semantic behavior, rendering of formats, are all managed by the communications services element coupled with associated backend processing. Furthermore, communications services also expose an abstraction to these capabilities. For example, a communications service may be configured to provide presence information based on a query request, even though the actual presence server may comprise one or more individual servers which utilize SIP or other protocol to provide the desired information. Nevertheless, the communications service for presence presents a unified interface to the client, mitigating all the differences required to realize the request.

The term "client" in this particular context and elsewhere herein is intended to encompass an entity which invokes a communications service in conjunction with execution of business process software. A client may be a software entity, a human entity or other entity. It should be noted that the term client may have other meanings elsewhere herein, for example, the term may be used to denote the customers of particular businesses.

The term "communications service" as used herein is intended to encompass one or more communications tasks configured as a software solution having a particular interface that facilitates accessibility to the communications task(s) from business process software. As indicated above, the interface in an illustrative embodiment is a Web Services interface.

A number of general features that may be exhibited by communications services in accordance with the invention will now be described. It should be understood, however, that the invention does not require any specific combination of these features.

The communications services may be implemented as reusable software service capabilities, which can be linked together across a given enterprise, are selectable for use, and perform discrete tasks. They can be combined to define new communications capabilities, referred to herein as composite communications services, as required to accommodate the particular needs of a given business process.

The communications services reduce the effort required to integrate communications flow and execution capability with the business applications and workflow tasks, enable customization of solutions utilizing communications tasks, provide automated as well as human-driven execution of the communications services, and can be combined with other communications services or business data services into a composite service for reuse.

The communications services in an illustrative embodiment may exhibit one or more of the following characteristics:

1. A high-level abstract interface for a communications task. The interface is abstract from the processing needs, and high-level in that it does not presume the knowledge of object methods, component based development constructs or any other programming language level constructs that are specific to a particular processing environment, nor does it assume communication specific details.

2. Designed to support application-to-application, human-to-application, application-to-human, and human-to-human communications tasks.

3. Coarse-grained capability for use in a business process workflow and application environment, not requiring the detailed knowledge of intricate programming environment details. For example, a given communications service can provide a coarse-grained task, where any necessary pre-condition and post-condition actions are handled by the runtime processing environment.

4. Makes use of synchronous or asynchronous communications as required.

5. Packaging of a software component at a level for business use.

6. Can be combined into a communications flow or a business workflow in any order with any other service anywhere.

7. Is self-contained, selectable, autonomous and distributable.

8. Dynamically selectable for use, and dynamically accessible.

9. From the perspective of the user of a communications service, is loosely coupled from its execution processing environment. For example, dependencies and pre/post condition processing are handled as part of the communications service processing, not exposed as part of the communications service access mechanism.

10. Can be combined with other communications services forming what is referred to herein as a "composite service."

11. Provides a platform and programming language independent interface for accessing and executing the communications service.

12. Enabled with Web Services as the communications service interface of choice.

Communications applications that are currently locked in traditional software implementations can be broken down into communications services, exposing reusable service components. This allows the performance of coarse-grained tasks, wherein the corresponding discrete tasks are hidden and implemented in a software service provider. The communications services can be used in a business process application, workflow, desktop productivity tool, or on a communications appliance for communications capabilities, or to define new capabilities.

Communications services can be linked together across an enterprise, can be made individually selectable based on a web standard form of a service registry for query and selection, and can be combined with other communications services to form a new capability collectively called a composite communications service, or combined with other enterprise data-centric services, which are collectively called a composite service.

A communications service in an illustrative embodiment may comprise, as an example, a self-contained, self-describing, modular software application that can be registered, located, and executed across the network, is programming language independent, is loosely coupled from its execution environment, provides a set of actions that forms a coherent whole from the point of view of requesters of the service and providers of the service. A communications service provides communications related tasks, ranging from communications channel and media capabilities (e.g., make a call), to communications related data activities (e.g., change the user's profile information), including areas related to telephony, voice, media, messaging, video, endpoint devices (e.g., appliances), contact center, unified messaging, and so on, as well as related data collection, reporting, and data mining.

Communications services may relate to any type of communication including, for example, telephony, voice, messaging, media, contact center, video, electronic mail, text messaging, paging, fax and document processing, application devices, and "thin" and "thick" client access to communications.

A communications service in an illustrative embodiment may exhibit one or more of the following properties:

1. A high level of service capability.
2. Discoverable by other software systems across a given network.
3. Coarse-grained interfaces that can be dynamically bound.
4. Network addressable.
5. Remotely executable from a network client.
6. Loosely coupled from the service execution processing environment.
7. Offers a Web Services interface to the service execution processing software
8. Hides the details from the client of the communications service execution processing which may require invoking additional software, access to communications servers, access to directories, access to databases, etc.
9. Can be incorporated as a task in a business process workflow.
10. Can be incorporated as a client in a business software application.
11. Can be incorporated as a portal action (e.g., click-to-conference).
12. Is independent from specific a programming language.
13. Can be translated into specific programming language constructs of client software through the use of third party Web Services tools (e.g., Web Services to Java transformation, which converts the standards based Web Services specifications into the client software specific Java constructs for use in execution by the client).
14. Can be incorporated as an adapter in third party integration broker software.
15. Can be combined with other communications services to create a composite service.
16. Can be combined with other business data services to create a composite service.
17. Can be combined with any other composite service.
18. Can be used in a third party business process workflow development environment tool as a task in the workflow.
19. Provide parameterization of inputs so that the client can provide specific parameter inputs for the execution of the communications service.
20. Provides a specification of the communications service interface through the use of WSDL or other languages.
21. Specifies one or more return values as part of the service description. There may be no return. This is dependent upon the needs of the individual communications service.
22. Provides one or more bindings for the communications service, as needed for the execution and specified in its WSDL description.
23. Uses a SOAP message transport.
24. May use HTTP, HTTP Secure sockets (HTTPS), Java Message Service (JMS) or other transport protocols as required.
25. Defines the use of any such transports as part of the WSDL, which may extend the current standard definition of WSDL to accommodate a different transport. This is currently the case for the use of an appropriate transport to accomplish asynchronous communication, and real-time communication.

As indicated in FIG. 2A, a given composite communications service may be specified as a communications flow, that is, an order of steps necessary to accomplish one or more communications tasks. A scripting language may be used to specify the sequence of activities and behavior of communications services as tasks with ability to customize tasks as appropriate, as well as to the ability to incorporate additional non-Web Services tasks or data within the flow model. Such an approach provides the ability to link together communications services as Web Services, or as additional non-Web Services capabilities. Communications services are integratable and useable in business process modeling design tools as tasks, as well as easily incorporated into BPEL-based scripted flow specifications. In addition, a communications services flow itself is considered a composite communications service that offers a Web Services interface. As such, the flow itself can be readily integrated as a communications service in a business process design. WSDL may be used to define the interface of a communications services flow, as well as of a communications service. Such a communications services flow provides coordination of service interactions to achieve a business goal.

The illustrative embodiments may provide one or more of the following advantageous features:

1. Disaggregates communications applications into standard services.

2. Provides communications services that are integratable into customers' application environments.

3. Provides communications services that are selectable for use in a given customer environment.

4. Provides communications services that can be incorporated into a business process workflow.

5. Provides communications services that can be combined with other communications services in a workflow for integration and use in the execution environment.

6. Provides the backend mechanisms to accept a communications services request and assume the appropriate level of processing. Response is based on the nature of the request, and as such may be request-reply, request-noreply, request-long transaction-asynchronous request or reply.

7. Supports real-time processing as well as synchronous and asynchronous communication depending on the needs of the communications service 8. Enables integration and leverage of applications and services in a flexible, open environment.

9. Leverages Web Services, workflow, BPEL scripting, business process workflow execution engine, XML technologies, and capabilities middleware in customer premises (e.g., application servers, portal servers, interfaces such as XML and SOAP, wireless, etc.).

10. Leverages converged communications networks (e.g., PSTN, SIP, IP, etc.).

11. Leverages multi-channel media streams (e.g., voice, video, messaging, fax, IM, etc.).

12. Services-based environment accommodates both peer-to-peer and client-server applications.

13. Provides both a development environment to provide communications services flows and composites as well as one or more runtime environments that provide the realization of each communications services in a transparent manner. The above-noted Communications Application Server is an example of one such runtime environment.

14. Provides open programmable communications services interface and tools application development creation environment for a variety of customers, including large enterprises, system integrators, independent software vendors, small to medium enterprises, information technology (IT) developers, IT analysts, and IT business process modelers.

Figure 3:
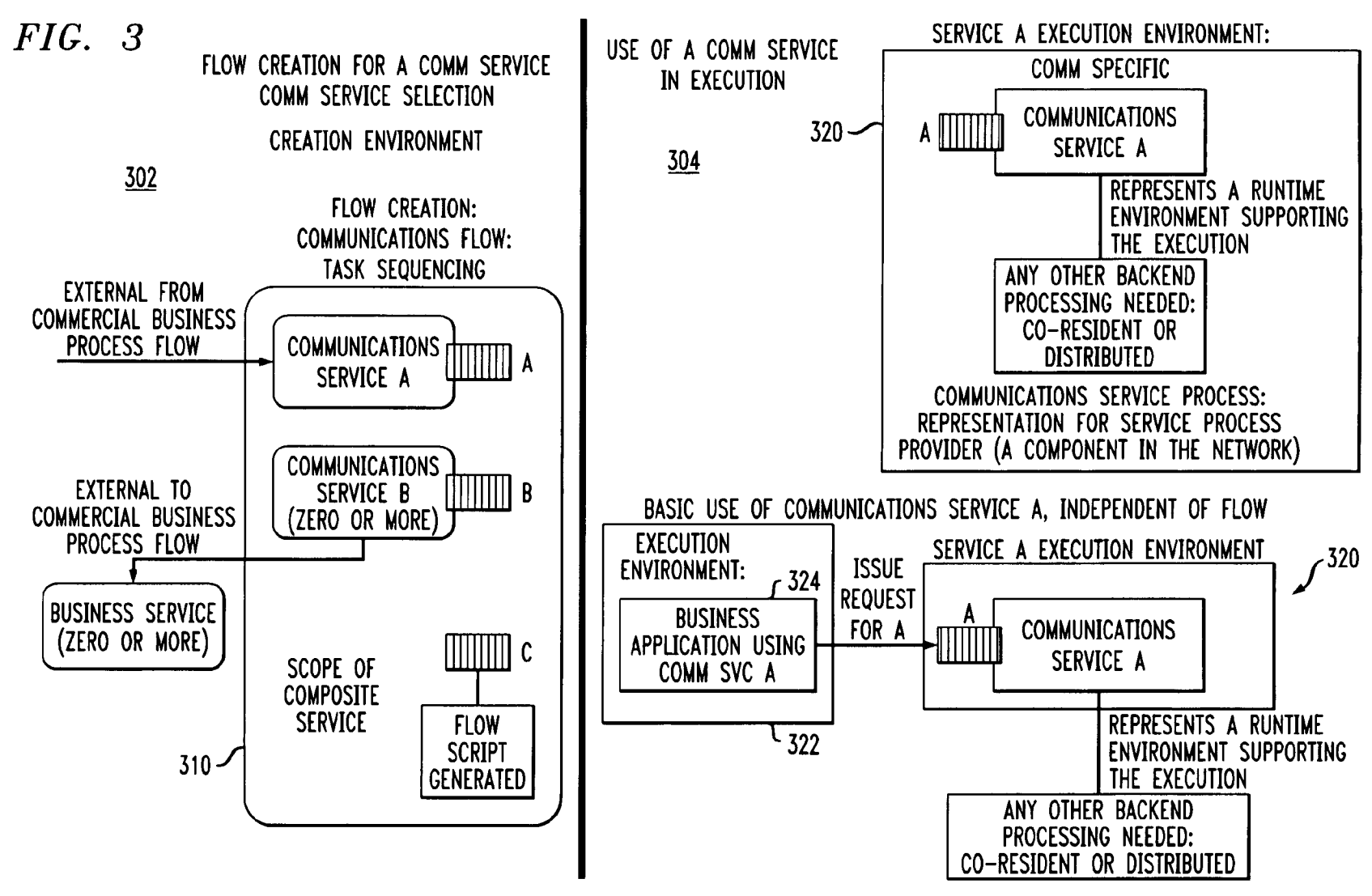

FIG. 3 depicts the flow creation for a given communications flow in creation environment 302, and the execution of a particular one of the communications services of the flow in a service execution environment 304.

The flow creation 310 in this example involves communications services denoted as A and B, each having an associated Web Services interface. A flow script incorporating these services comprises a communications service C, and also has an associated Web Services interface. Alternatively, it may reuse a Web Services interface defined by one of the component services. The script itself may be represented in any of a number of different languages, such as XML, WSDL, BPEL, etc.

The creation environment 302 of FIG. 3 may be configured, for example, to allow the user of a business process design tool to identify, select and incorporate various communications tasks into a business process flow. Such a tool may provide a palette of icons, corresponding to respective communications services, which can be "dragged and dropped" into a workflow modeling visual environment of the design tool. An ability to customize communications services to suit particular customer needs may also be provided.

Scripts created in the flow creation environment 302 may be maintained in a repository, using one or more storage elements of system 100, for later use by business process software at execution time. The execution environment 304 more specifically includes an execution environment 320 for communications service A, and an execution environment 322 for a business application or other business software program 324. As shown, the business application 324 using communications service A issues a request for service A from the business application execution environment 322. This results in execution of service A in its execution environment 320.

A given communications services execution environment may comprise co-resident or distributed processing elements or other components. Such an environment will typically include Web Services components to receive and parse a Web Services interface into execution programming language constructs, and Web Services components to create and send a Web Services interface, transforming the programming language specific constructs into a Web Services interface. It will also include backend processing elements as required to complete the task(s) of the communications service.

The present invention may be implemented, by way of example, as a business process design tool that comprises one or more of the following:

1. A generic process design tool, with examples to show the output of this tool, a dialog, speech application design tool and a Web Service creation and integration tool, which can be used independently, or in conjunction with one another.

2. A development environment, visible to the user of the process design tool, that allows the user of the design tool to identify, select, and incorporate a communications task (that can also be defined as an aggregate of other communications tasks or other business tasks), using a palette of icons to drag and drop into the workflow modeling visual environment.

3. A method that allows business processing software to be designed to incorporate communications services.

The present invention can also be implemented as a generic method in which communications services are processed in the execution environment. Such a method may include one or more of the following features:

1. Uses a Web Services interface to receive a task request from a runtime processing tool that interprets the execution request for the communications task defined by the generic process design tool.

2. Processes the request.

3. Returns a reply, as required by the nature of the request (some do not require a reply).

4. Sets up all communications across all channels, as required by the request.

5. Manages the control of the communications request on behalf of the request, without requiring intervention by the client requester.

6. Manages all sessions related to communications services, across the use of the services, as required. Communications services may be stateless or stateful. The backend runtime capability will manage any/all communications sessions required, across all methods of communicating, including sharing of such session state information with other distributed components.

7. Embodies modular components.

8. Uses components that may be co-resident on the same platform, or may exist anywhere in the network, distributed from each other as well as distributable from the client.

9. Is either co-resident with or distributable from the processing engine.

10. Incorporates a backend processing component is reached by the interface description location that the client-used interface defines.

11. Exposes an interface of the communications service which is not tethered to the communications protocol that may be required to reach a communications channel server. Indeed, the backend processing component makes certain communication implementation details transparent, such as what channel server is used (if any), whether there is one or more to select from, whether there is one or more concurrent communication channel server tasks involved.

12. Allows user application software to incorporate the communications service interface and result in the same as above, independent of whether or not that communications service is used as part of a workflow task (i.e., there is no requirement of workflow).

Again, communications services are independent, and can be aggregated together into a higher level service, with its own separate interface for use.

Figure 4:
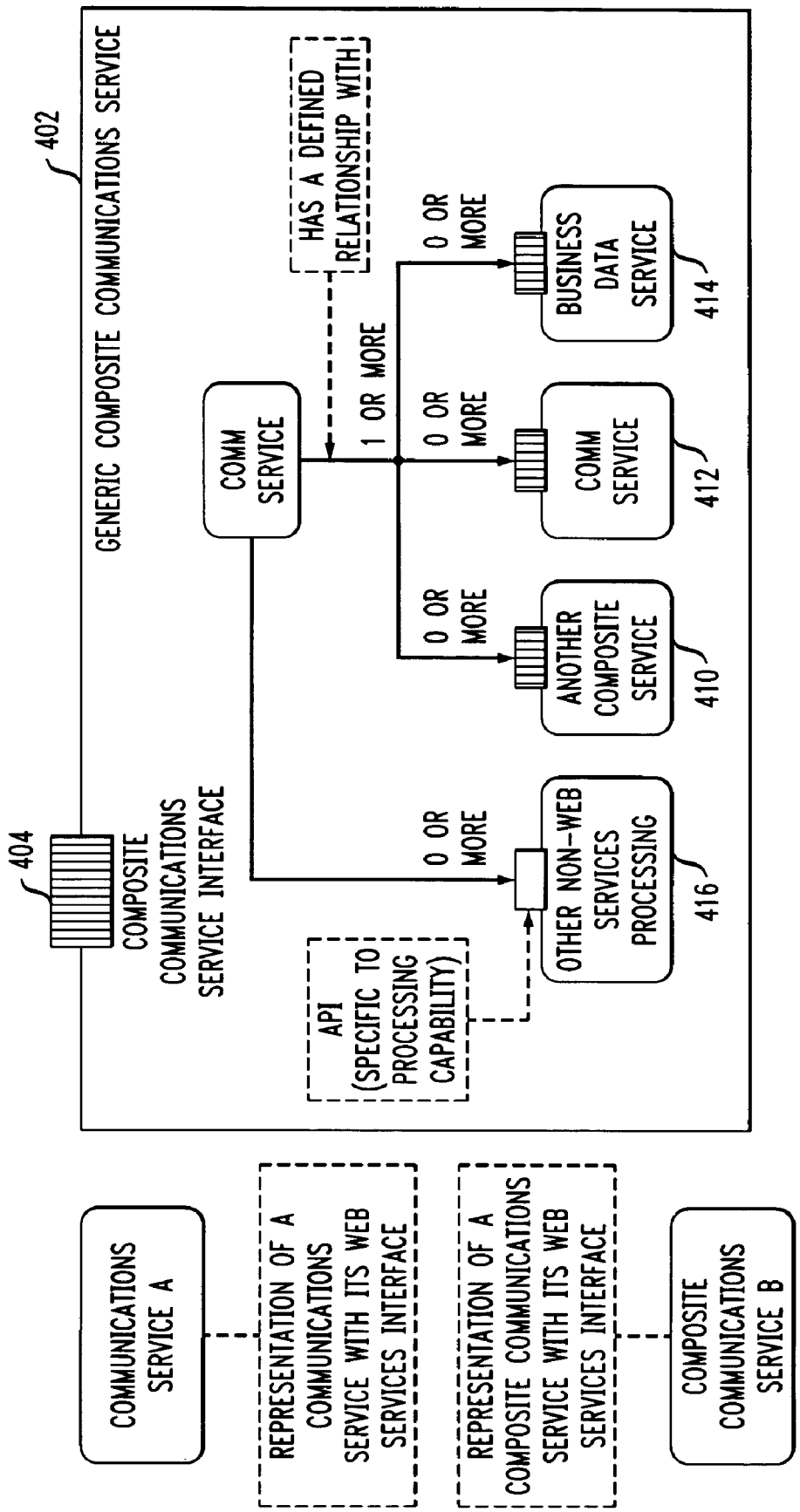
FIG. 4 illustrates an exemplary composite communications service in an embodiment of the invention.

FIG. 4 shows a generic composite communications service 402 having an interface 404. The composite communications service 402 may interact with other communications services, such as primitive communications service A and composite communications B, through their respective interfaces. The composite communications service 402 comprises one or more of elements 410, 412 and 414, which denote respective composite communications services, primitive communications services, or business data services. It may also comprise one or more non-Web Services processing elements 416, having respective application programming interfaces (APIs) specific to their processing capabilities.

Figure 5:
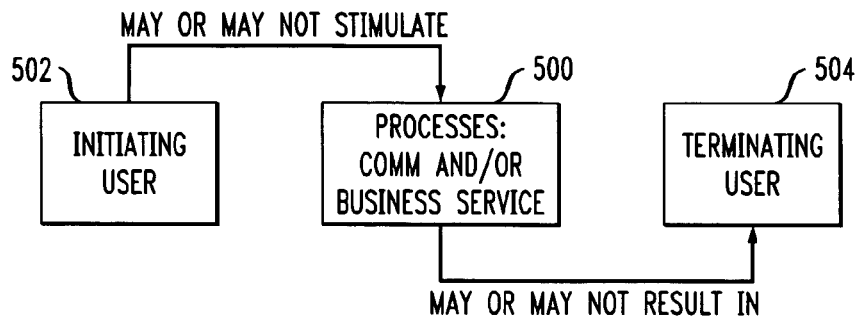
FIG. 5 illustrates the manner in which a process comprising at least one communications service may interact with initiating and terminating users.

FIG. 5 illustrates the manner in which a process 500, which may comprise at least one of the communications services noted above, interacts with initiating and terminating users. As shown, a given initiating user 502 may or may not stimulate the process, which results in connection with a terminating user 504. The initiating and terminating users may also comprise processes. Examples of basic services that may be provided include Make Call, Find Me, Send Message, Get Messages, Text-To-Speech (TTS), Automated Speech Recognition (ASR), Read Message, Waiting State, etc. Various composite service examples will be described below in conjunction with FIG. 8.

The diagram of FIG. 5 illustrates that a communications service may or may not be invoked by a human or an application, and may or may not be realized by a human or an application. For example, a communications service, such as a Notify service, may be invoked by an application, and may result in an application processing the result, without involving a human user. Thus, not all communications services are human initiated and/or human terminated, but may instead be application initiated and/or application terminated.

Figure 6:
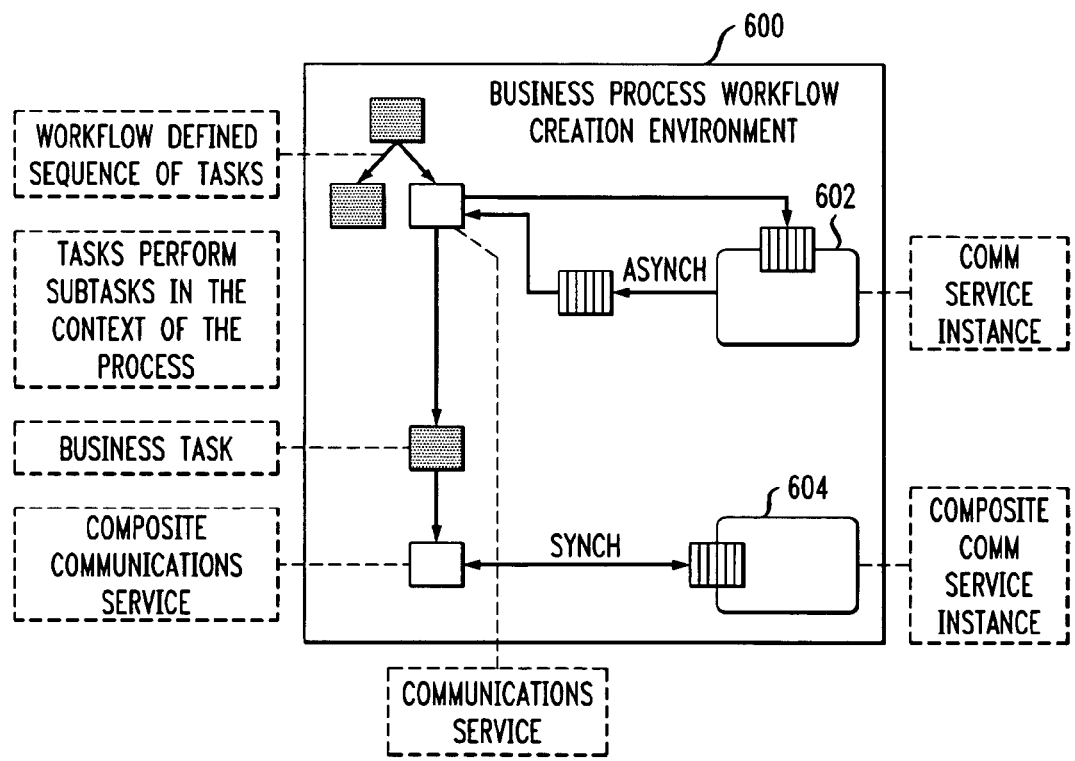
FIG. 6 is a diagram showing an exemplary business process workflow creation environment.

FIG. 6 shows an exemplary business process workflow creation environment 600. This may be viewed as a more particular example of the flow creation environment 302 previously described in conjunction with FIG. 3. It can be seen that the workflow in this example comprises both primitive and composite communications services instances, denoted 602 and 604, respectively. The primitive communications service 602 is an asynchronous service, while the composite communications service 604 is synchronous.

Figure 7A:
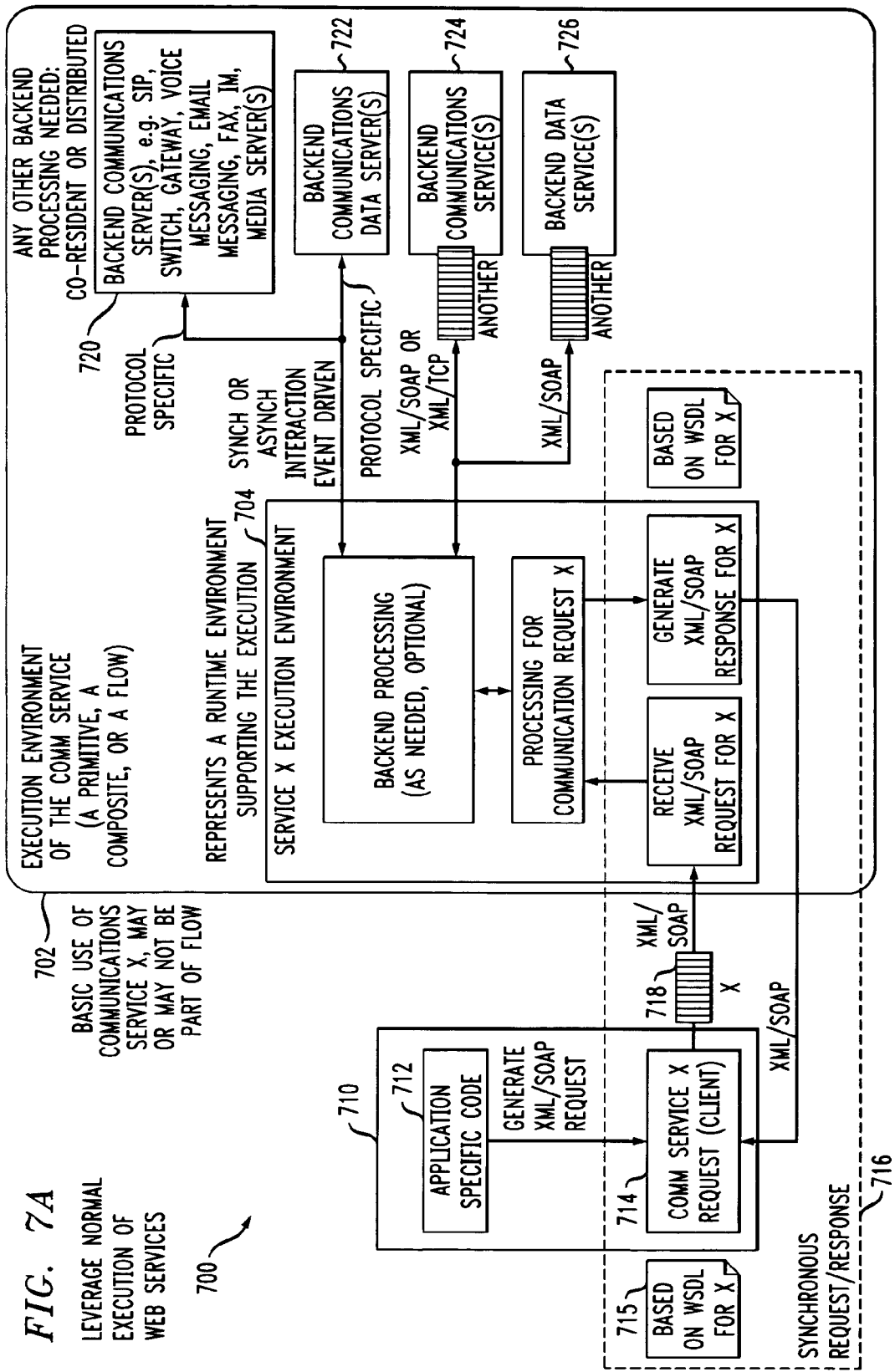
FIGS. 7A and 7B illustrate respective synchronous and asynchronous communications services in an embodiment of the invention.
Figure 7B:
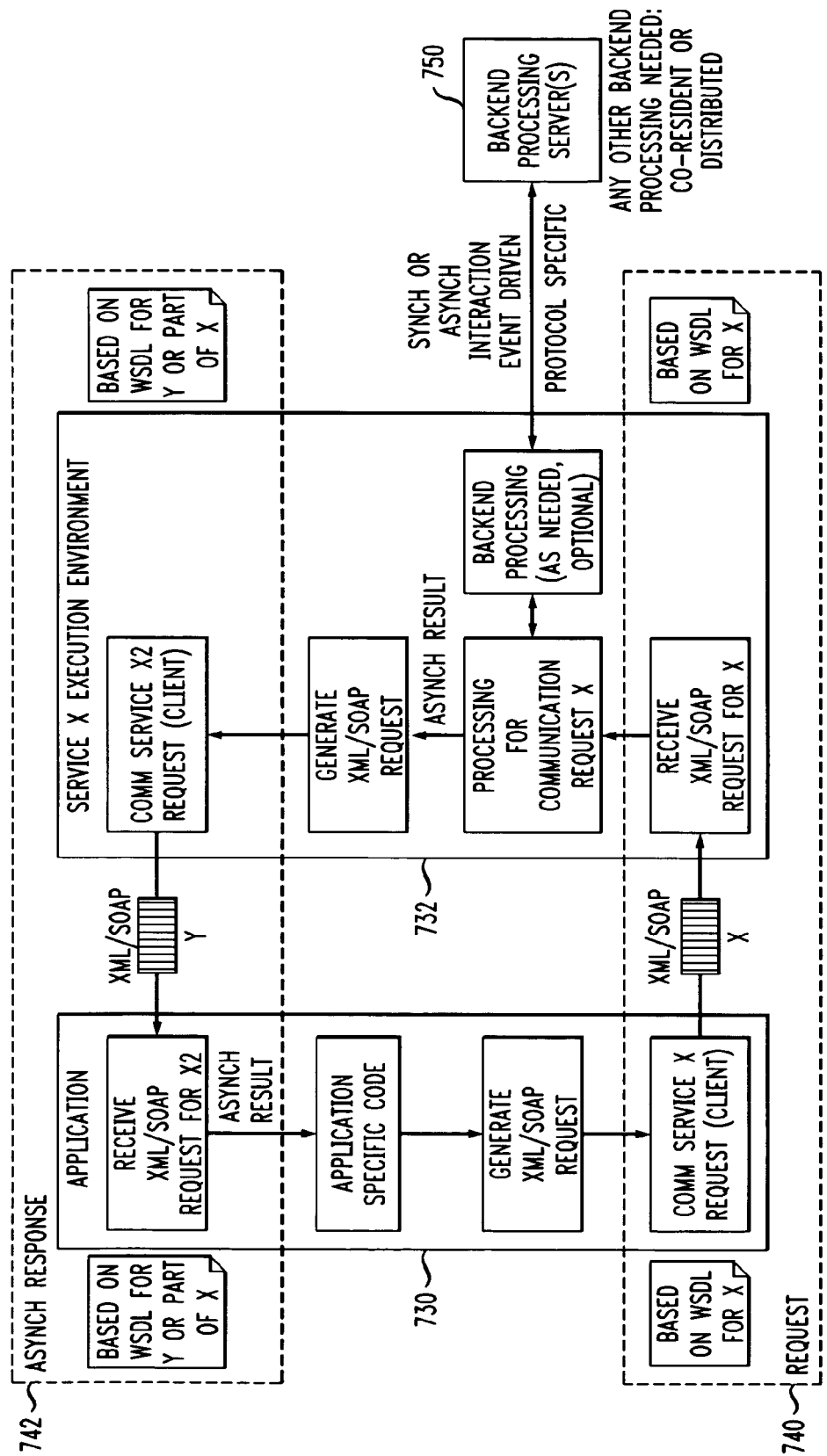

FIGS. 7A and 7B illustrate respective synchronous and asynchronous communications services in an illustrative embodiment of the invention.

With reference to FIG. 7A, a synchronous communications service 700 is executed in an execution environment 702 which comprises a runtime execution environment 704 for communications service X. The service is initiated from a business process software program 710 which comprises application specific code 712. The software program 710 generates a request 714 for execution of service X, based on a corresponding WSDL description 715. The request in this example is an XML/SOAP request, which utilizes at least one XML and SOAP. The interaction between software program 710 and service X execution environment 704 leverages normal execution of Web Services, as indicated generally at 716, through the use of Web Services interface 718 for service X.

The service X execution environment 704 invokes a variety of different types of backend processing in order to carry out the communications tasks associated with service X. These different types of backend processing include, for example, backend communications server(s) 720, backend communications data server(s) 722, backend communications service(s) 724, and backend data service(s) 726. In the system 100 of FIG. 1A, such backend processing may be implemented, for example, in server 102, in portions of the computer system 104, or in other processing elements of the system.

The FIG. 7A arrangement is synchronous in that it generates an XML/SOAP response, in synchronization with the corresponding request.

FIG. 7B illustrates an asynchronous arrangement. In this arrangement, a business process software program 730 generates an XML/SOAP request, but there is no direct or synchronous response to the request. Instead, the request is communicated from the software program 730 to the service X execution environment 732 via the Web Services interface of service X. This leverages normal execution of Web Services, as indicated generally at 740. An asynchronous response is provided, also via Web Services but using a Web Services interface of communications service Y, as indicated generally at 742. The response may be based on WSDL for service Y, or on WSDL for part of service X. Any backend processing that may be needed is provided in this example using backend processing server(s) 750.

An asynchronous response may comprise, for example, information that is returned to the software program 730 and characterizes an action or event related to service X. Such information may include, again by way of example, an indication that a particular party has been bridged into a conference. This type of asynchronous response is useful in that it keeps the initiator informed as to the state of the request.

A number of exemplary communications services templates configured for integration in business process software using the techniques of the invention will now be described, with reference to FIG. 8.

Figure 8A:
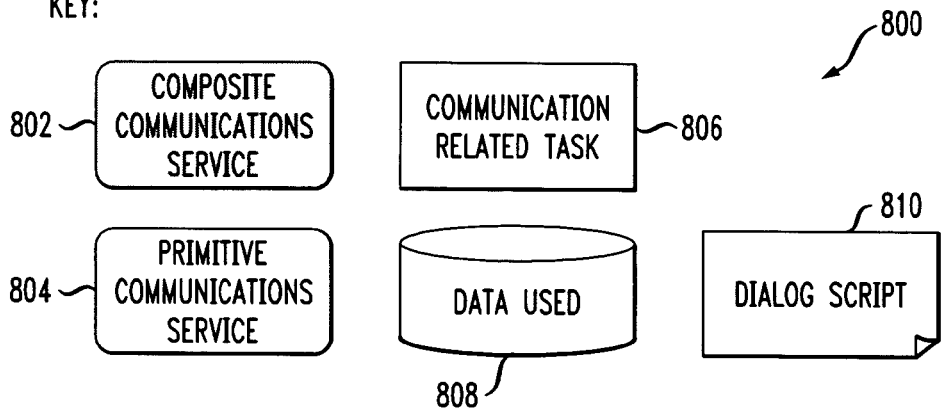
FIG. 8A is a key for certain symbols utilized in communications services templates.
Figure 8B:
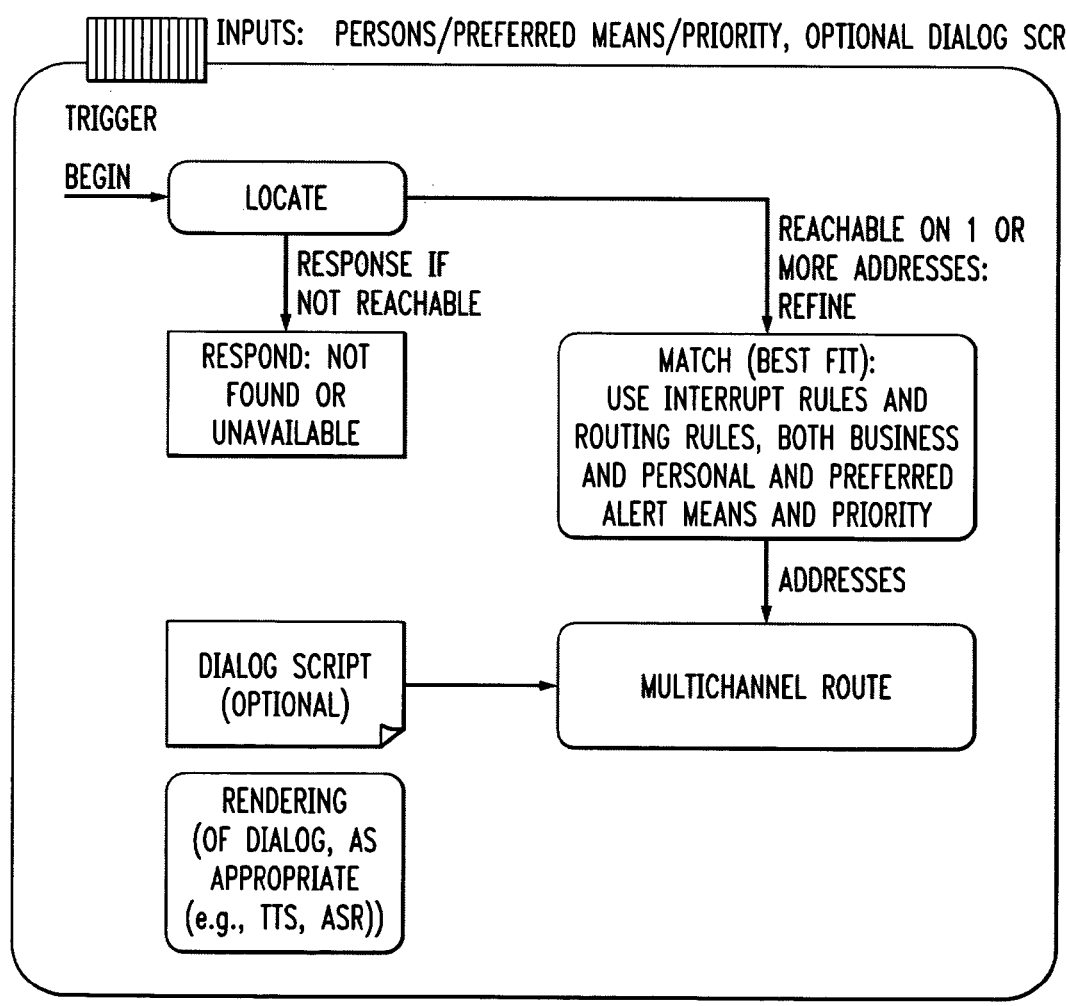
FIGS. 8B through 8P show exemplary communications services templates that may be integrated into business processes in embodiments of the invention.
Figure 8C:
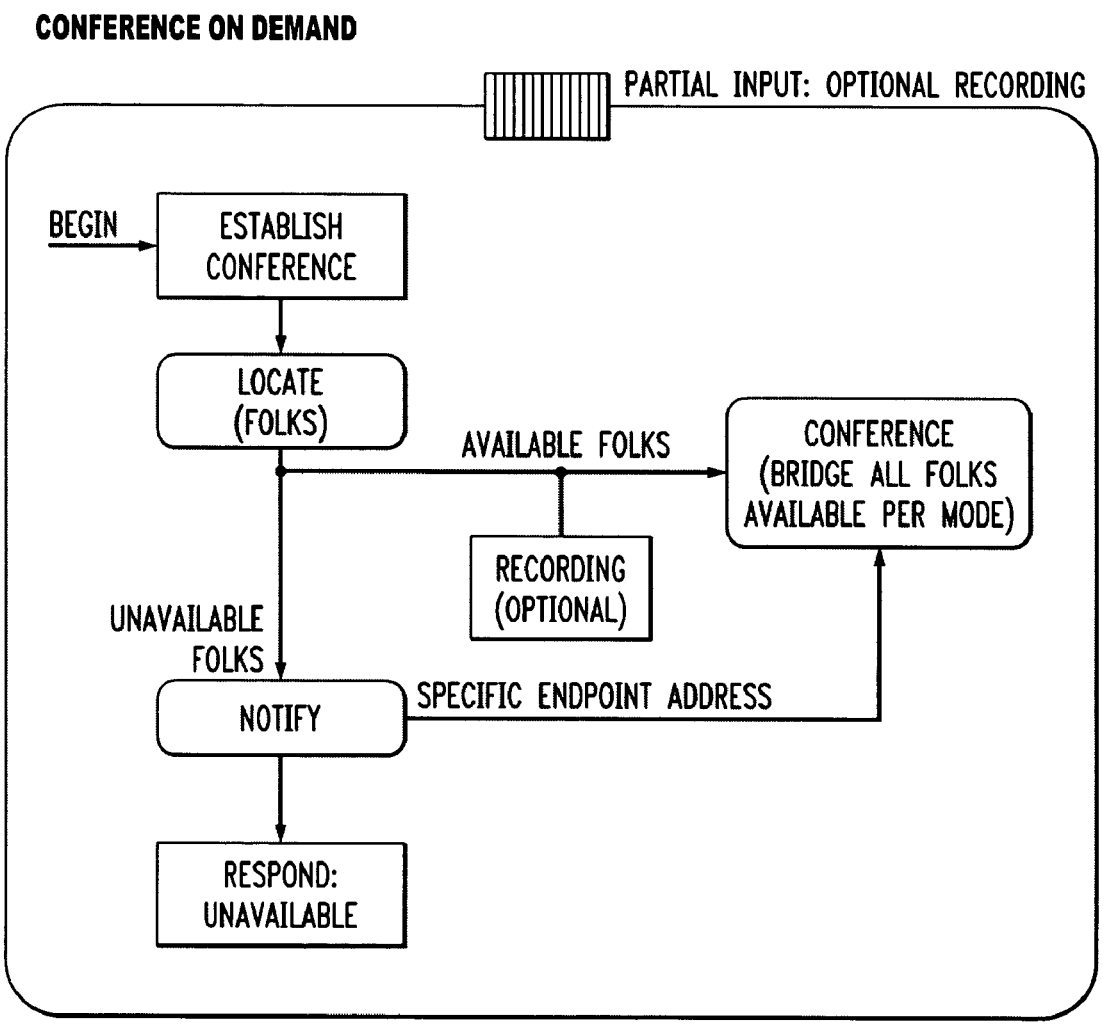
Figure 8D:
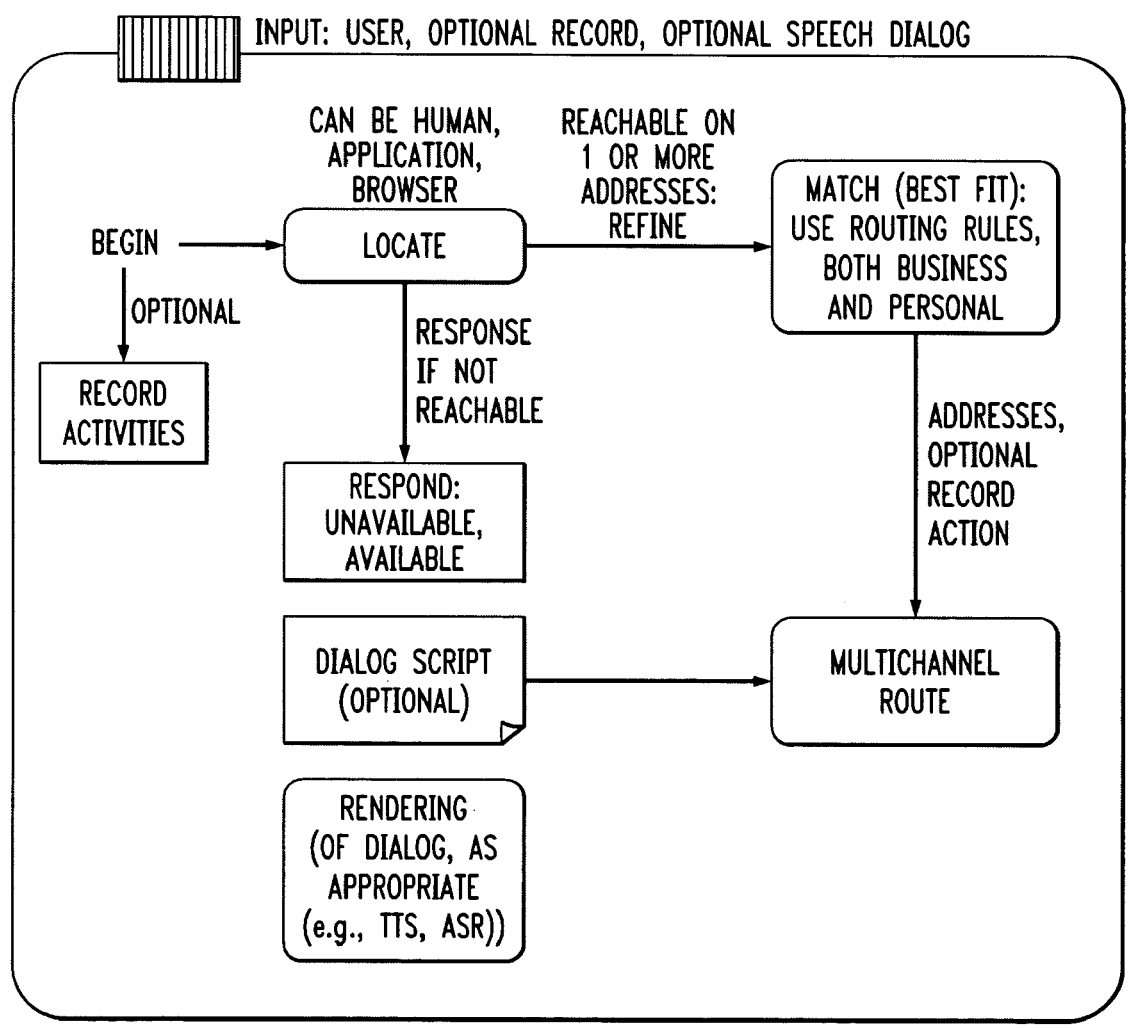
Figure 8E:
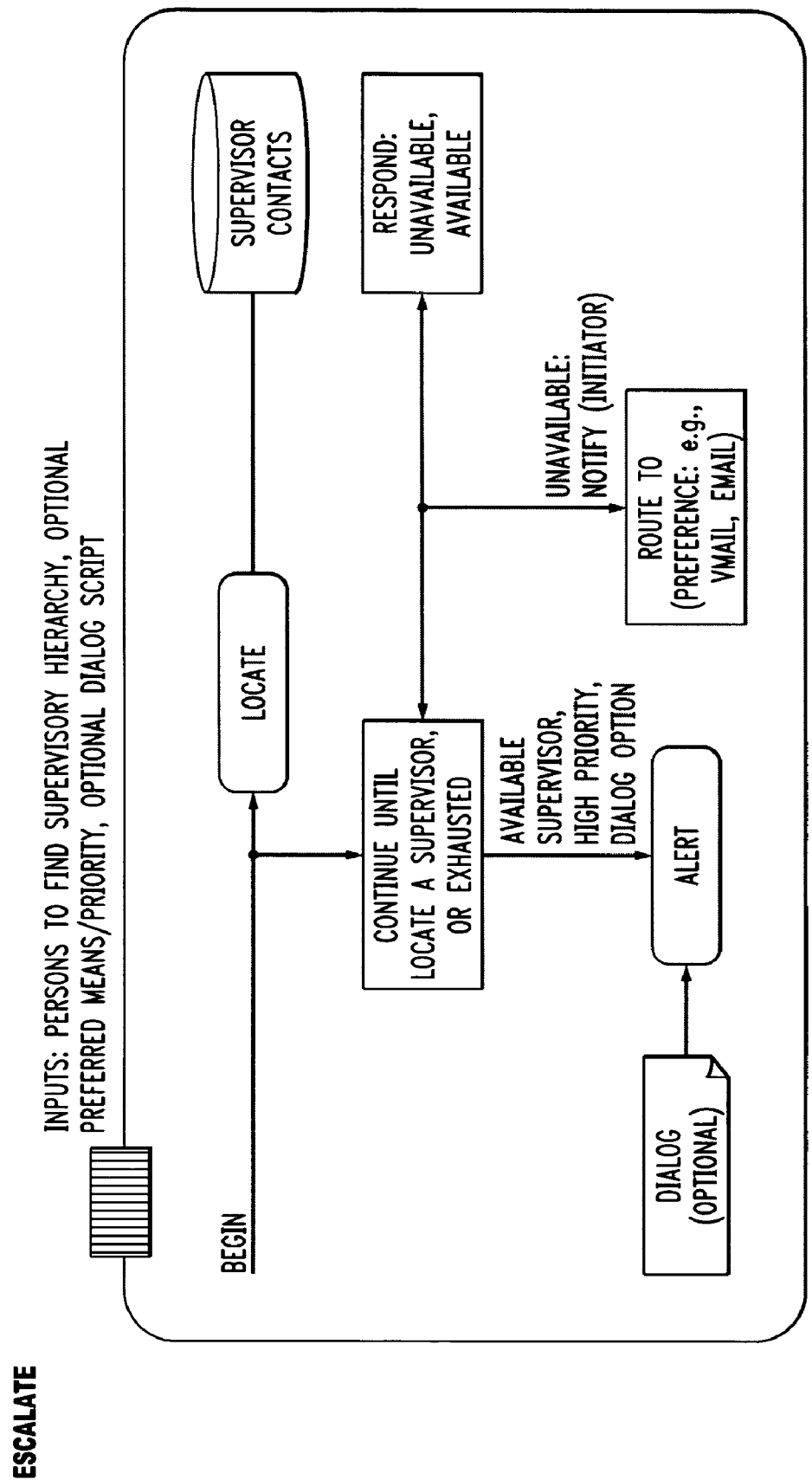
Figure 8F:
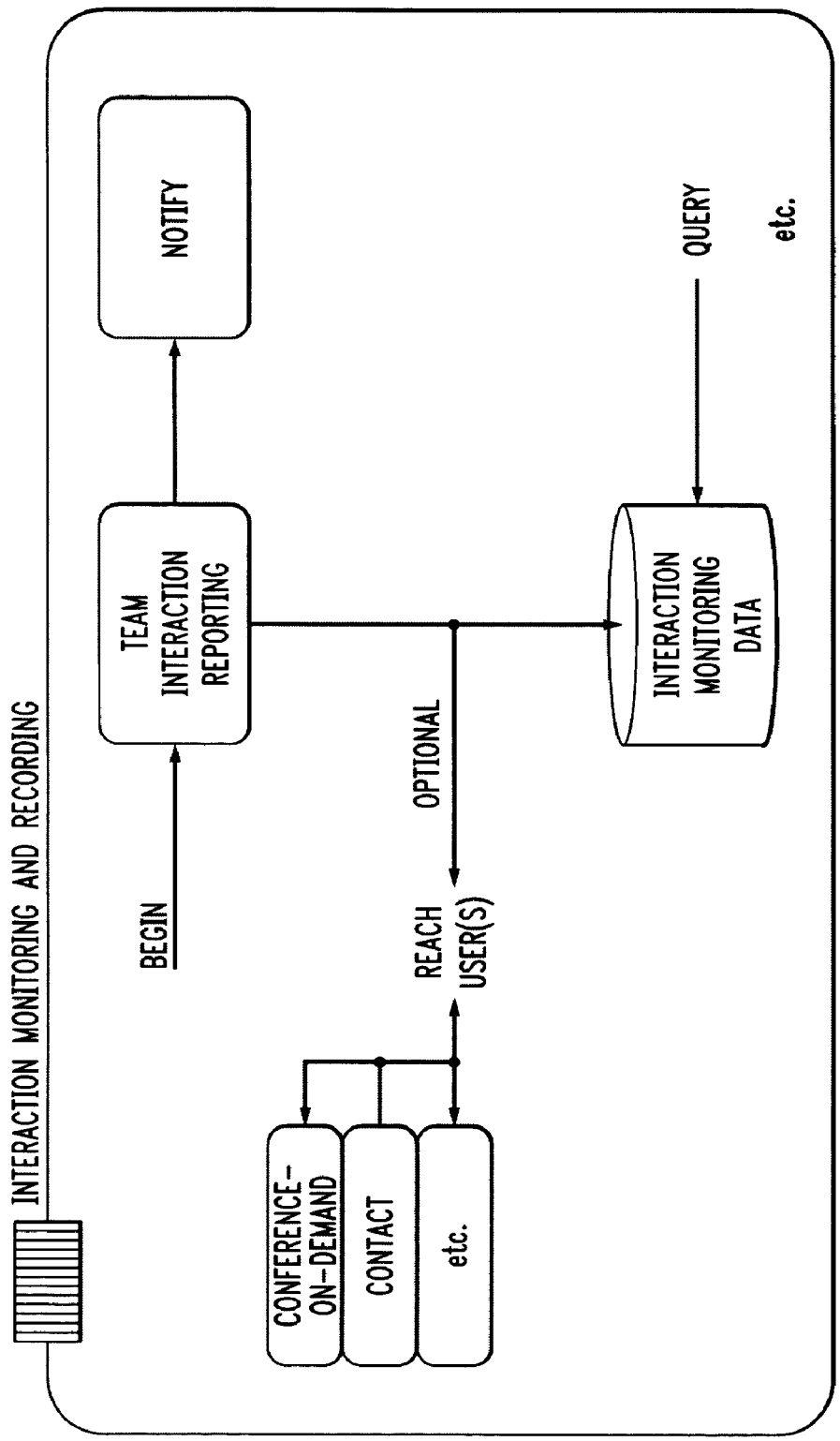
Figure 8G:
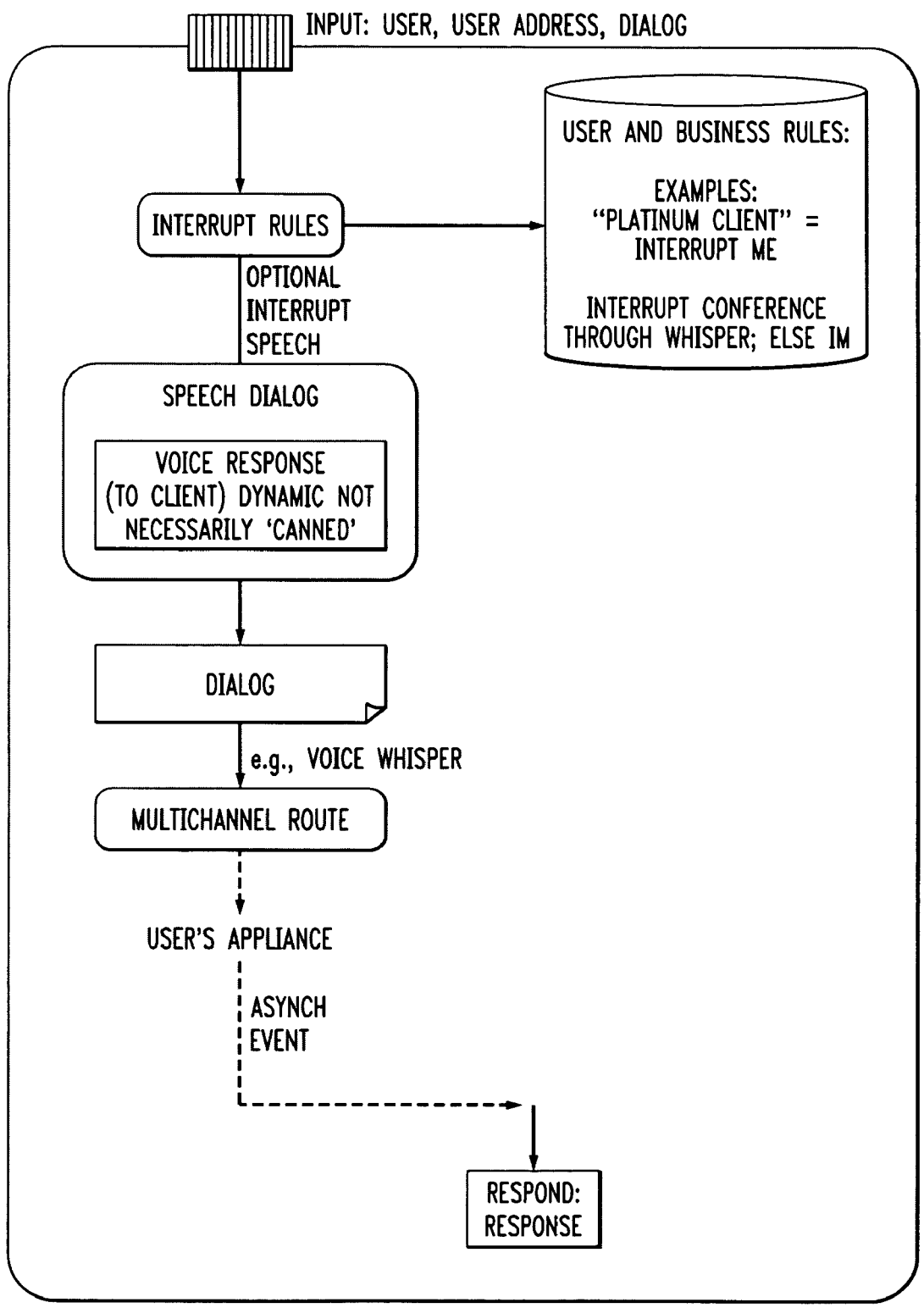
Figure 8H:
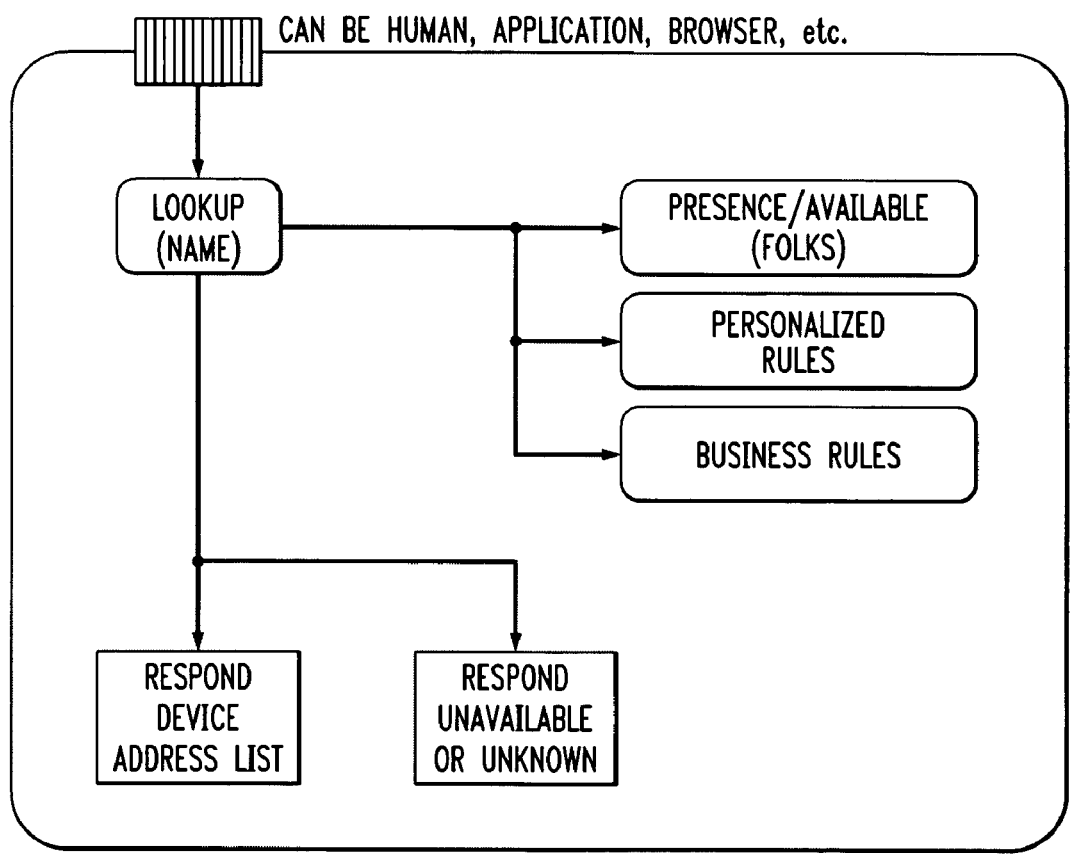
Figure 8I:
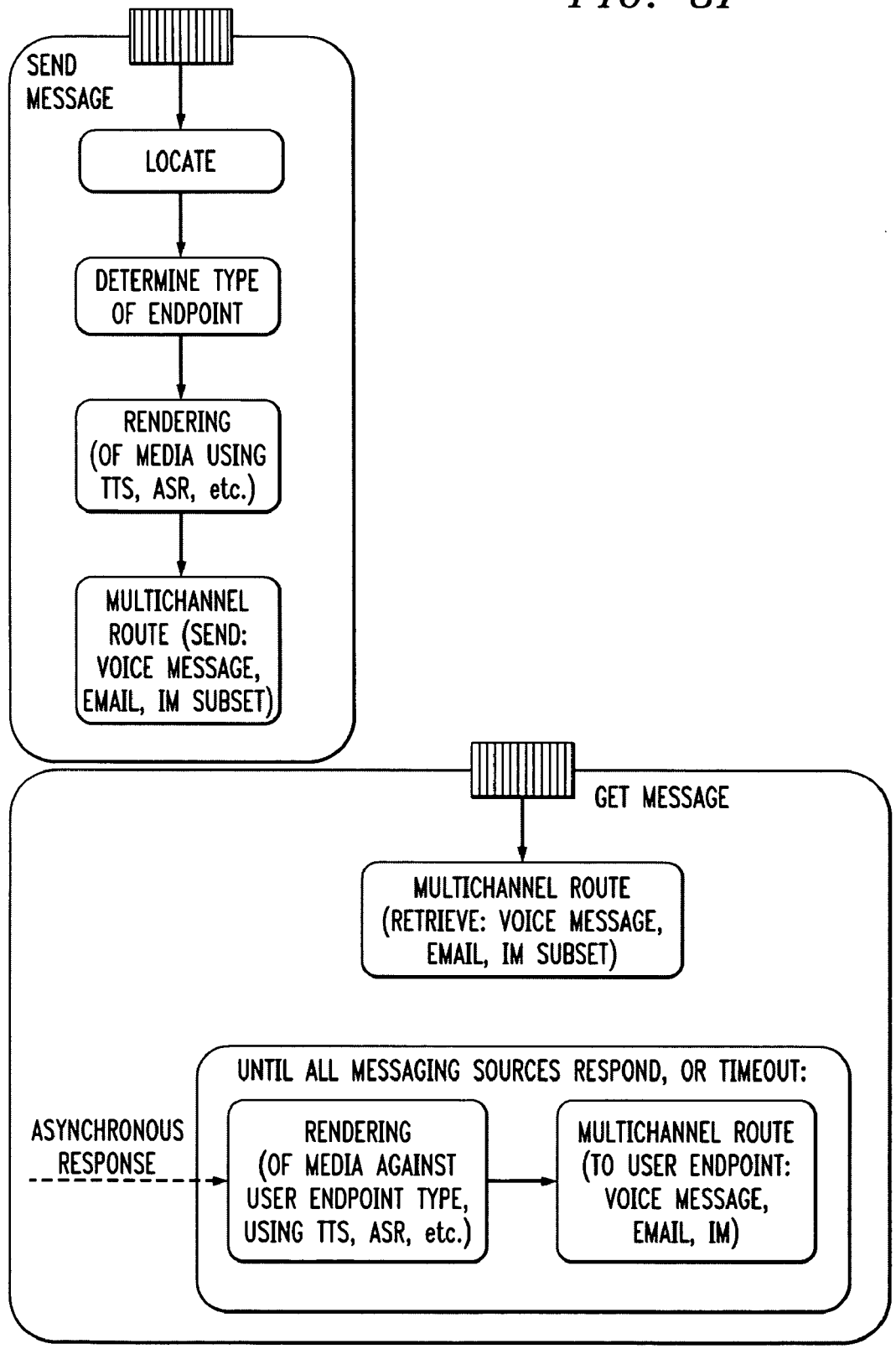
Figure 8J:
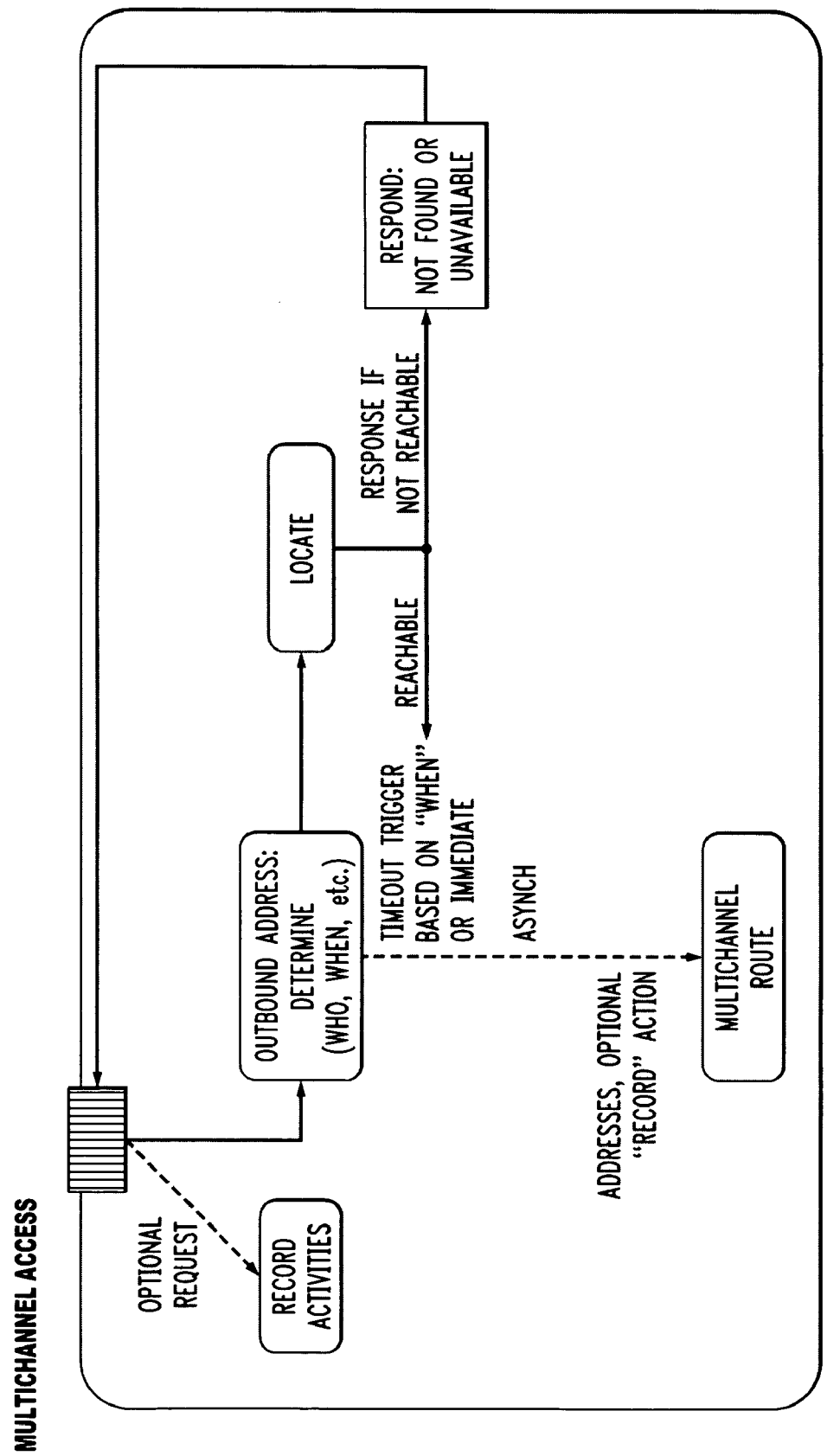
Figure 8M:
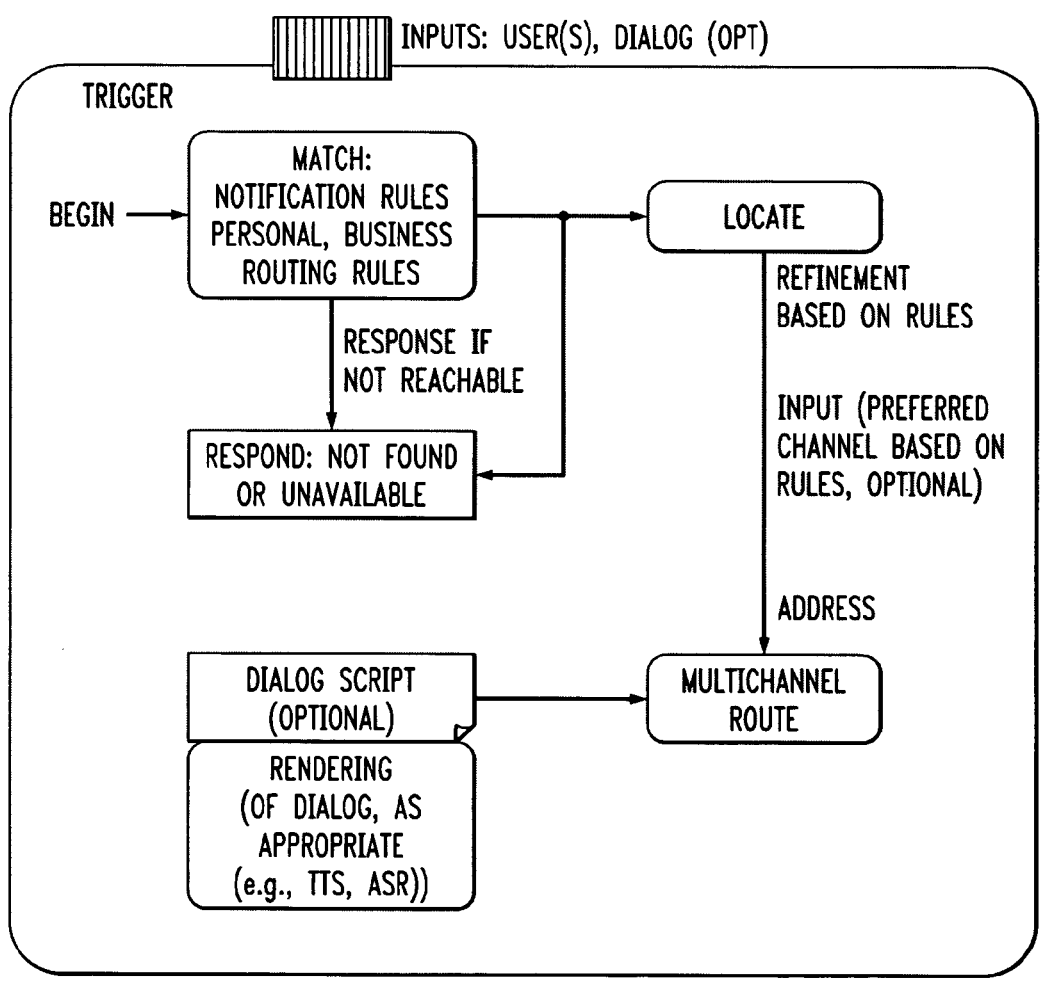
Figure 8N:
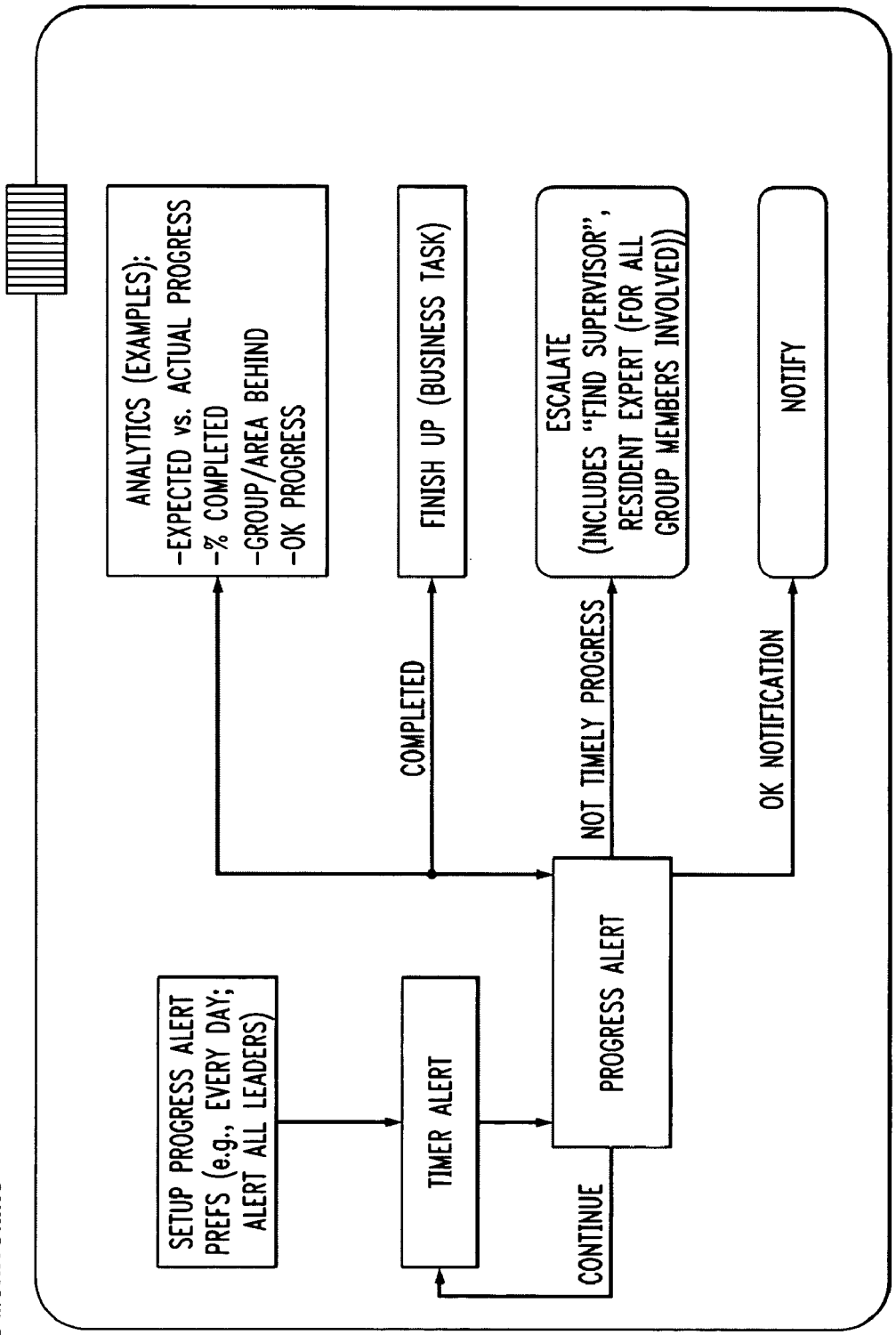
Figure 80:
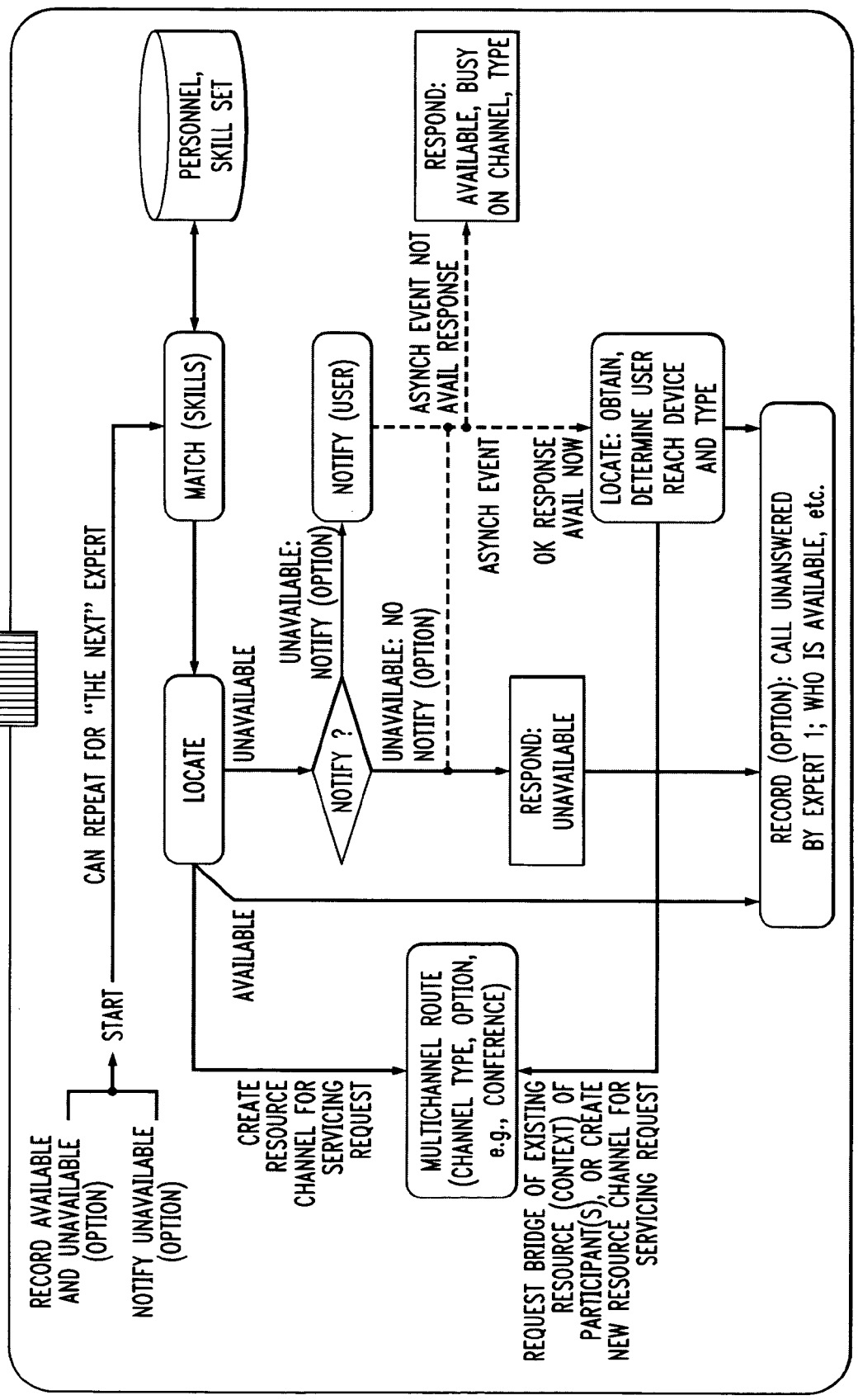
Figure 8P:
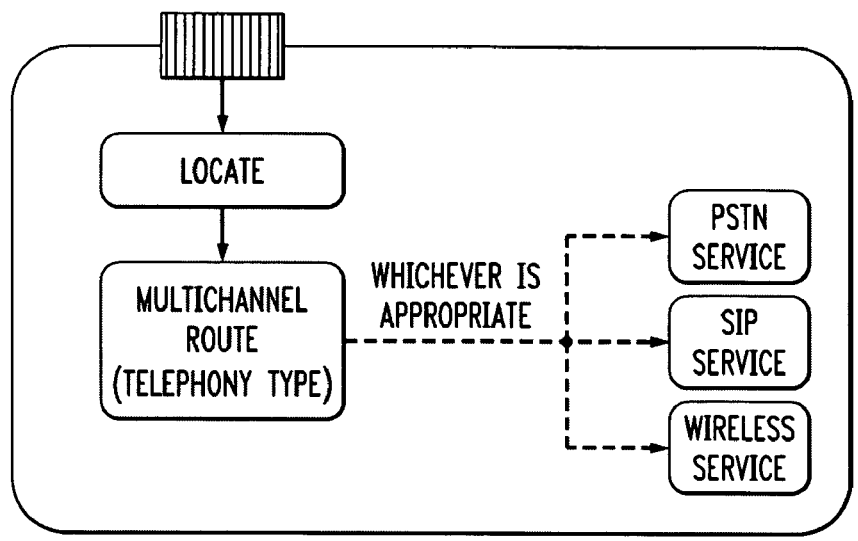

FIG. 8A provides a key 800 for certain symbols utilized in the communications services templates of FIGS. 8B through 8P. As shown in FIG. 8, symbol 802 is a shaded rounded box, and denotes a composite communications service. Symbol 804 is an unshaded rounded box, and denotes a primitive communications service, that is, a communications service that does not have another communications service as an element thereof. Symbol 806 is an unshaded square box, and denotes a communications services task, also referred to herein as a communication related task. Cylindrical symbol 808 denotes data used by a communications service, while dog-eared box symbol 810 denotes a dialog script.

FIGS. 8B though 8P are diagrams of exemplary composite communications services, also referred to herein as templates, that may be inserted in a business process in accordance with the invention. These include the following: Alert, Conference on Demand, Contact, Escalate, Interaction Monitoring and Recording, Interrupt, Locate, Message, Multichannel Access, Multichannel Inbound, Multichannel Route, Notify, Progress Monitoring, Resident Expert, and Telephony (e.g., MakeCall, Transfer, Hold, Drop and Conference).

It should again be noted that a given composite communications service may itself comprise one or more other composite communications services. This will be apparent from the following examples.

Each of the exemplary templates to be described comprises a composite communications service having a Web Services interface which facilitates interaction with business process software.

FIG. 8B. Alert

Alert is a composite service that provides the ability to notify one or more individual(s) of an event. Alert is typically intended for use in urgent situations where a high priority interruption is warranted. It accepts as inputs the person(s) to notify; the preferred means of notification, if any; the priority of the notification, if any; and an optional dialog script to use in the notification. Alert uses the Locate composite service (FIG. 8H) to determine if each person is reachable, and if not, a failure response is returned. If Locate determines that the individual is reachable, business and personal interrupt rules are applied, routing rules are applied, and the inputted preferred means of notification and the inputted priority of the alert are used by a Match service to select a best address to use to reach the individual. This address is passed to the Multichannel Route composite service (FIG. 8L) to reach the individual, which makes use of the inputted dialog script and a Rendering service to convert the dialog into other media when required.

FIG. 8C. Conference On Demand

Conference On Demand is a composite service that provides the ability to set up a conference bridge, bridge in persons either at the same time or asynchronously, and optionally request a recording of the conference. Part of the Conference on Demand composite service involves using the Locate composite service (FIG. 8H) to locate each person. The available persons or "folks" are bridged together using the Conference portion of the Telephony composite service (FIG. 8P). If a person cannot be found or reached, a notification is sent to that person using the Notify composite service (FIG. 8M). If that person later responds to join in the conference, the conference on demand will bridge in that person (asynchronously). An indicator of any unavailable person is returned to the initiator of the Conference on Demand service.

FIG. 8D. Contact

Like Alert, Contact is a composite service that provides the ability to notify one or more individuals of an event. The Contact service is intended for use in normal, non-urgent communications. It accepts as inputs the person(s) to contact; the preferred means of contact, if any; the priority of the contact, if any; and an optional dialog script to use in the contact. Contact uses the Locate composite service (FIG. 8H), to determine if each person is reachable, and if not, a failure response is returned. If Locate determines that the individual is reachable, routing rules are applied, and the inputted preferred means of being contact and the inputted priority of the contact are used by a Match service to select a best address to use to reach the individual. Note that, unlike the Alert service, the personal and business interrupt rules are not consulted in this case. The determined address is passed to the Multichannel Route composite service (FIG. 8L) to reach the individual, which optionally requires the input dialog script and a Rendering service to convert the dialog into other media when required.

FIG. 8E. Escalate

Escalate is a composite service that is intended to notify someone higher in the "chain of command" of an event. It accepts as input the person for whom the supervisory hierarchy is to be found, an optional preferred means of reaching that supervisor, an optional priority for reaching that supervisor, and an optional dialog script to use in notifying that supervisor. The Locate composite service (FIG. 8H) is used to find the supervisor, whose identity is determined from a database of supervisory contacts. This step can iterate to multiple managers or delegates in the supervisory chain, as identified in the database of supervisory contacts, until an appropriate supervisor is located. Once located, the supervisor is contacted via the Alert composite service (FIG. 8B), using the optional dialog script which was provided as input. If no supervisor can be found, the initiator is notified via his or her preferred means of contact.

FIG. 8F. Interaction Monitoring and Recording

Interaction Monitoring and Recording is a composite service that is used to collect data on a contact, to store and prepare reports displaying and summarizing those data, and to monitor those data for events or for combinations of data that are of interest to users. The data are fed to a Team Interaction Reporting service to organize and summarize the data into appropriate reports. When an event or a combination of one or more data items of interest is detected, the Notify composite service (FIG. 8M) is used to inform the user of the situation applied. Other composite services that may be initiated from the Interaction Monitoring and Recording service include, for example, Conference on Demand (FIG. 8C) and Contact (FIG. 8D).

FIG. 8G. Interrupt

Interrupt is a composite service that is used to take control of a media stream or to otherwise take over a channel that is currently being utilized by a given user. This is disruptive of normal communication, and should be used with caution. If a business event dictates doing so, this service provides the ability to physically interrupt the communication, assume control, and communicate whatever is important to the user. Examples include an event or situation of an urgent nature. The Interrupt service accepts as input the user, the user address, and a dialog to use in the interrupt. Interrupt rules are applied to determine what channel to use for the interruption based on the user's context in existing communication channels, and, optionally, a Speech Dialog service is used to render the dialog, in order to inform the user by the specified media (ordinarily, voice) in accordance with the interrupt rules. The Multichannel Route composite service (FIG. 8L) is used to carry out the interruption. Asynchronously, the user responds to the interruption.

FIG. 8H. Locate

Locate is a composite service that is used (often by other services) to find an individual. Locate uses a Lookup service to identify devices and media associated with the individual, and then uses a Presence/Availability service to determine the individual's state. Personalized Rules and Business Rules services are used to determine which medium(s) to use for the individual for this particular Locate request. Based on the results of this determination, the service responds with either a list of devices to use for this request, or with a response indicating that the individual is either unavailable or unknown. It should be noted that a Matching service may be used here, and the variables input to such a service typically need to be prioritized. In the Locate service, business rules override personal rules which override presence.

FIG. 8I. Message

Message is a composite service that is used to send a message to and/or receive a message from an individual. For sending a message, the Locate composite service (FIG. 8H) is used to find the individual. The response of that service is used to determine the type of endpoint which, in turn, determines what Rendering service is appropriate for the particular endpoint. The Multichannel Route composite service (FIG. 8L) is then used to reach the individual to deliver the message.

FIG. 8J. Multichannel Access

Multichannel Access is a composite service that accesses an individual in one or more media. It accepts as input a time parameter that determines whether the request is immediate or to be scheduled for a later time. Optionally, the request can specify that activities be preserved (e.g., for compliance recording or for supervisory analysis), in which case the Record Activities service is invoked to capture the communications. The Record Activities service in this case regards the user context in communication. The fact that a user (e.g., initiator) has requested a communication is recorded. The initiation and completion times of that communication are recorded. Because only a certain time frame is allowable, timeout parameters are used to establish the communication and/or to cancel it. An Outbound Address service is used to determine who is being contacted, and when. This is useful, for example, in the context of a calendar appointment. A specific time may be set up to initiate a particular multichannel access. At the appropriate time, the Locate composite service (FIG. 8H) is used to determine if the person is reachable. If so, the Multichannel Route composite service (FIG. 8L) is used to contact the individual. If the person is unreachable or not found, an error message is returned.

FIG. 8K. Multichannel Inbound

Multichannel Inbound is a service used to generalize all types of contacts that enter into a communications system. These contacts can originate from individuals (e.g., as an Instant Message, email, incoming voice call, etc.) or from an inanimate object (e.g., an alert of an error condition from a software program, or a sensor triggered by a monitoring device). Each of these different types of inbound contacts are served by a different type of server (e.g. a voice messaging server, video server, conferencing server, or one of the many other types shown in FIG. 8K. An accompanying software service monitors each of these types of servers, and these services pass incoming requests to the Inbound Route service. It, in turn, uses the Match service to determine who should be chosen to handle the incoming contact. Optionally, the Record Activites service can be invoked to capture the interaction, e.g., for regulatory compliance or supervisory review.

FIG. 8L. Multichannel Route

Multichannel Route is a service used to generalize all types of contacts that terminate on the communication system. Its main purpose is to hide the specifics of media control and rendering from the services that invoke it. A Rules service is invoked to determine the appropriate routing for a contact, using a variety of criteria that can include the type of communication requested, the participant addresses and type, resource features, resource state, user context, Quality of Service (QoS) rules, location rules, interrupt rules, geographic location, least cost routing, etc. The Rules service chooses one or more resources to be used in delivering the contact to the user. Based on this, Multichannel Route invokes a Rendering service for each channel selected, in order to render the contact in a medium appropriate for that channel. An outbound route service is used to deliver the contact to the appropriate services that are used to connect to each of the chosen servers, as shown on FIG. 8L. When required by certain channels, a VoiceXML Interpreter service may be used to deliver the contact to the appropriate service.

FIG. 8M. Notify

Notify is a composite service that is used to notify a user of events or requests for contact from a variety of sources. Notify is intended for use in non-urgent situations where any means of notification are acceptable. Inputs to this service are person(s) to notify, their selected preferred means of notification which may be context based (that is, based on the initiator trying to notify the user), and optionally a dialog script to use in the notification. Notify uses the Locate composite service (FIG. 8H) to determine if each person is reachable, and if not, a failure response is returned. If Locate determines that the individual is reachable, business and personal interrupt rules are applied, routing rules are applied, and the inputted preferred means of being notification and the inputted priority of the alert are used by a Match service to select a best address to use to reach the individual. This address is passed to the Multichannel Route composite service (FIG. 8L) to reach the individual on the appropriate channel pertinent to the rules and the availability of the user. An inputted dialog script may be used to indicate to the user the purpose of the notification, and a Rendering service may be used to convert the dialog into other media when required.

FIG. 8N. Progress Monitoring

Progress Monitoring is a service that is used to monitor progress of events or to monitor for other system data of interest to a user or to an application. Inputs to this service are the alerting preferences (e.g., the periodicity of an alert, and a list of the individuals or applications to alert). If progress is within norms, no action is taken until the task is completed or a data or time event is reached, in which case the Notify composite service (FIG. 8M) is used to communicate completion or status. In the event of an exception or the lack of timely progress, the Escalate service (FIG. 8E) may be used to alert managers or other parties to the need for intervention.

FIG. 8O. Resident Expert

Resident Expert is a service used to find and engage an expert to join or take over a communication. It uses the Match service to consult a skills database to find an "expert" qualified to handle the needs of this particular communication. It then uses the Locate composite service (FIG. 8H) to find the chosen expert. If the expert is available, the Multichannel Route composite service (FIG. 8L) is used to bring the expert into the communication. If the expert is not available, the Notify composite service (FIG. 8M) can optionally be used to inform the expert that his or her services are required. The expert, asynchronously, can reply to this notification indicating a willingness or unwillingness to become available. If the expert indicates a willingness to participate, the Locate service is used to determine the type of device to use, and then Multichannel Route is used to bring the expert into the communication. If the expert does not respond to the notification, or if the expert's response indicates no availability to participate, then a failure response is delivered back to the requestor. In all cases, a Record service can optionally be used to capture the details and results of the Resident Expert service request.

FIG. 8P. Telephony: Makecall, Transfer, Hold, Drop, Conference

Telephony is a straightforward service that is used to execute basic telephony functions. These functions include MakeCall, Transfer, Hold, Drop and Conference. When a Telephony service is invoked, the Locate composite service (FIG. 8H) is first invoked to find the desired contact. Then, the Multichannel Route composite service (FIG. 8L) is invoked to originate, transfer, hold or drop the connection, or to establish a multiparty conference.

It is to be appreciated that the particular example communications services of FIGS. 8B through 8P are presented by way of illustrative example only, and a given embodiment of the invention may include additional or alternative communications services, such as, for example, a Speech Enable service. A wide variety of other communications services may be supported using the techniques described herein, and the invention is not restricted in this regard. Also, the above-described communications services may be implemented in ways other than those specifically shown.

Figure 9:
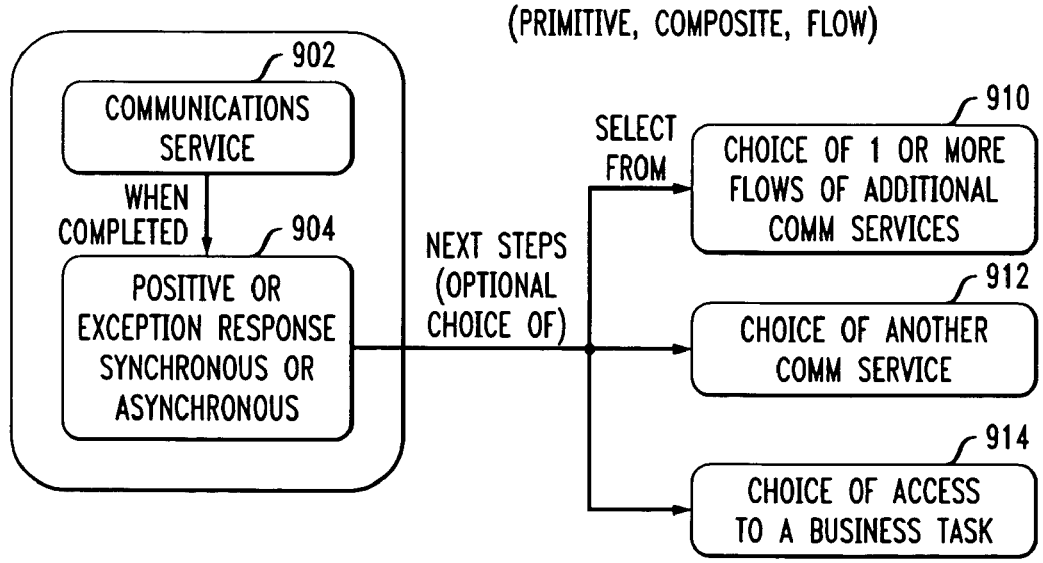
FIG. 9 illustrates the manner in which communications flows may be customized in an embodiment of the invention.

FIG. 9 illustrates a process 9000 in which communications flows may be customized in an illustrative embodiment. As shown, a given communications service 902 when completed results in a positive or exception response, which may be synchronous or asynchronous. The next steps are carried out in accordance with the selections made by the business process designer in the development environment, which may comprise the flow creation environment previously described in conjunction with FIG. 3. These selections may include, for example, a choice 910 of one or more flows of additional communications services, a choice 912 of another communications service, and a choice 914 of access to a business task. Of course, other choices may be provided in other embodiments.

A number of exemplary use case scenarios involving the communications services templates presented above will now be described, with reference to FIGS. 10 through 41.

Figure 10:
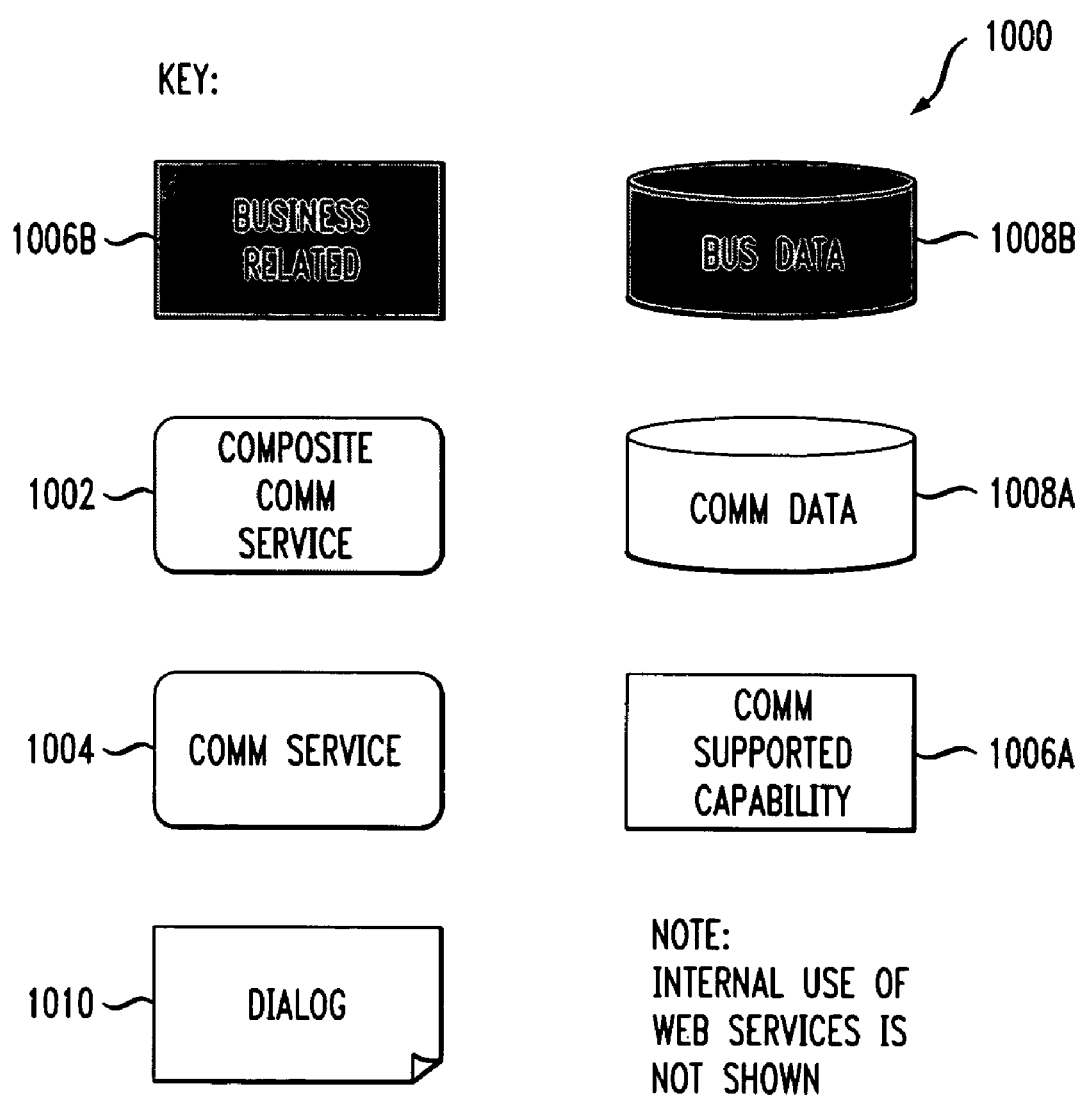
FIG. 10 shows a key for symbols of use case scenarios.

FIG. 10 provides a key 1000 for certain symbols utilized in the use case scenarios of FIGS. 11 through 41. As shown in FIG. 10, symbol 1002 is a shaded rounded box, and denotes a composite communications service. Symbol 1004 is an unshaded rounded box, and denotes a primitive communications service, that is, a communications service that does not have another communications service as an element thereof. Symbols 1006A and 1006B are respective unshaded and shaded boxes, and denote respective business related and communications related tasks. Unshaded and shaded cylindrical symbols 1008A and 1008B denote respective communication data and business data used by a communications service, while dog-eared box symbol 1010 denotes a dialog script. It should be noted that internal use of Web Services is not shown in the following use case scenario diagrams, for simplicity and clarity of illustration. FIGS. 11 through 41 are diagrams illustrating the use of communications services to solve different kinds of business problems.

Each of the diagrams shows a corresponding illustrative embodiment of the invention which is intended to be covered by the claims annexed hereto.

It is to be appreciated, however, that these particular scenarios are merely exemplary of the types of business processes that can be produced using the techniques of the invention. Communications services in accordance with the invention can be used to produce a wide variety of other business process scenarios, as will be readily apparent to those skilled in the art. The communications services are designed to be selectable in an efficient and flexible manner for inclusion in any type of business process software.

Figure 11A:
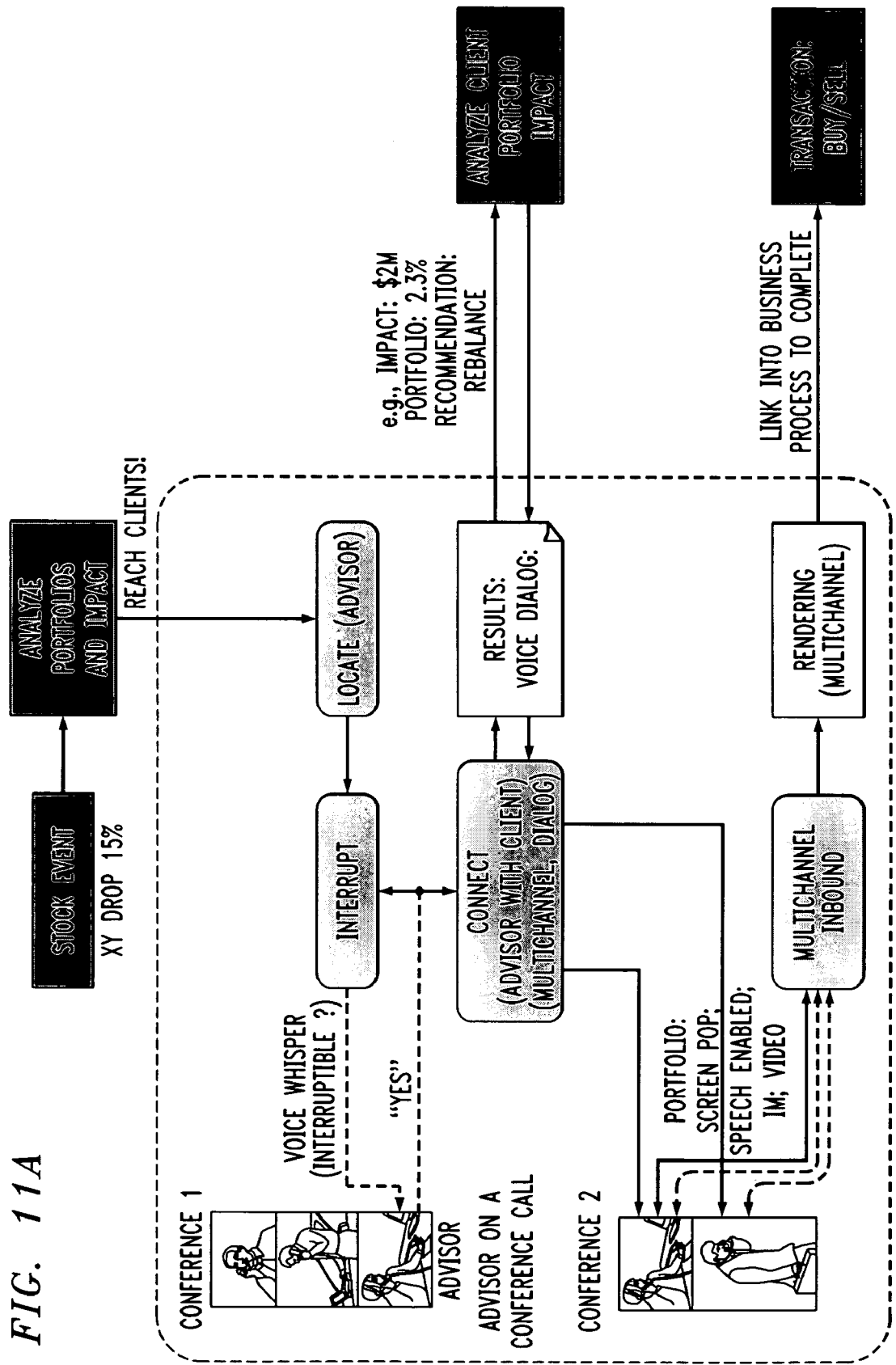
FIGS. 11 through 41 illustrate embodiments of the invention in the form of exemplary use case scenarios of business processes incorporating communications services.
Figure 11B:
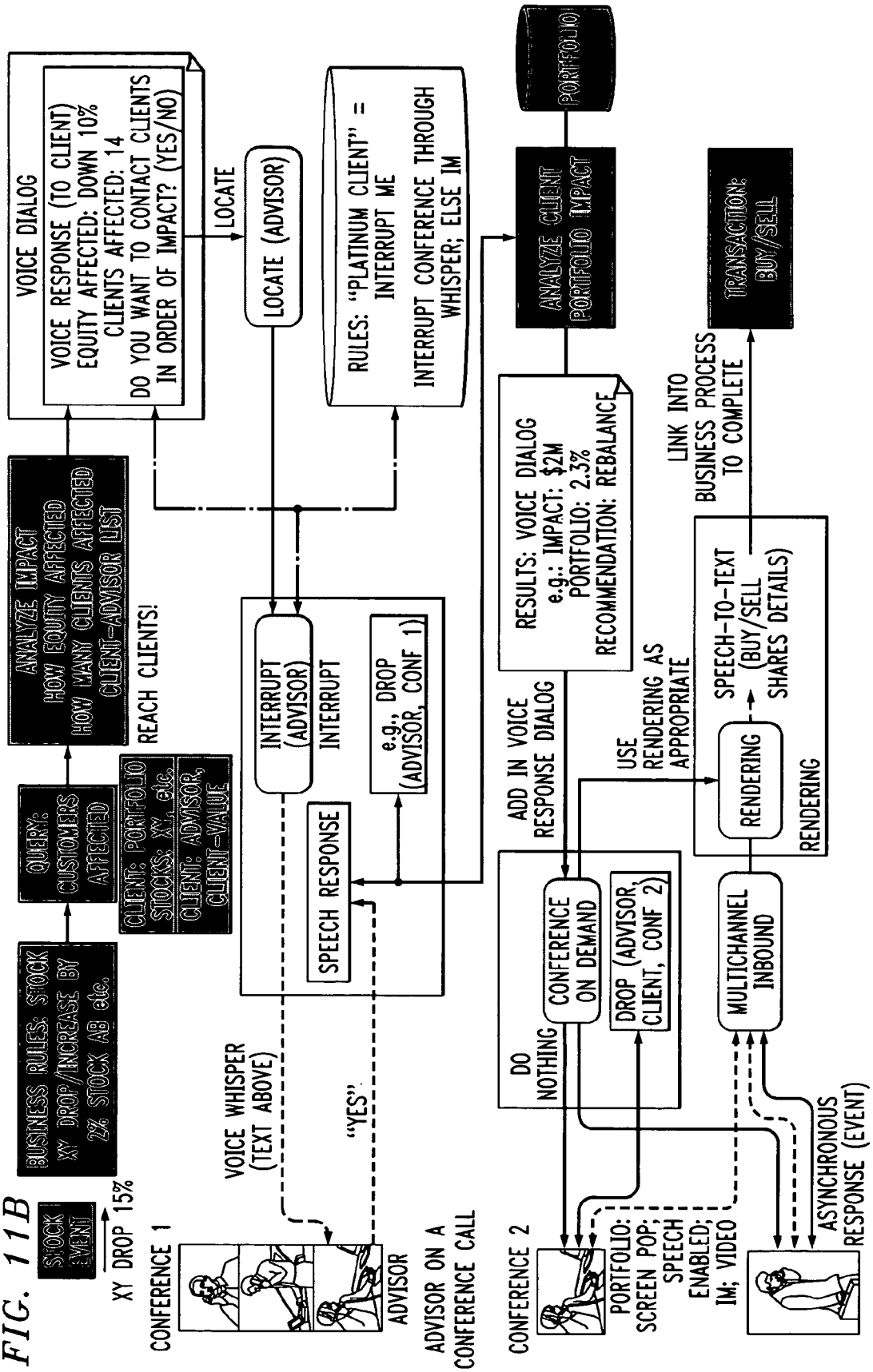

FIGS. 11A and 11B show respective composite level and more detailed views of a family portfolio investment process flow.

Figure 12:
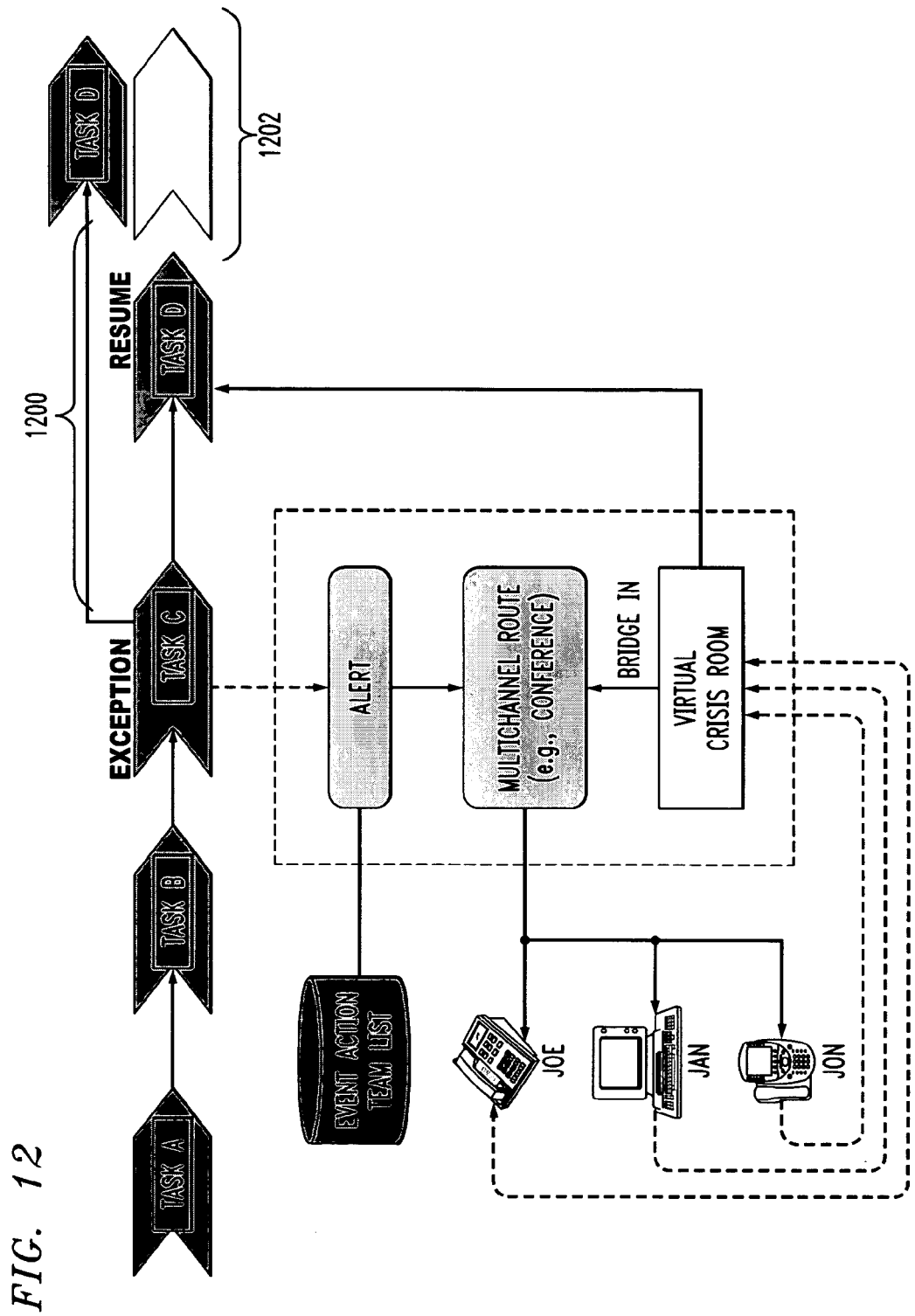

FIG. 12 shows process task flow exception handling involving use of the Alert and Multichannel Route composite services. The upper bracket 1200 represents the built-in human latency typically associated with presence of the exception, and the lower bracket 1202 represents the improvement achievable, in terms of a reduction in latency, using communications services in accordance with the invention. In this process, the Alert and Multichannel Route composite services are utilized to convene a virtual crisis room, comprising a conference between relevant team members Joe, Jan and Jon, where the problem is discussed and resolved.

Figure 13A:
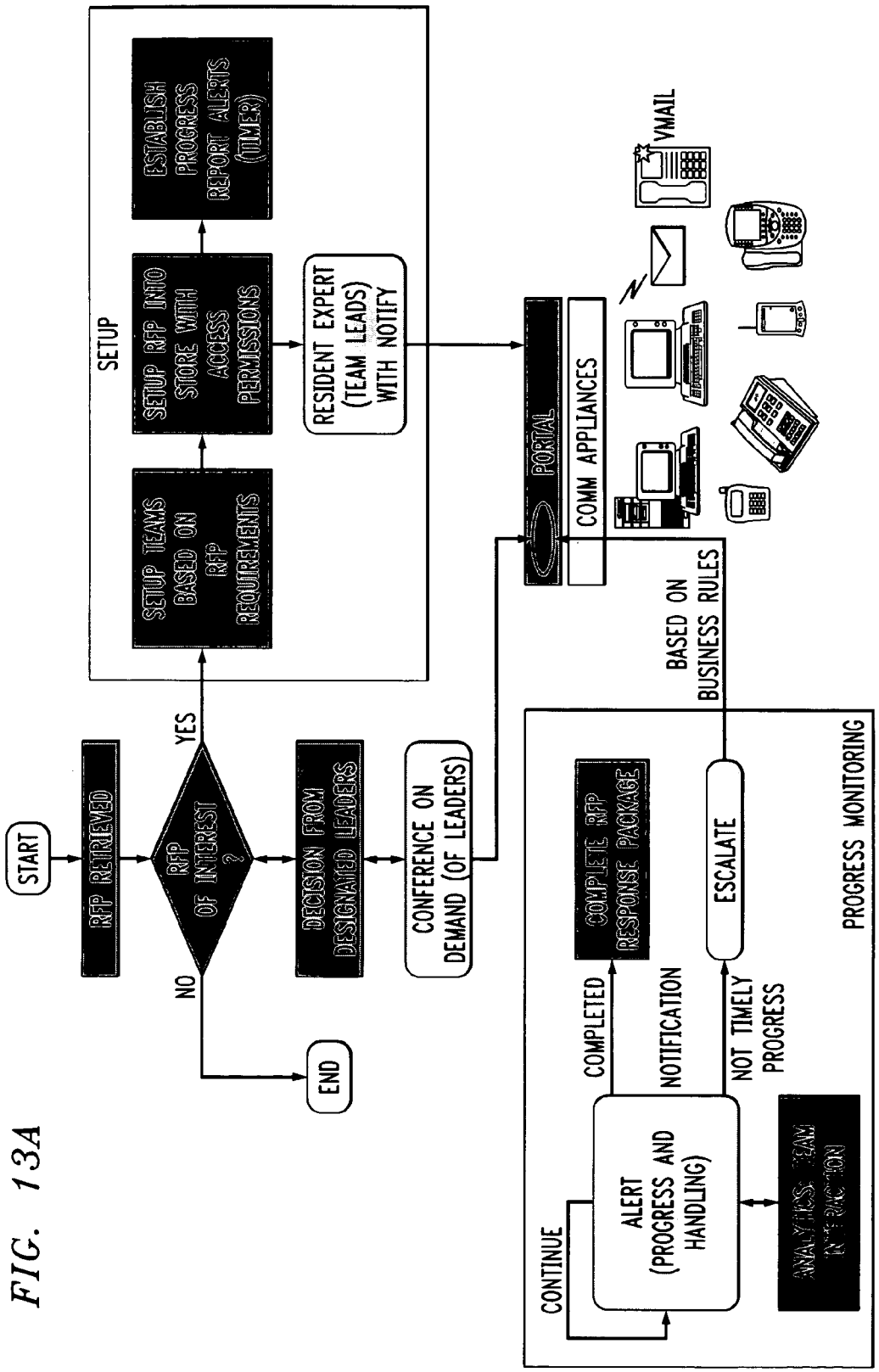
Figure 13B:
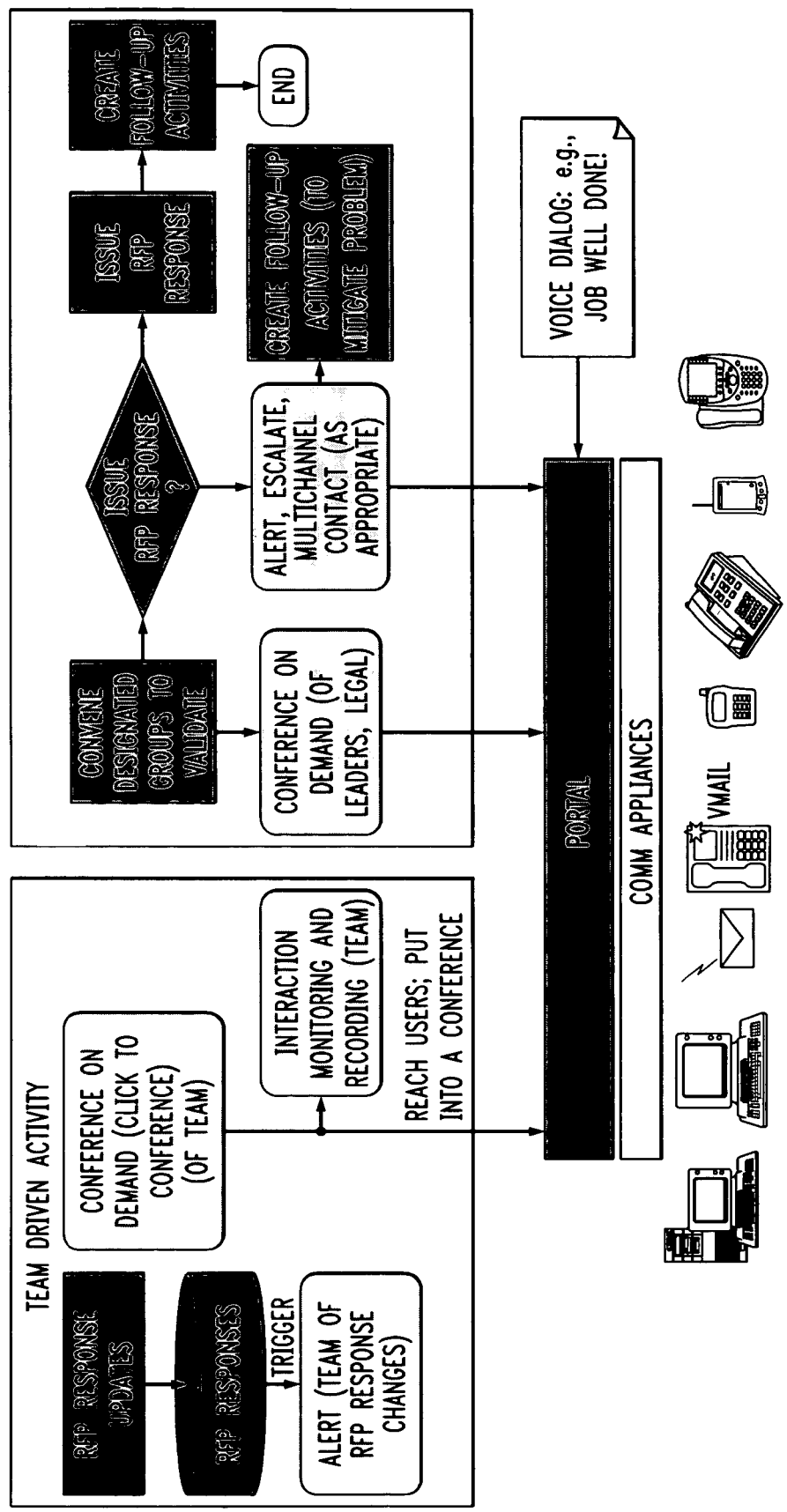

FIGS. 13A and 13B show a Request for Proposal (RFP) process flow.

Figure 14:
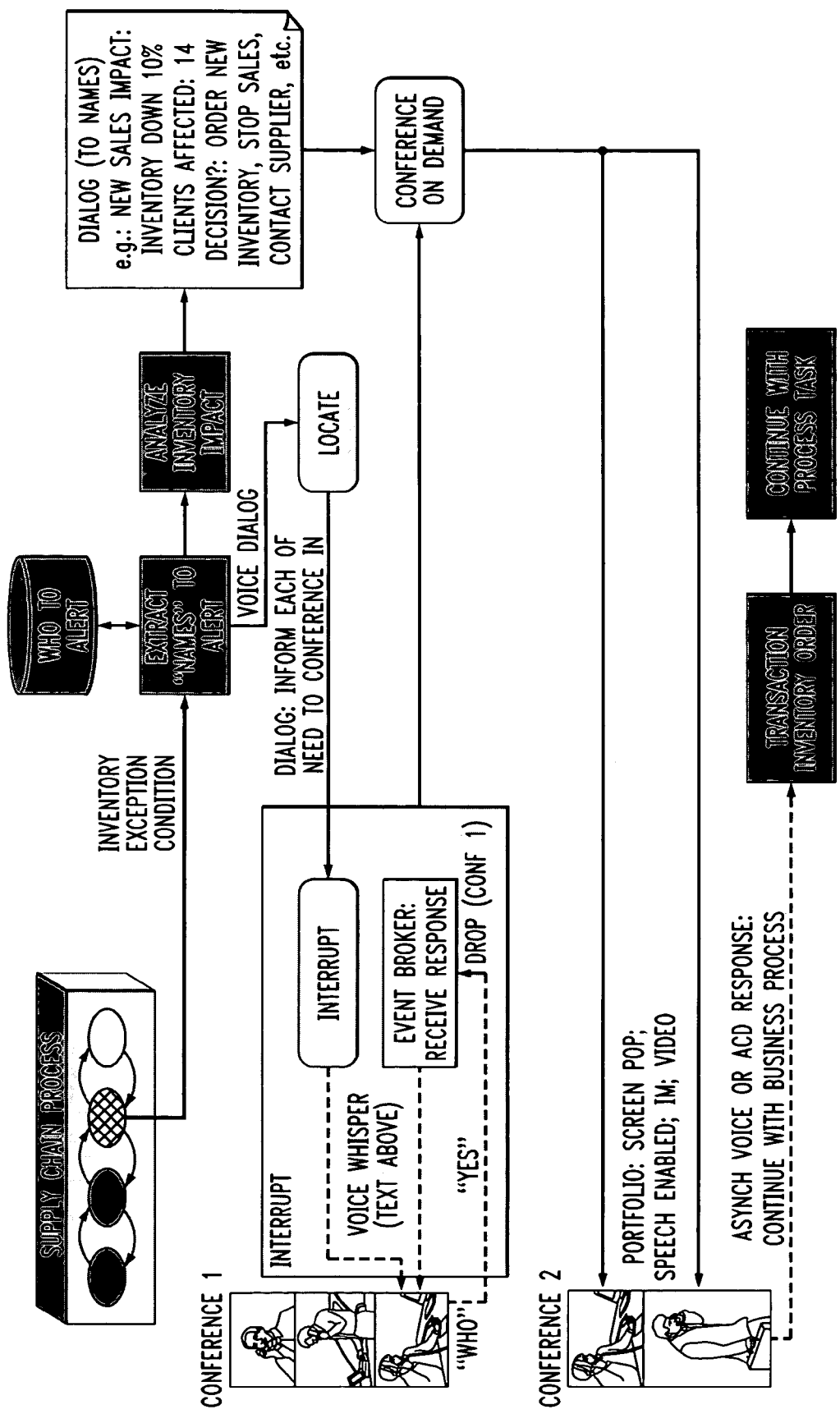

FIG. 14 shows an inventory exception process flow.

Figure 15A:
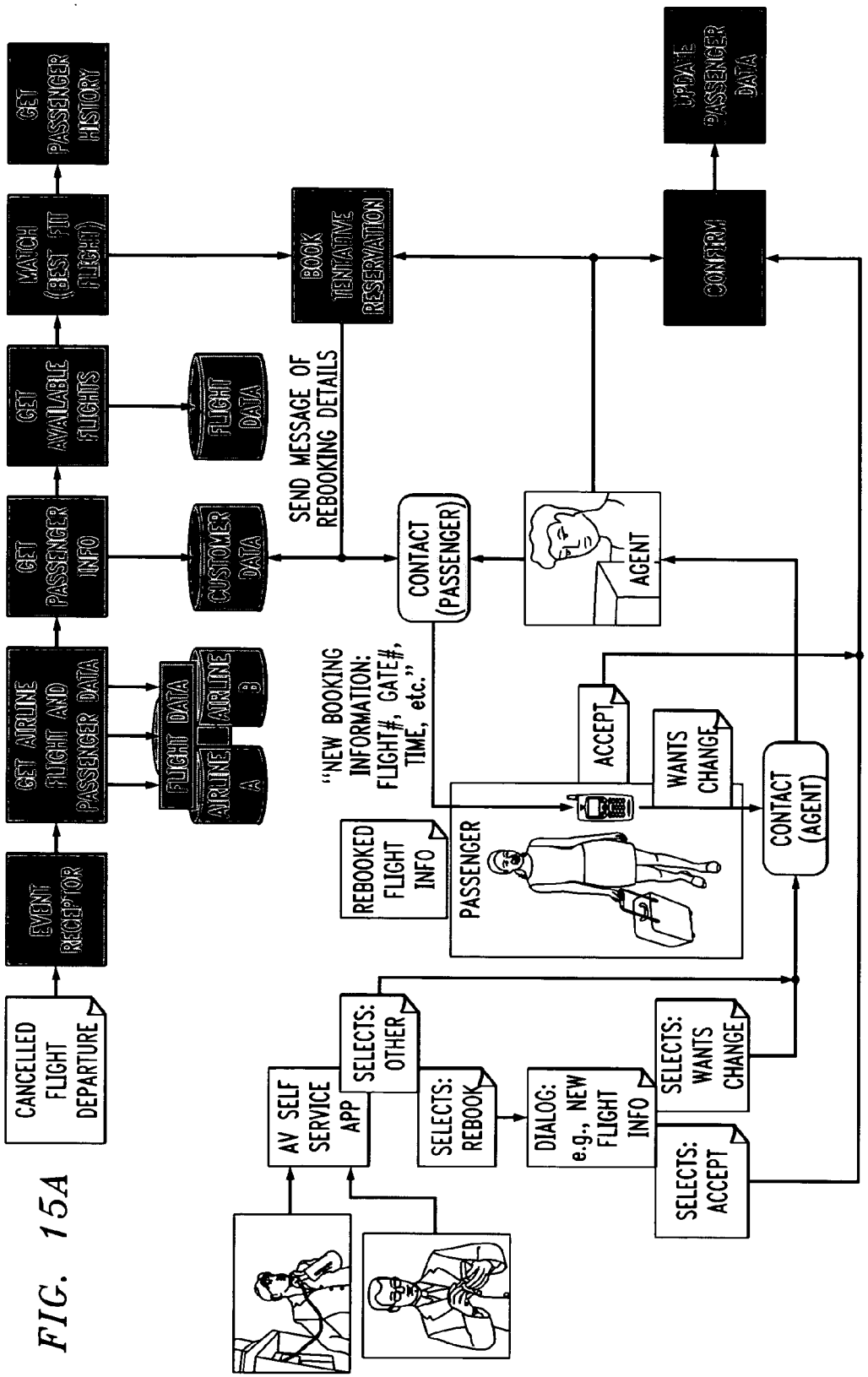
Figure 15B:
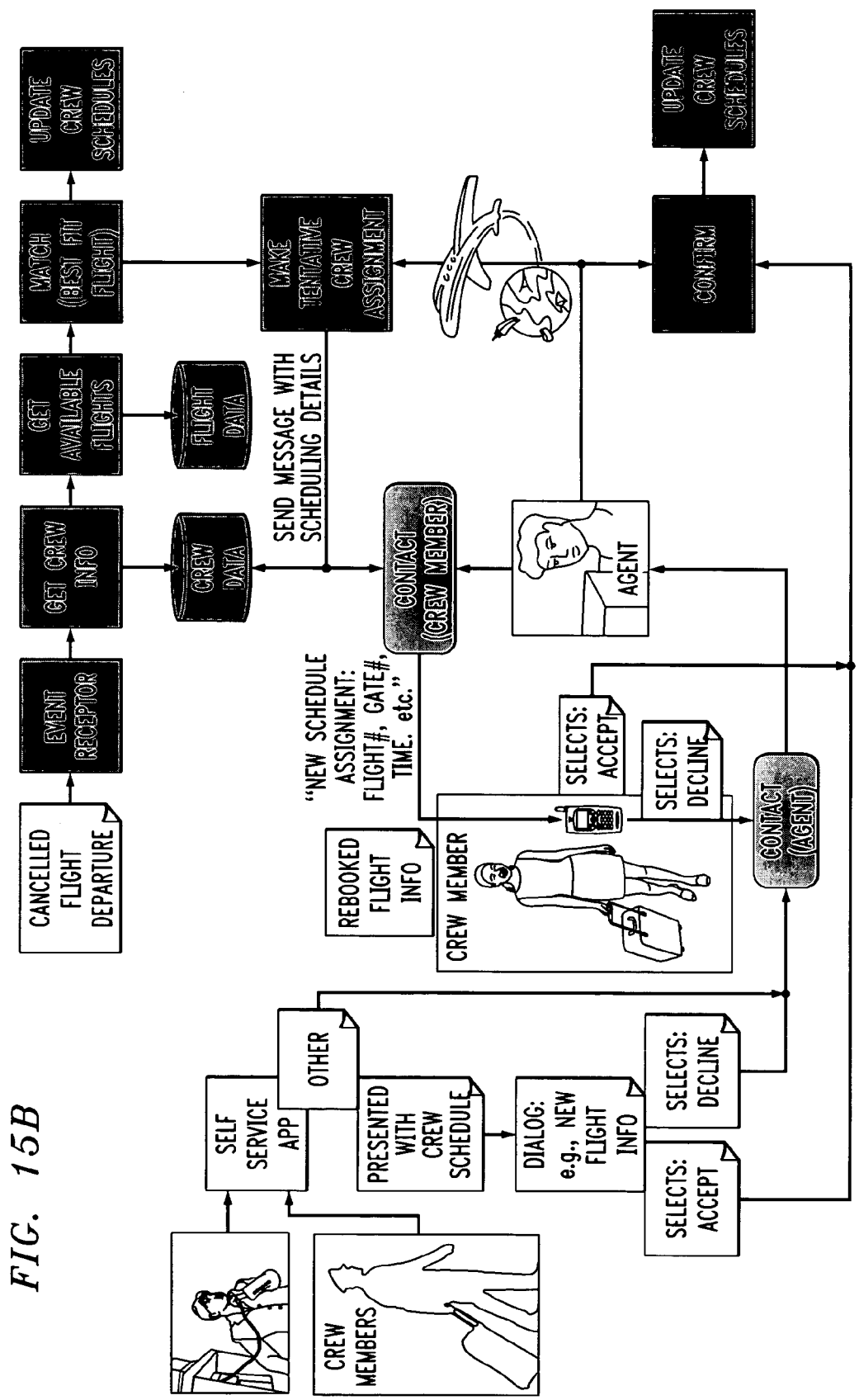

FIGS. 15A and 15B show examples of respective airline passenger rebooking and flight crew rescheduling process flows, responsive to a flight delay or cancellation.

Figure 16:
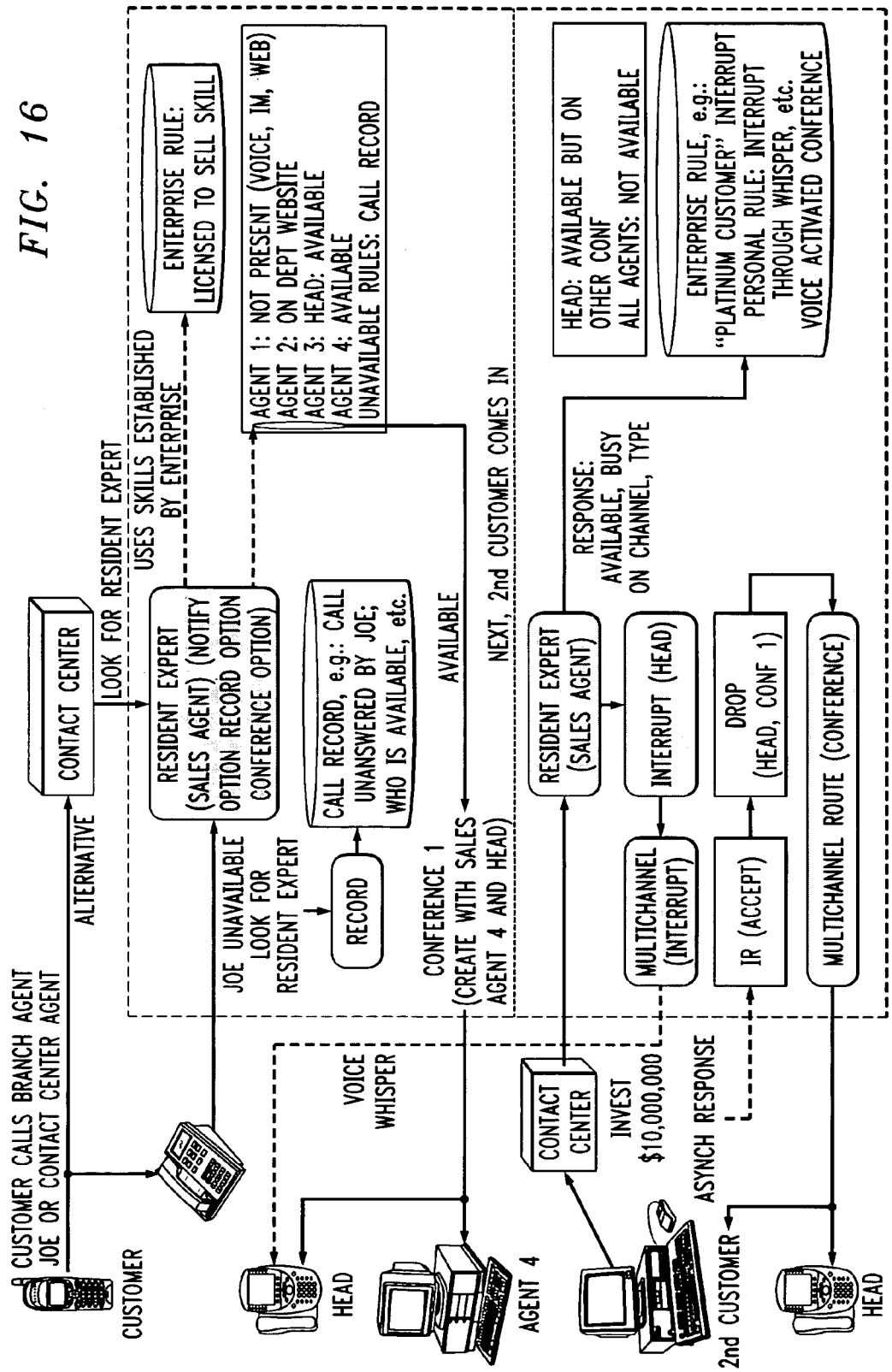

FIG. 16 shows a branch office resident expert use process flow.

Figure 17:
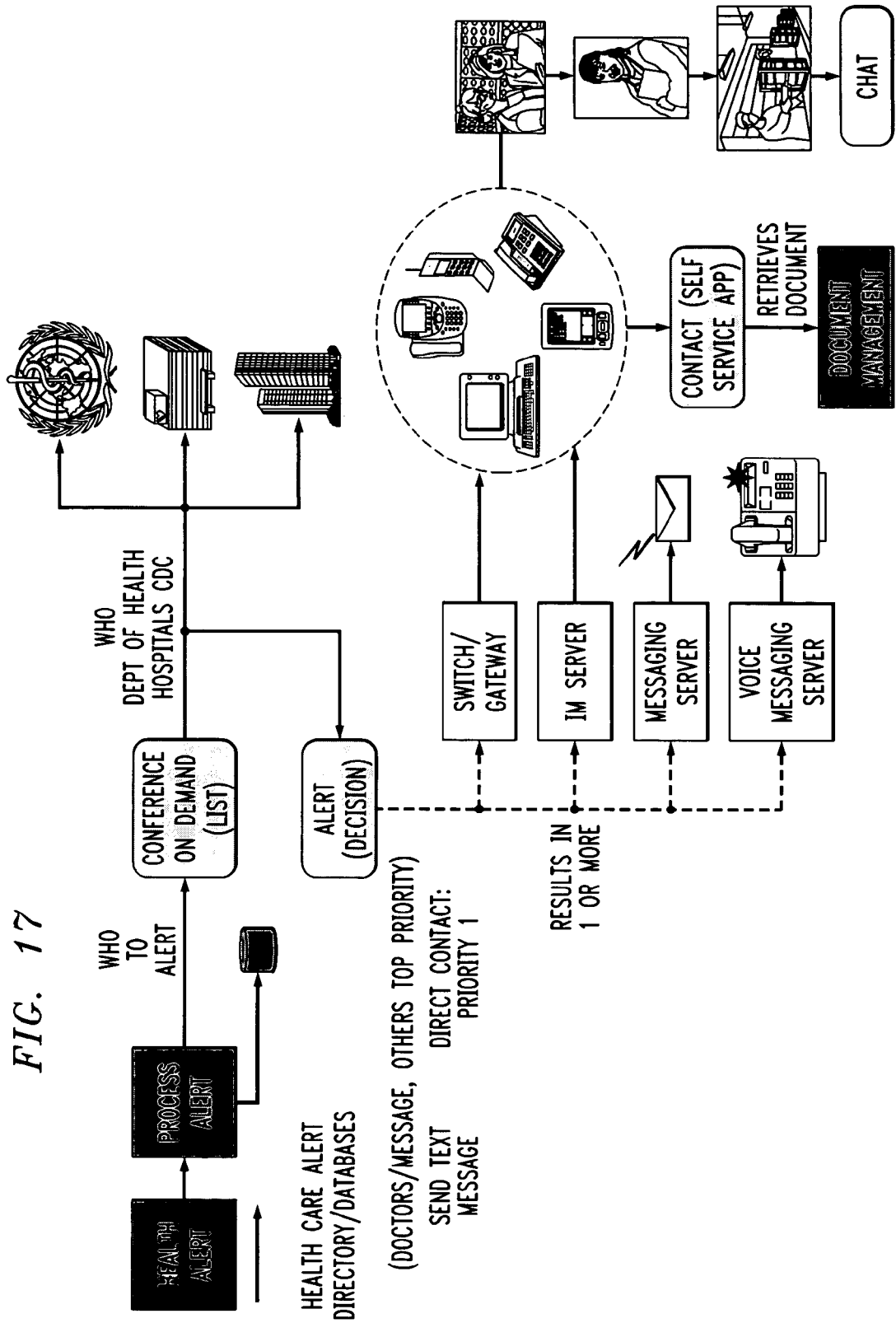

FIG. 17 shows a health care alert process flow.

Figure 18:
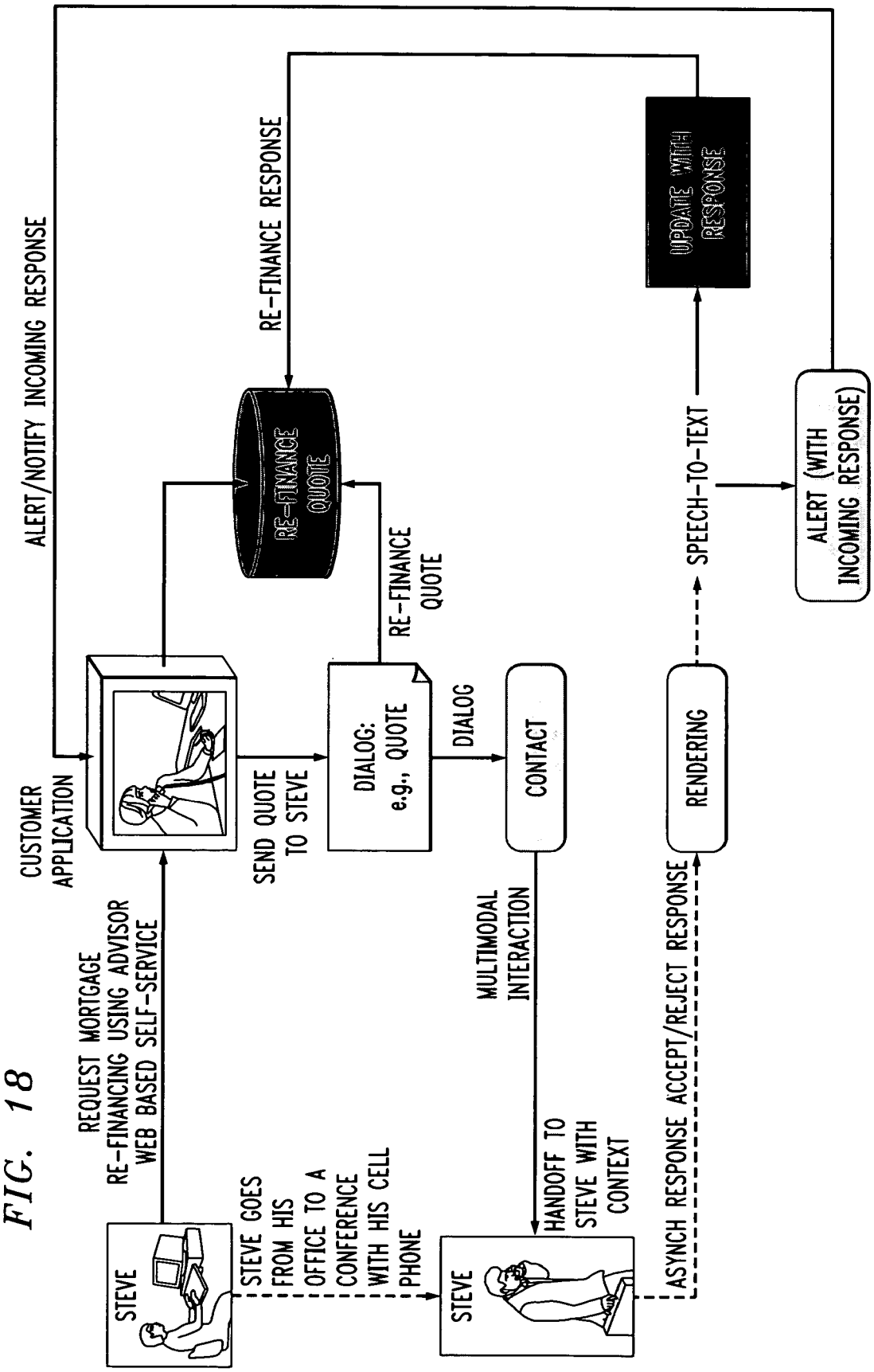

FIG. 18 shows a refinancing process flow.

Figure 19:
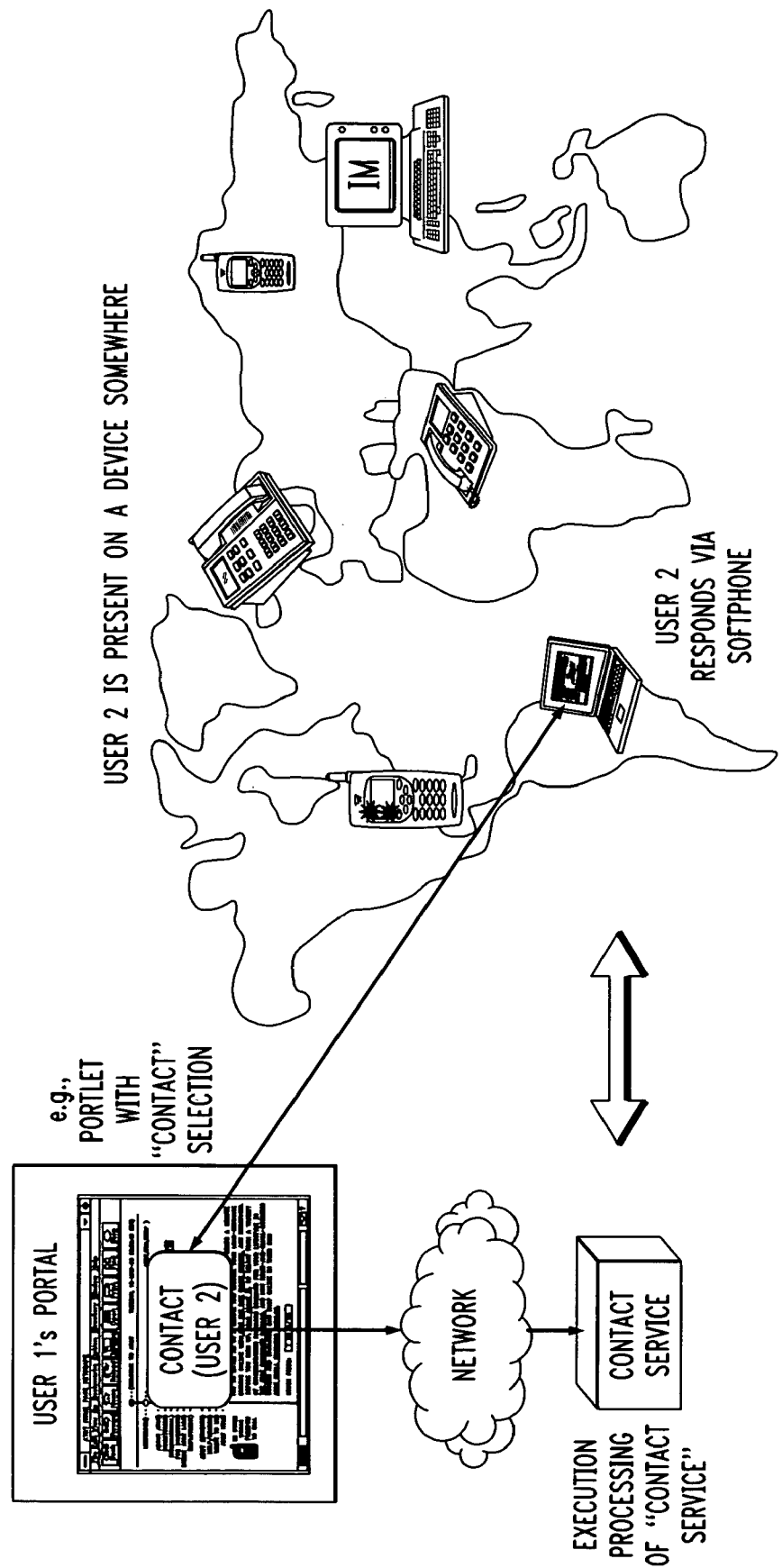

FIG. 19 shows a global reach process flow. In this example, User 1 selects the Contact service from their portal. The Contact service receives a request to contact User 2 on any device, in any location. The address of User 2 is determined, and then based on this address the presence of User 2 is determined. If User 2 is unavailable, a message is sent that User 1 is trying to contact him. If User 2 is available, User 1 can speak the message, e.g., via a speech-enabled portal, which User 2 will hear. Alternatively, if User 2 is available, User 1 can enter a text message. The text will be converted to speech for User 2 to hear.

Figure 20:
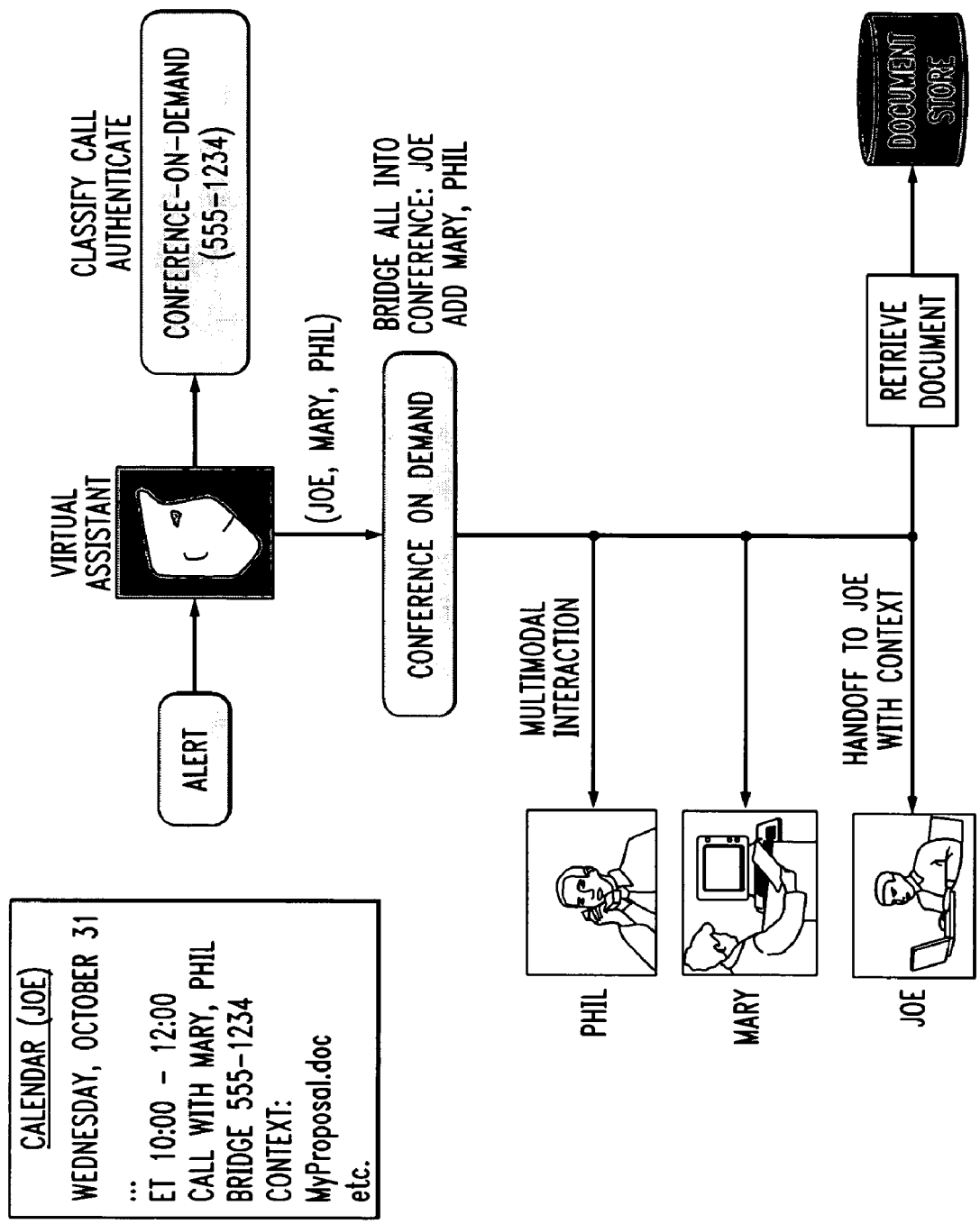

FIG. 20 shows a calendar generated conference process flow.

Figure 21:
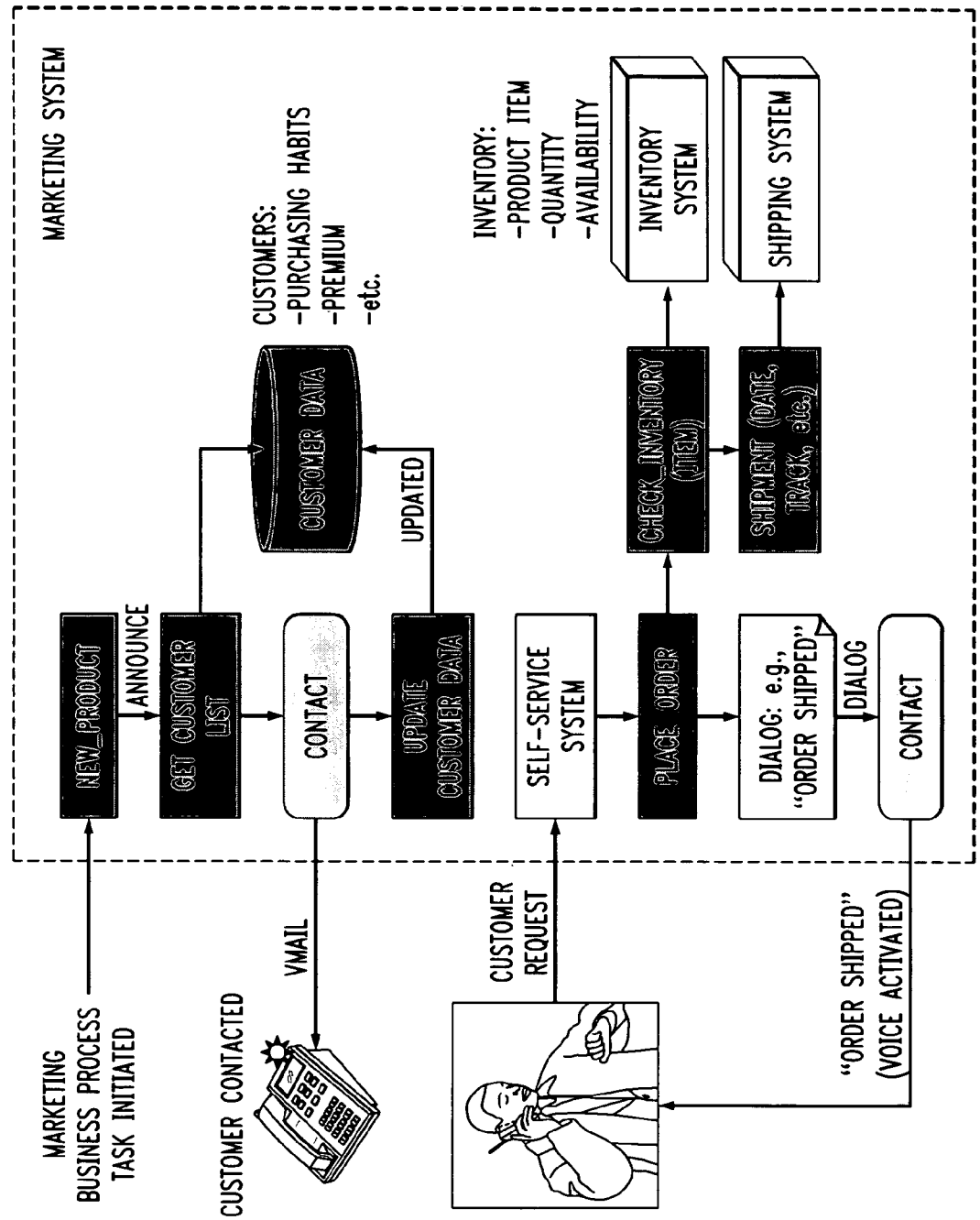

FIG. 21 shows a new product announcement process flow.

Figure 22:
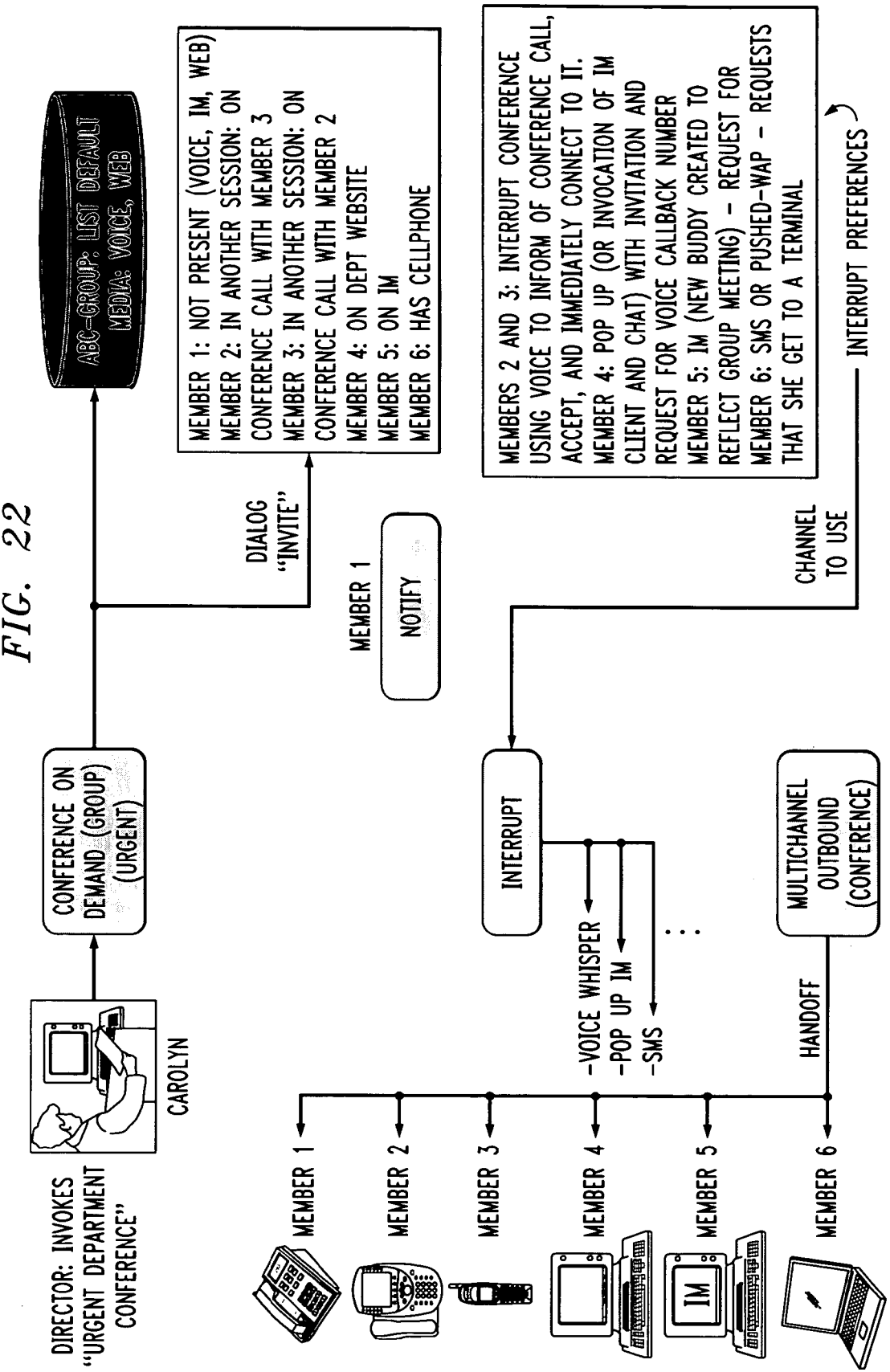

FIG. 22 shows an on demand conferencing and interrupt process flow.

Figure 23:
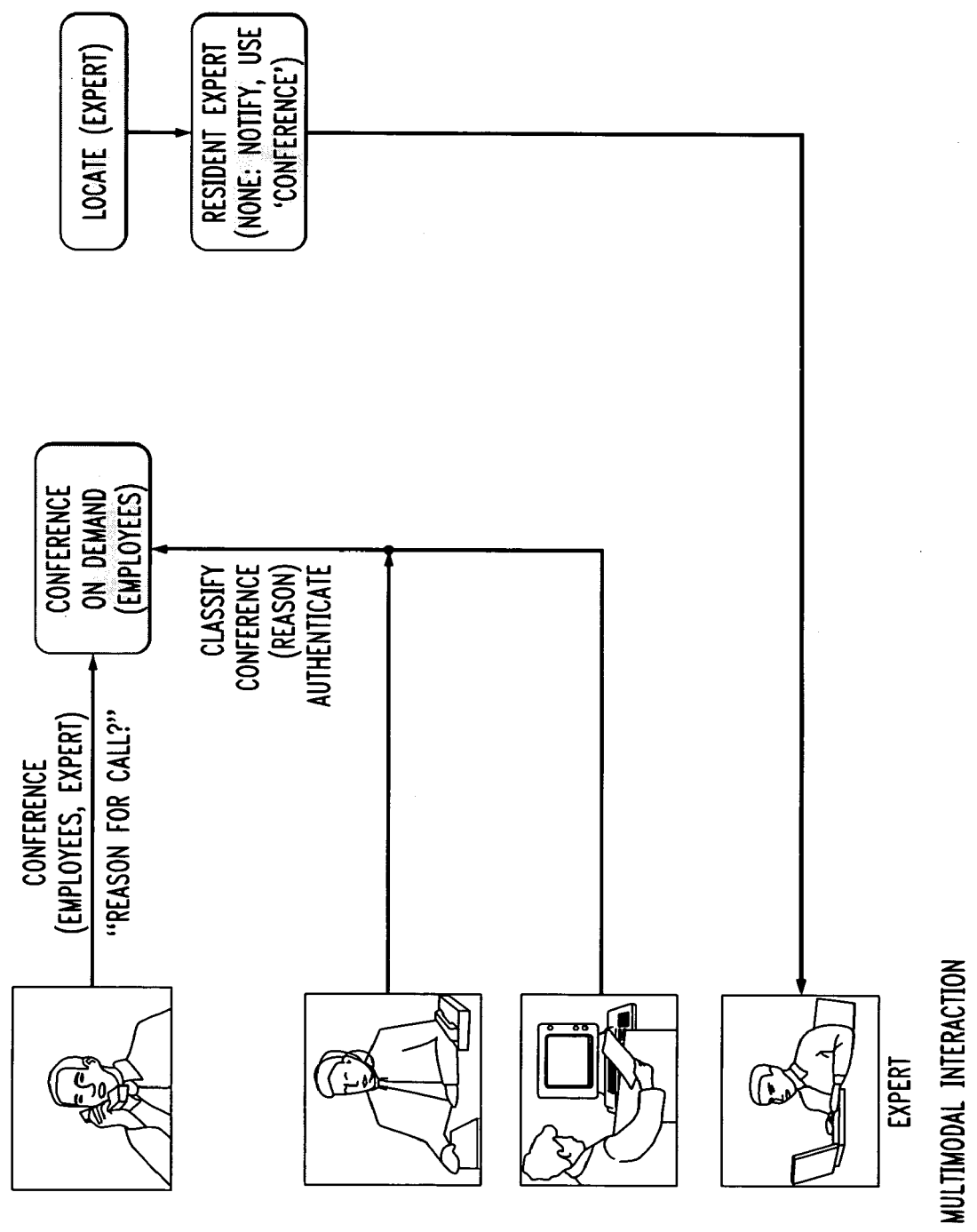

FIG. 23 shows a process flow for helping enterprises unlock their potential by providing conferencing of certain employees and experts across any channel.

Figure 24:
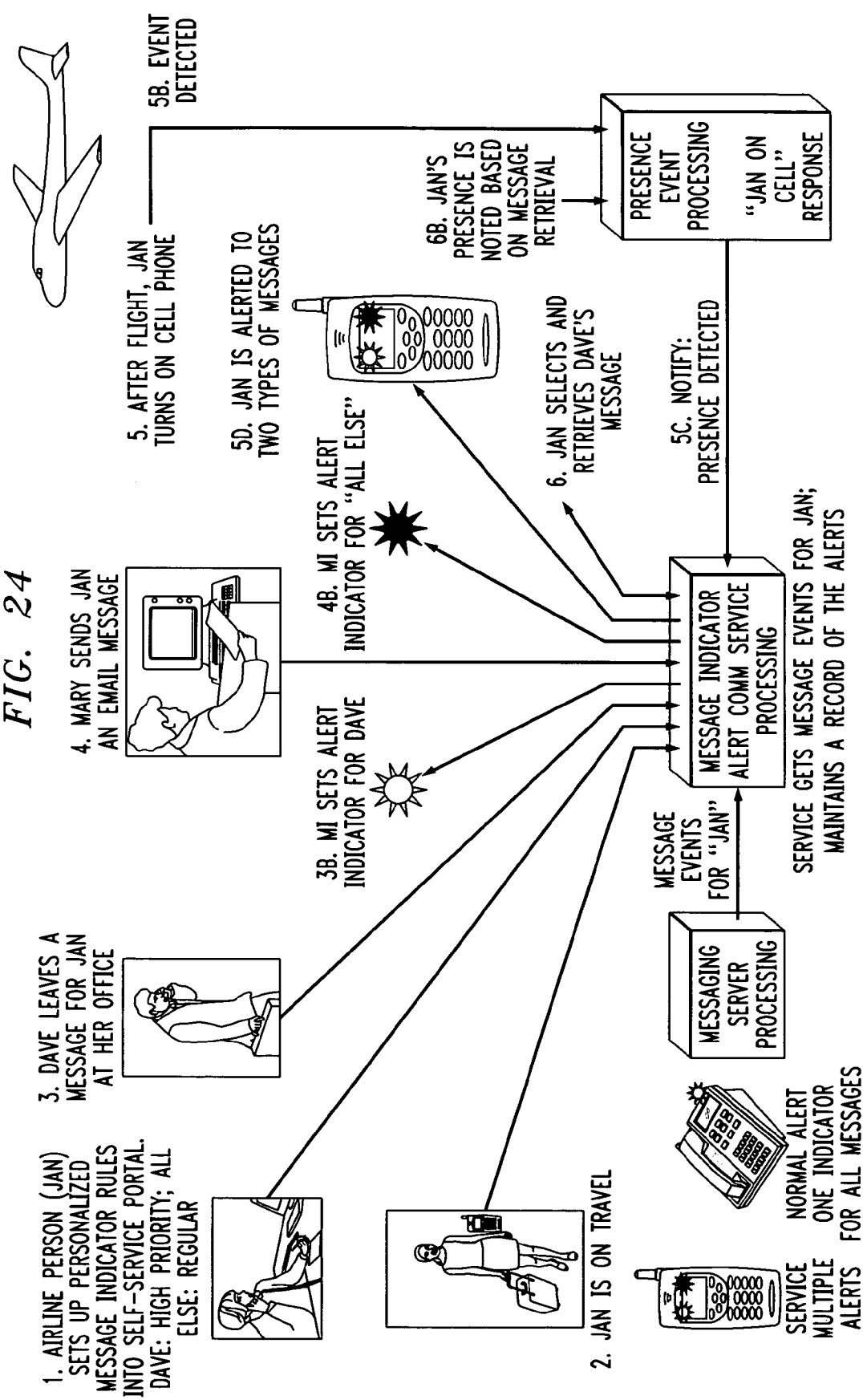

FIG. 24 shows a message indicator, alert and presence process flow.

Figure 25:
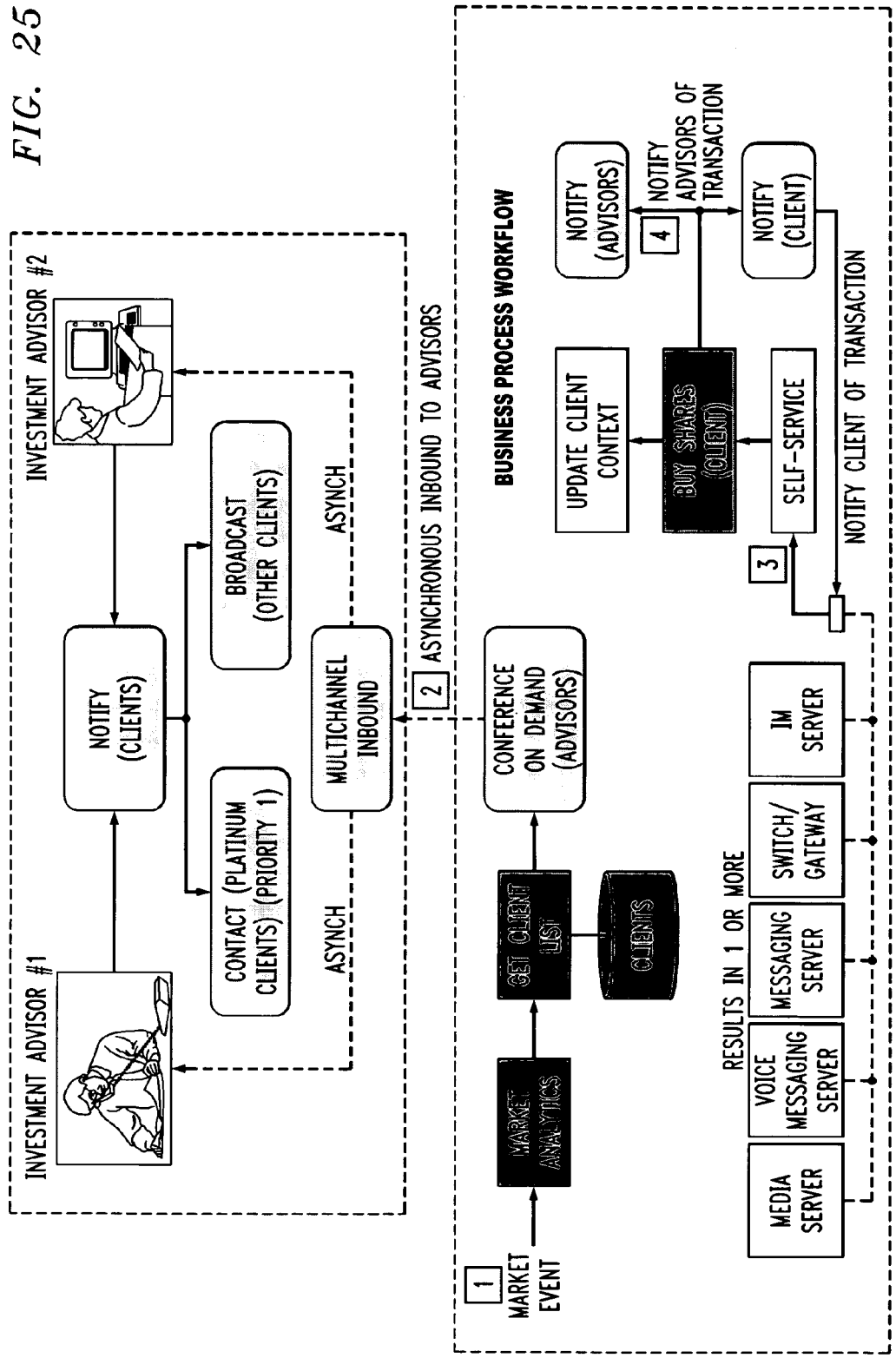

FIG. 25 shows a process flow corresponding to a market event in an investment firm.

Figure 26:
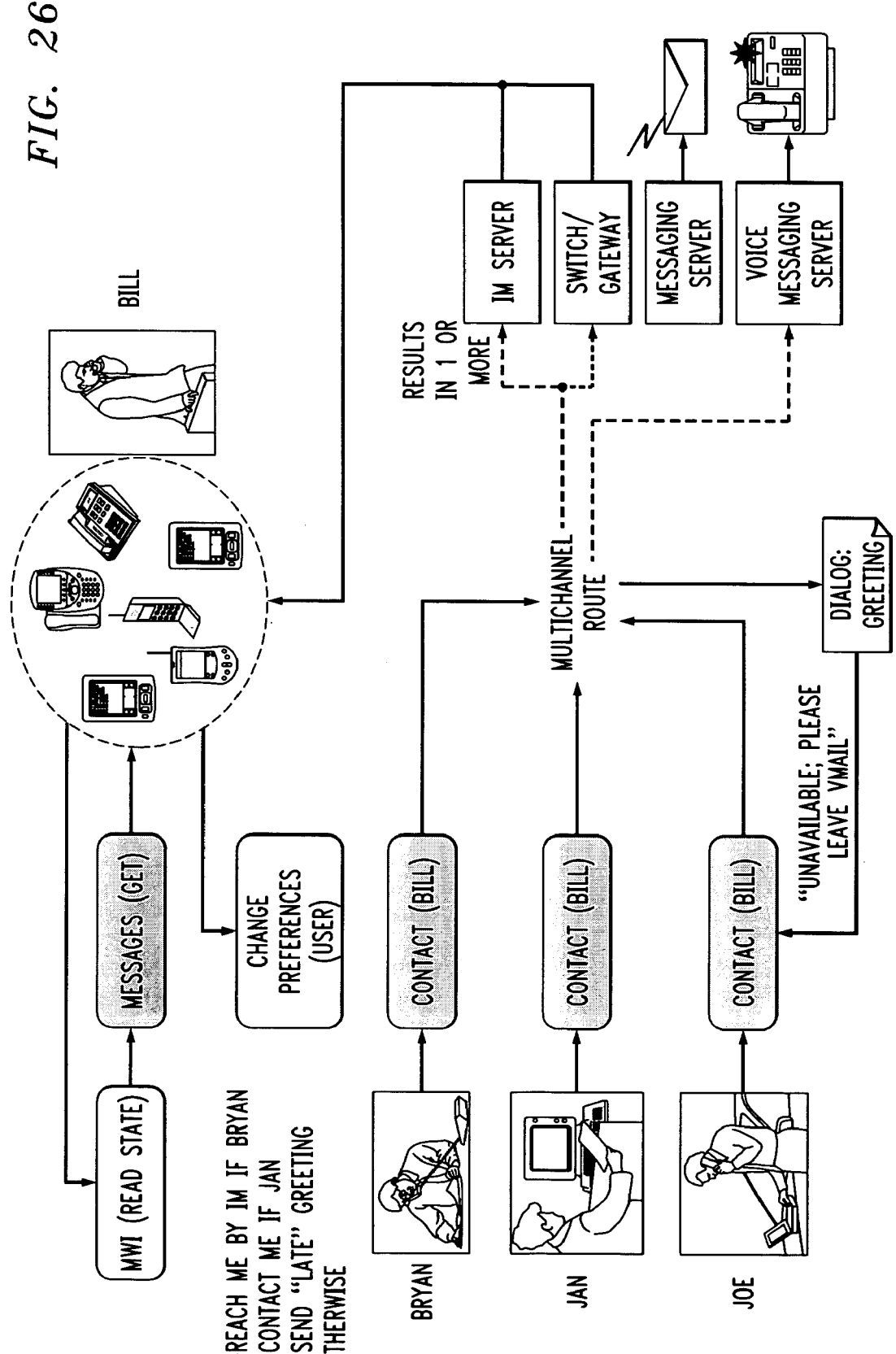

FIG. 26 shows a mobile salesperson and sales force automation process flow.

Figure 27:
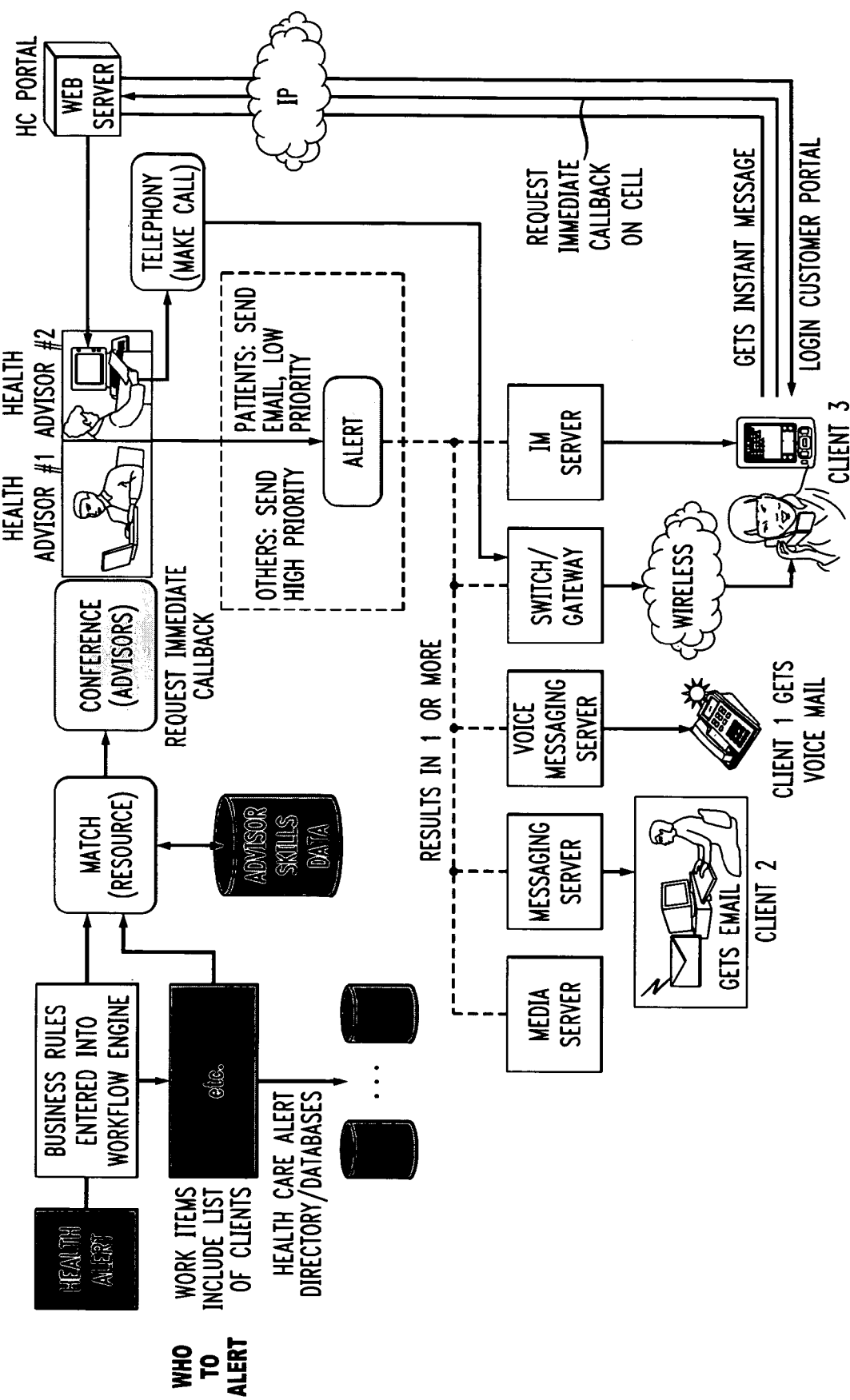

FIG. 27 shows a health care advisory process flow.

Figure 28:
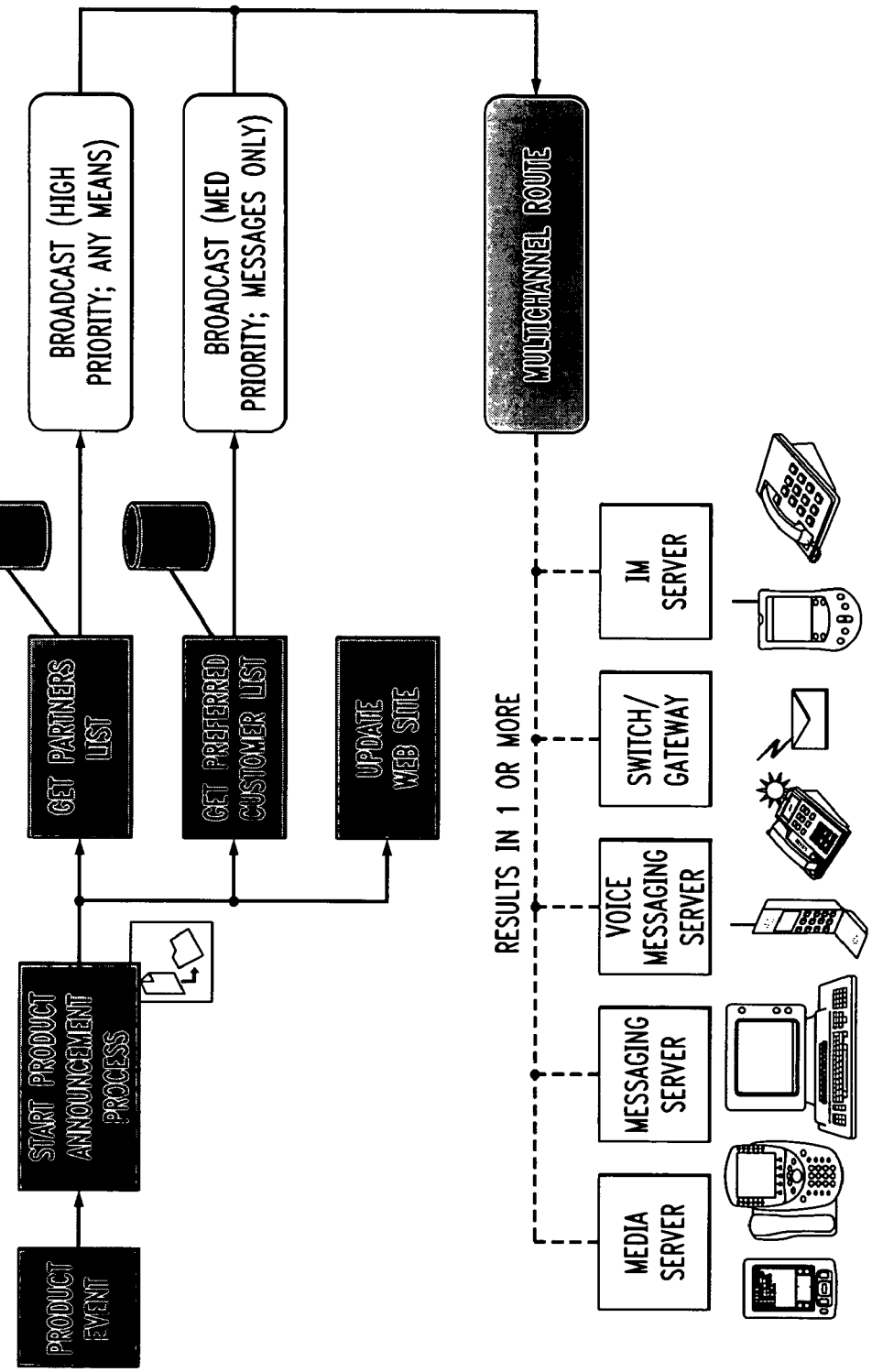

FIG. 28 shows another new product announcement process flow.

Figure 29:
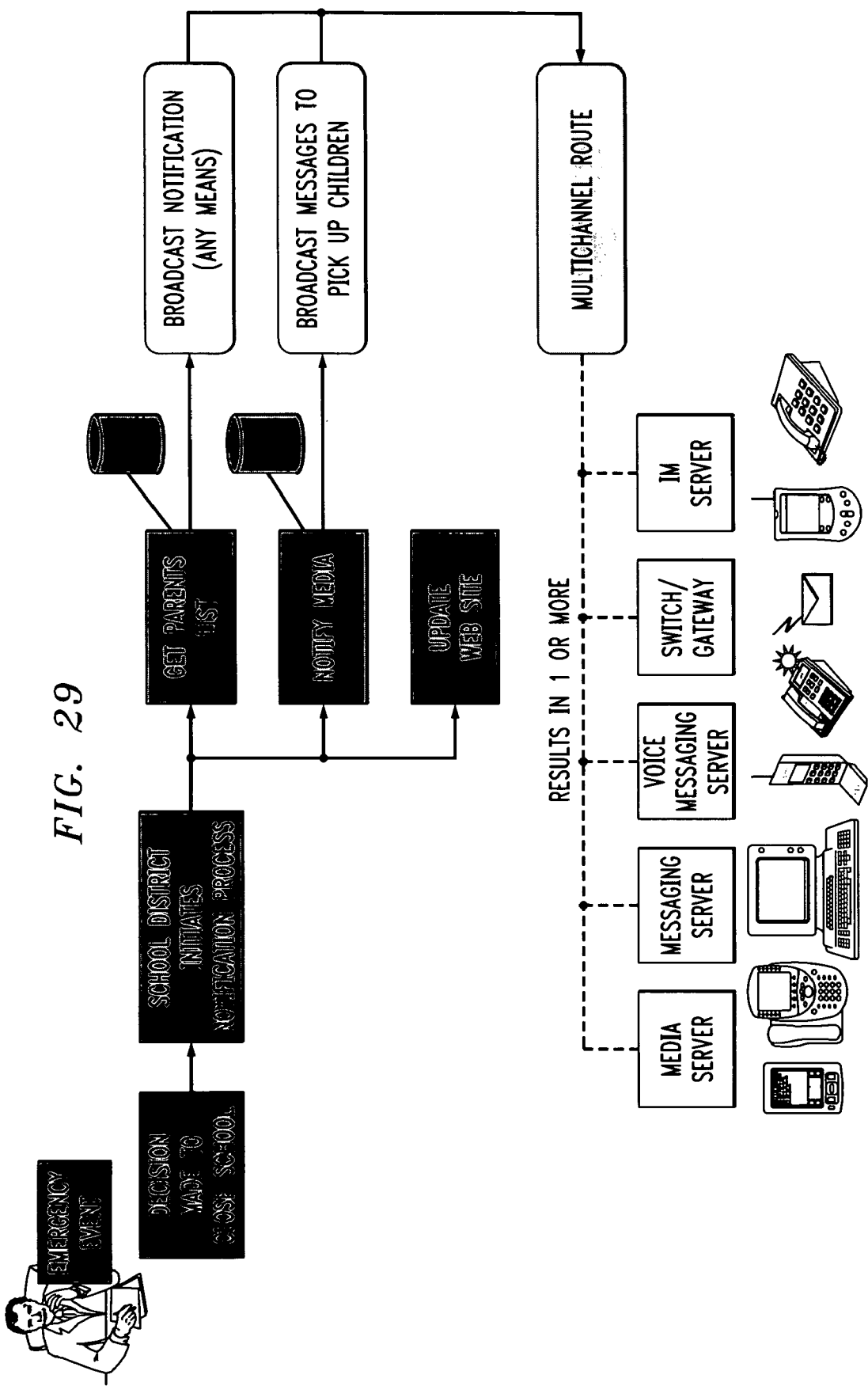

FIG. 29 shows a school closing notification process flow.

Figure 30:
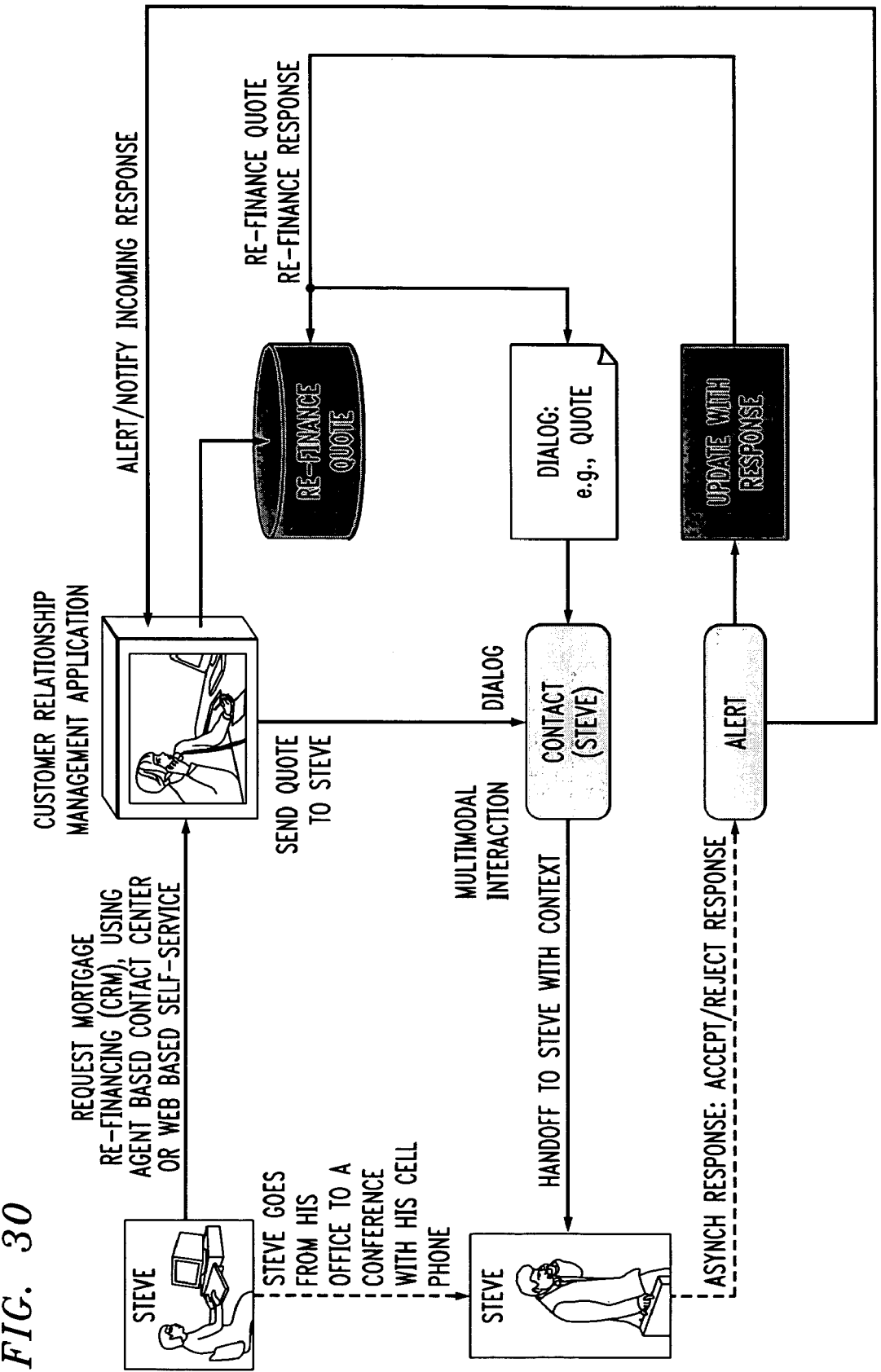

FIG. 30 shows a CRM process flow.

Figure 31:
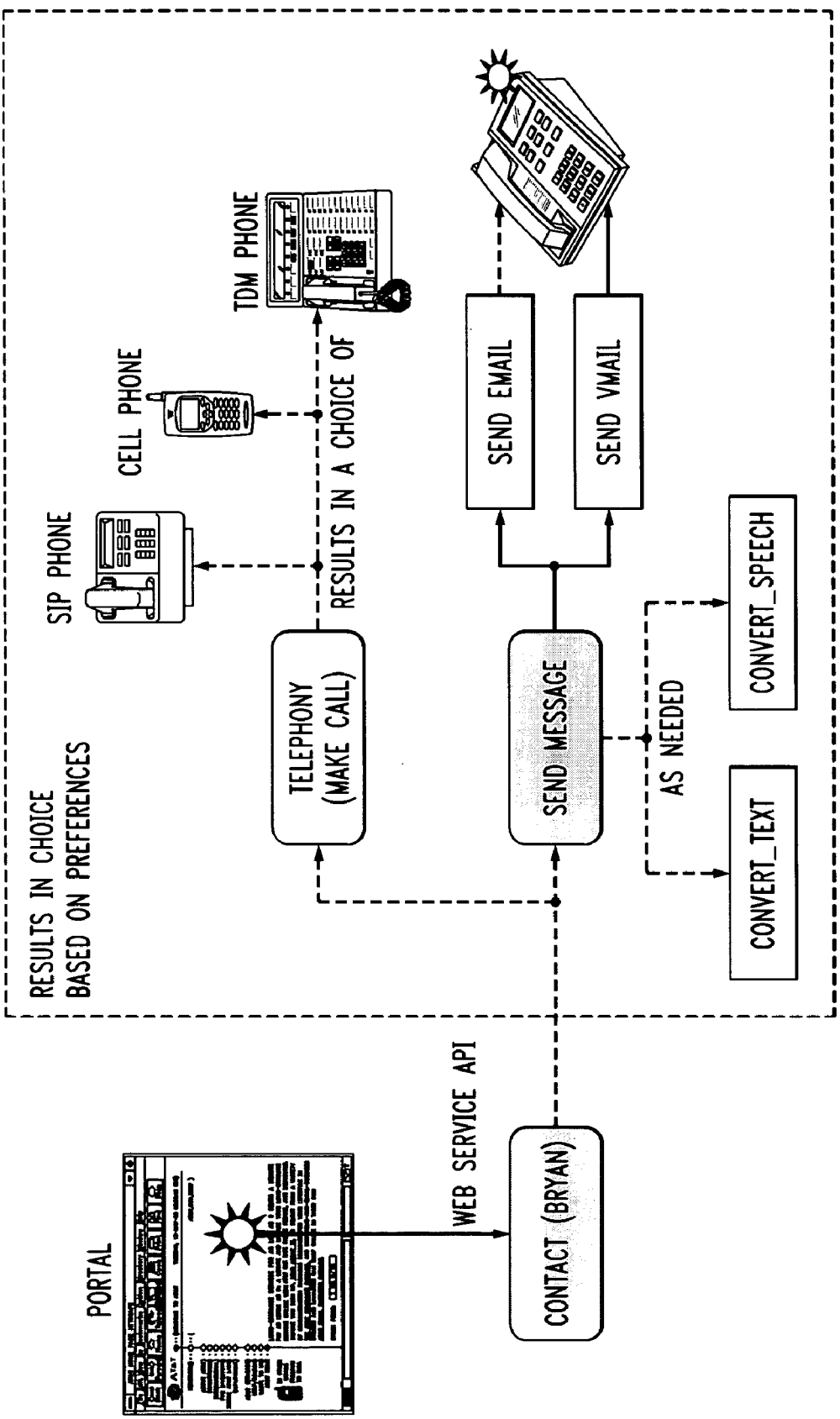

FIG. 31 shows another sales force automation process flow.

Figure 32:
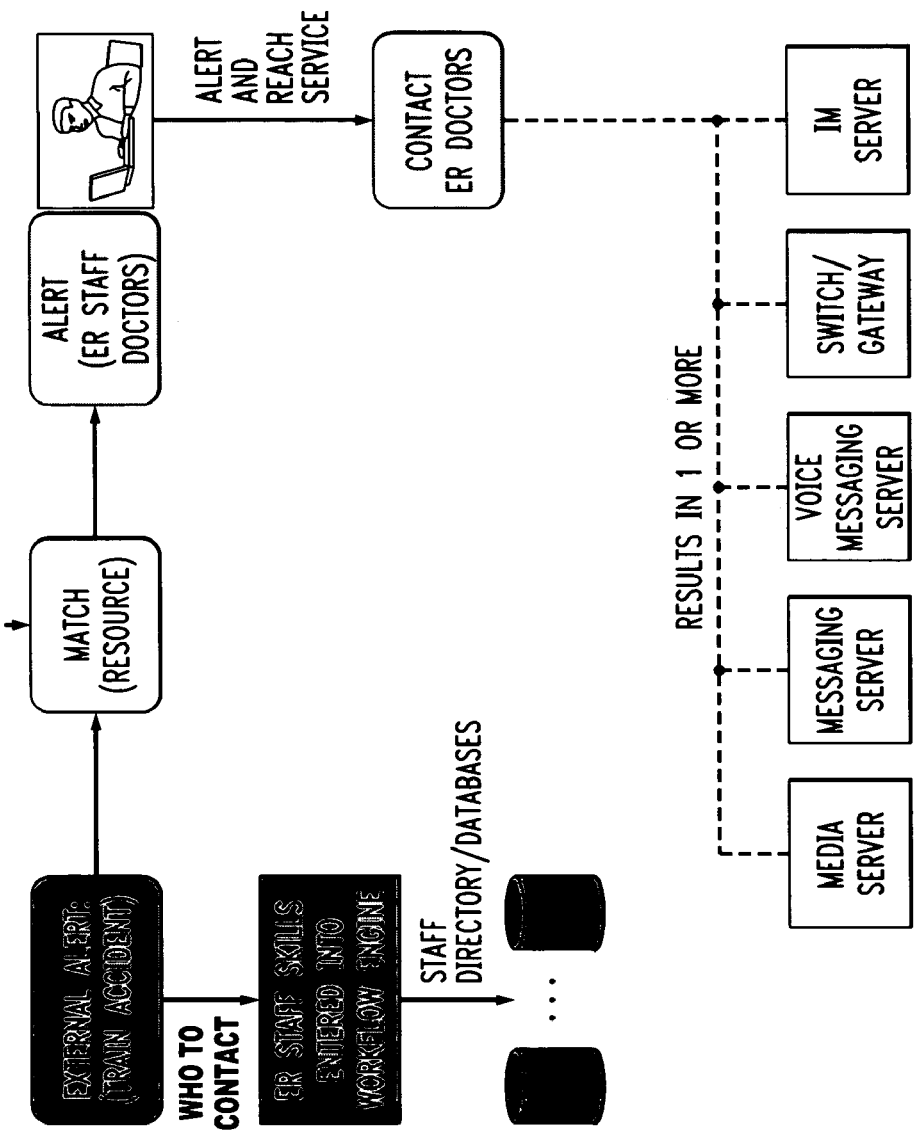

FIG. 32 shows a process flow corresponding to a medical clinic request to find certain doctors.

Figure 33:
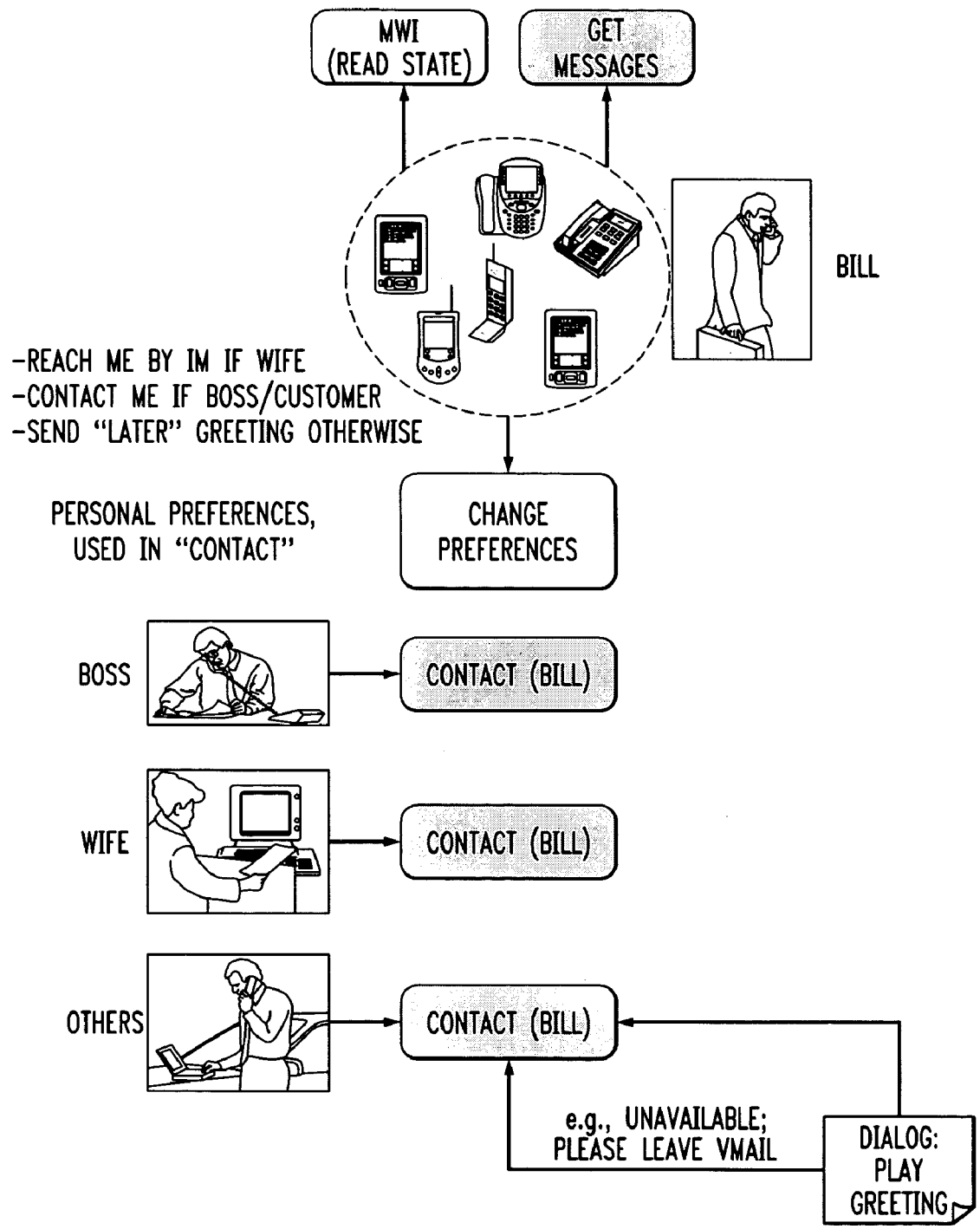

FIG. 33 shows a high technology mobile technical support process flow.

Figure 34:
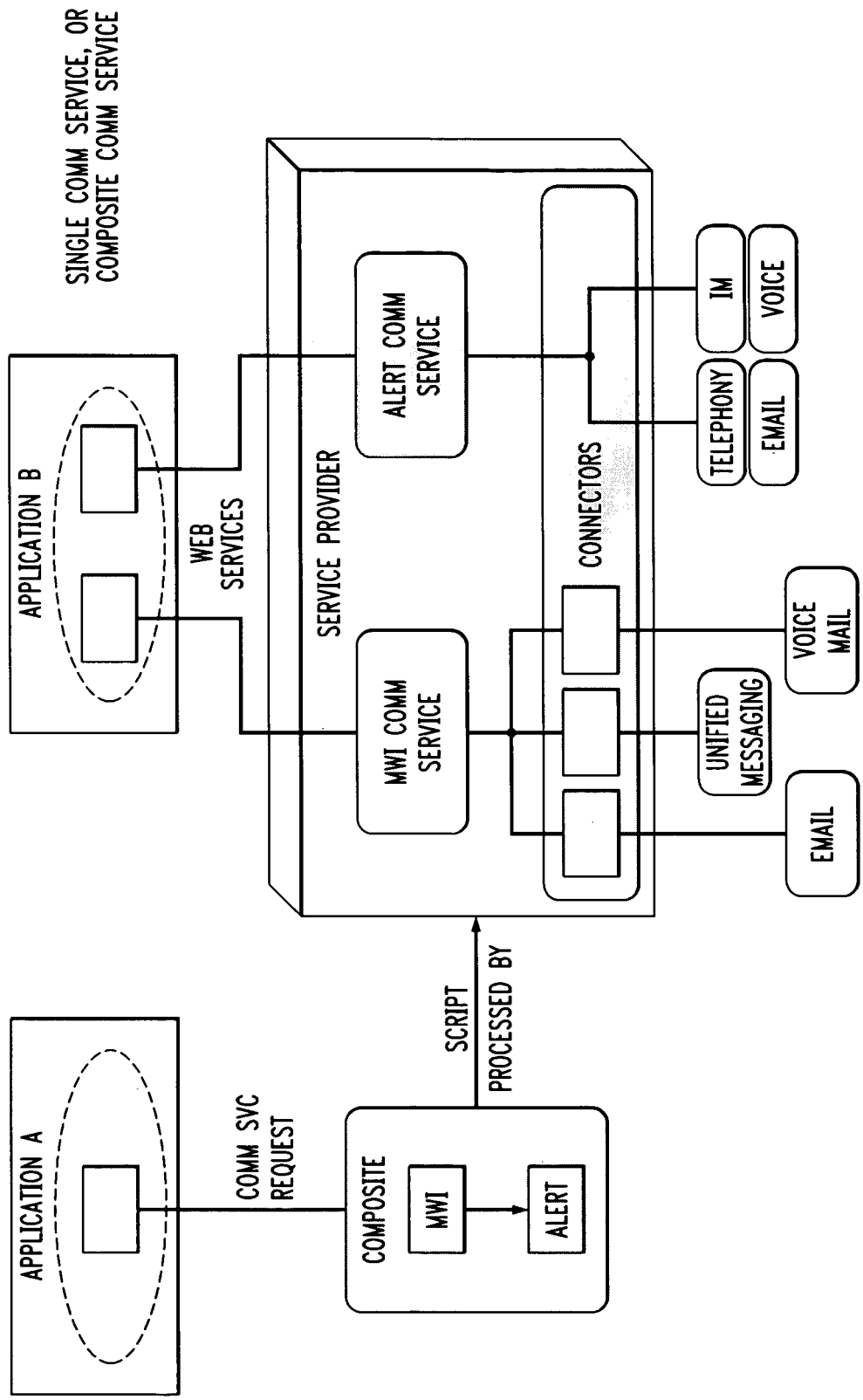

FIG. 34 shows a process flow comprising a message waiting indicator and alert as composite communications services.

Figure 35:
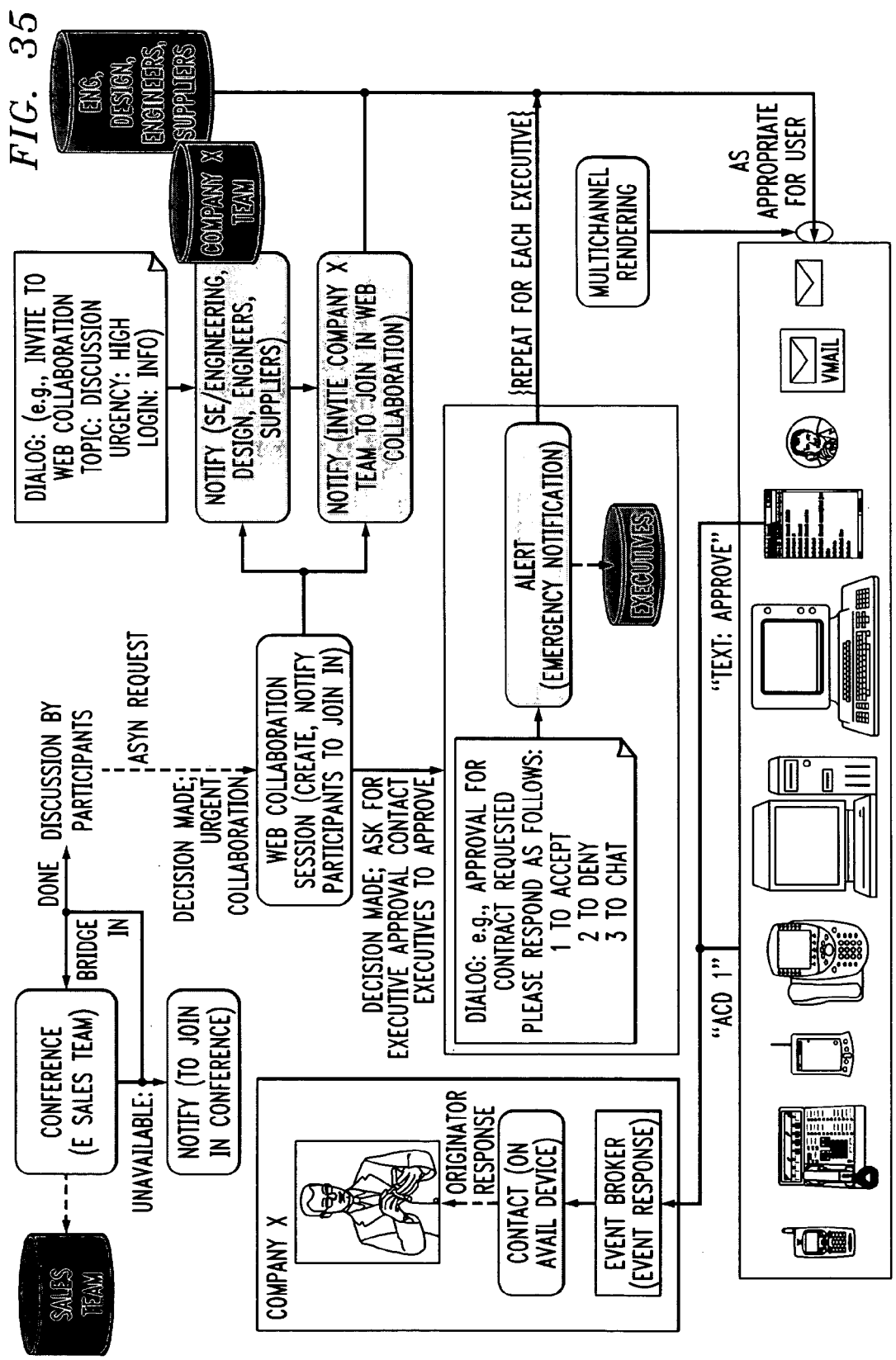

FIG. 35 shows a process flow for convening decision makers.

Figure 36:
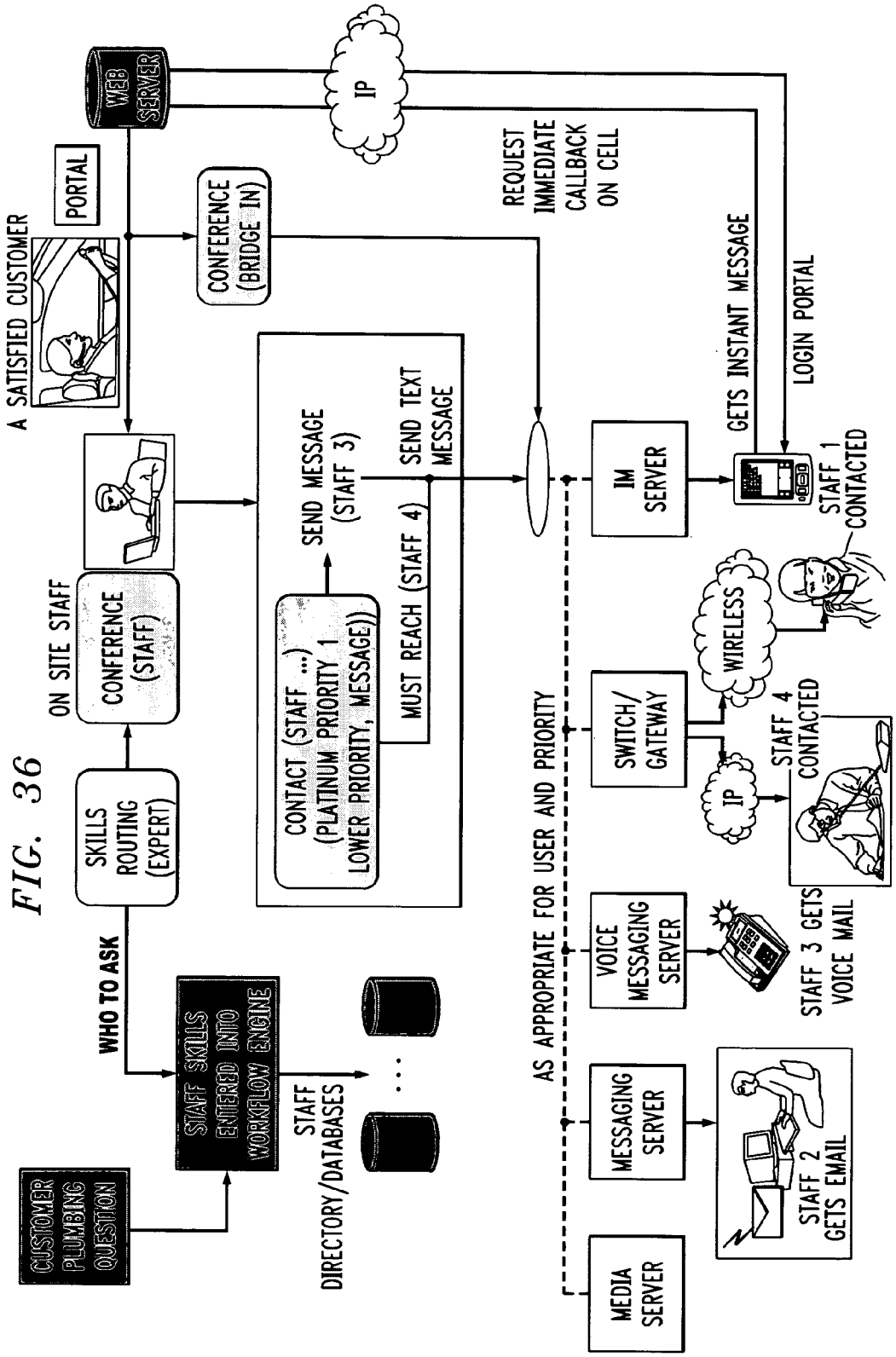

FIG. 36 shows another resident expert process flow.

Figure 37:
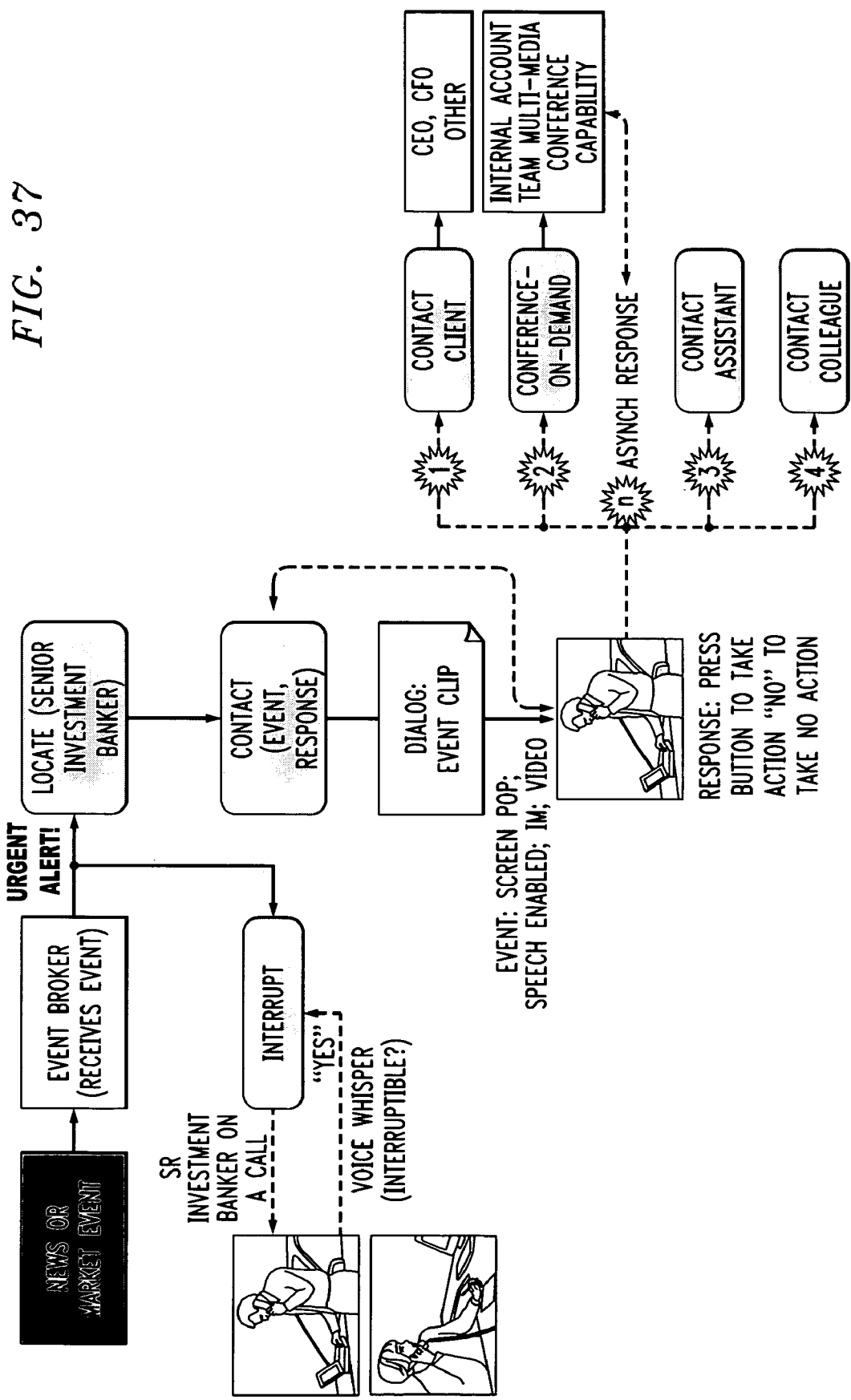

FIG. 37 shows a process flow for an investment banker market alert.

Figure 38:
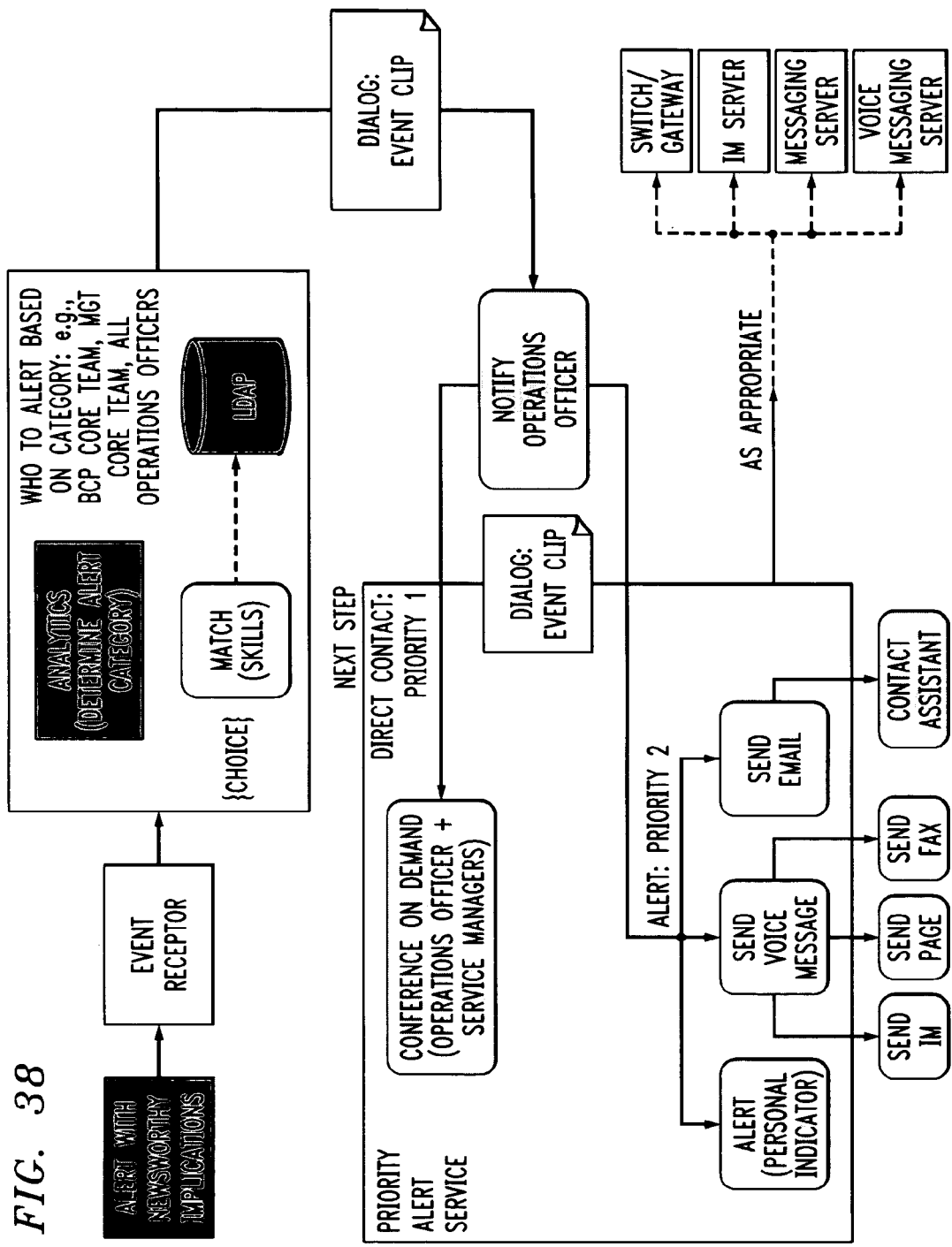

FIG. 38 shows a process flow for a press release, urgent event or disaster.

Figure 39:
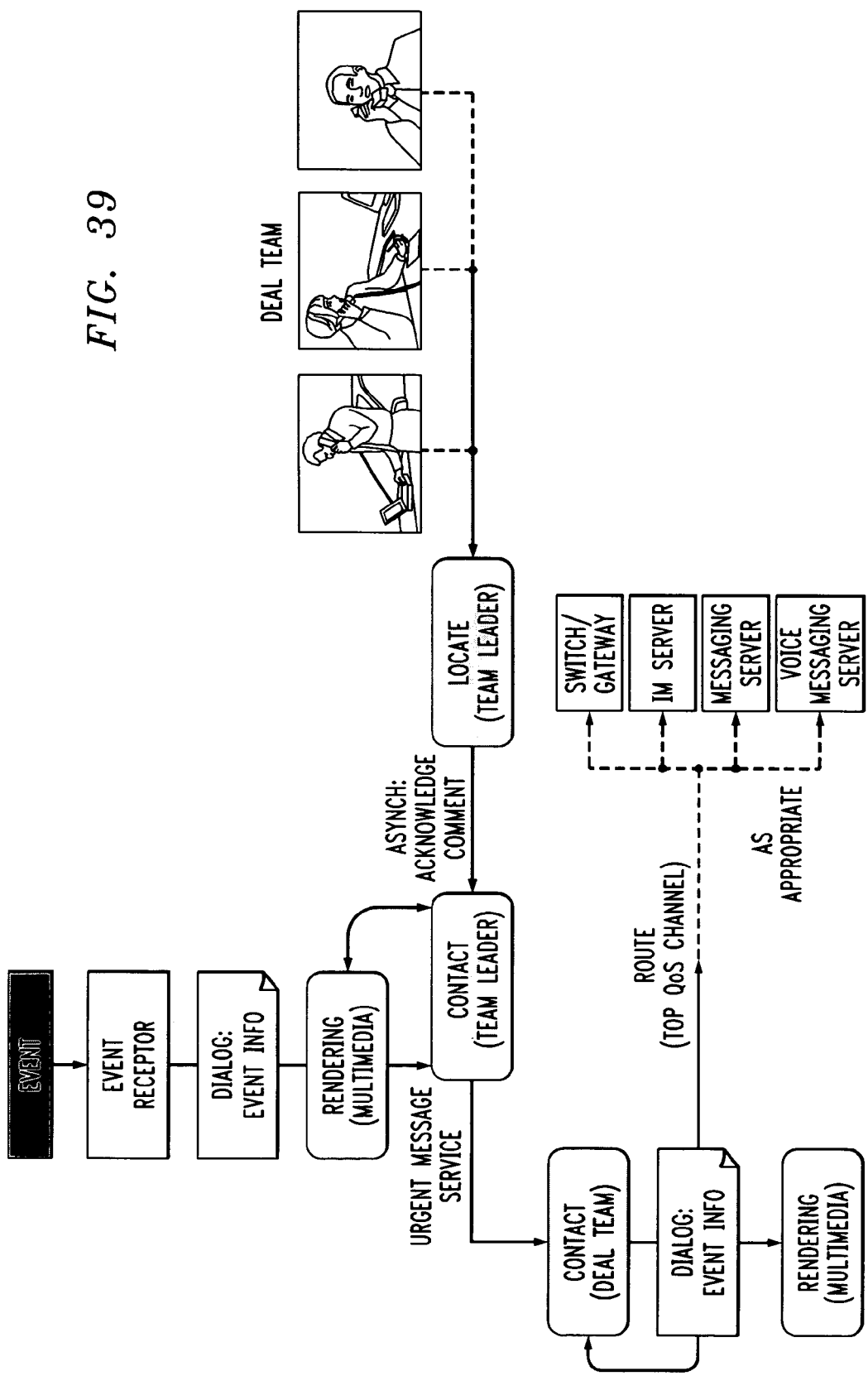

FIG. 39 shows a deal team alert process flow.

Figure 40:
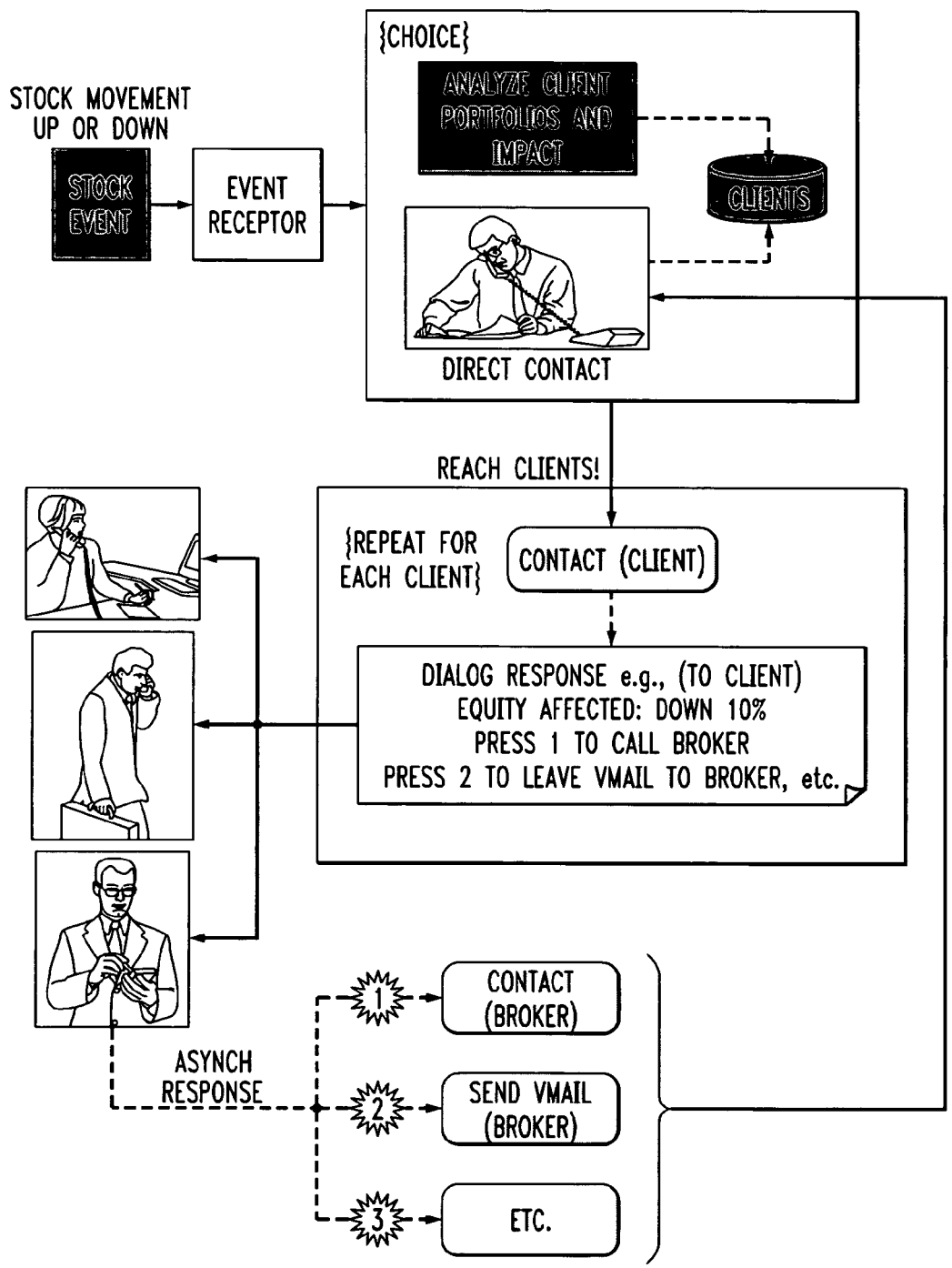

FIG. 40 shows a brokerage alert process flow.

Figure 41:
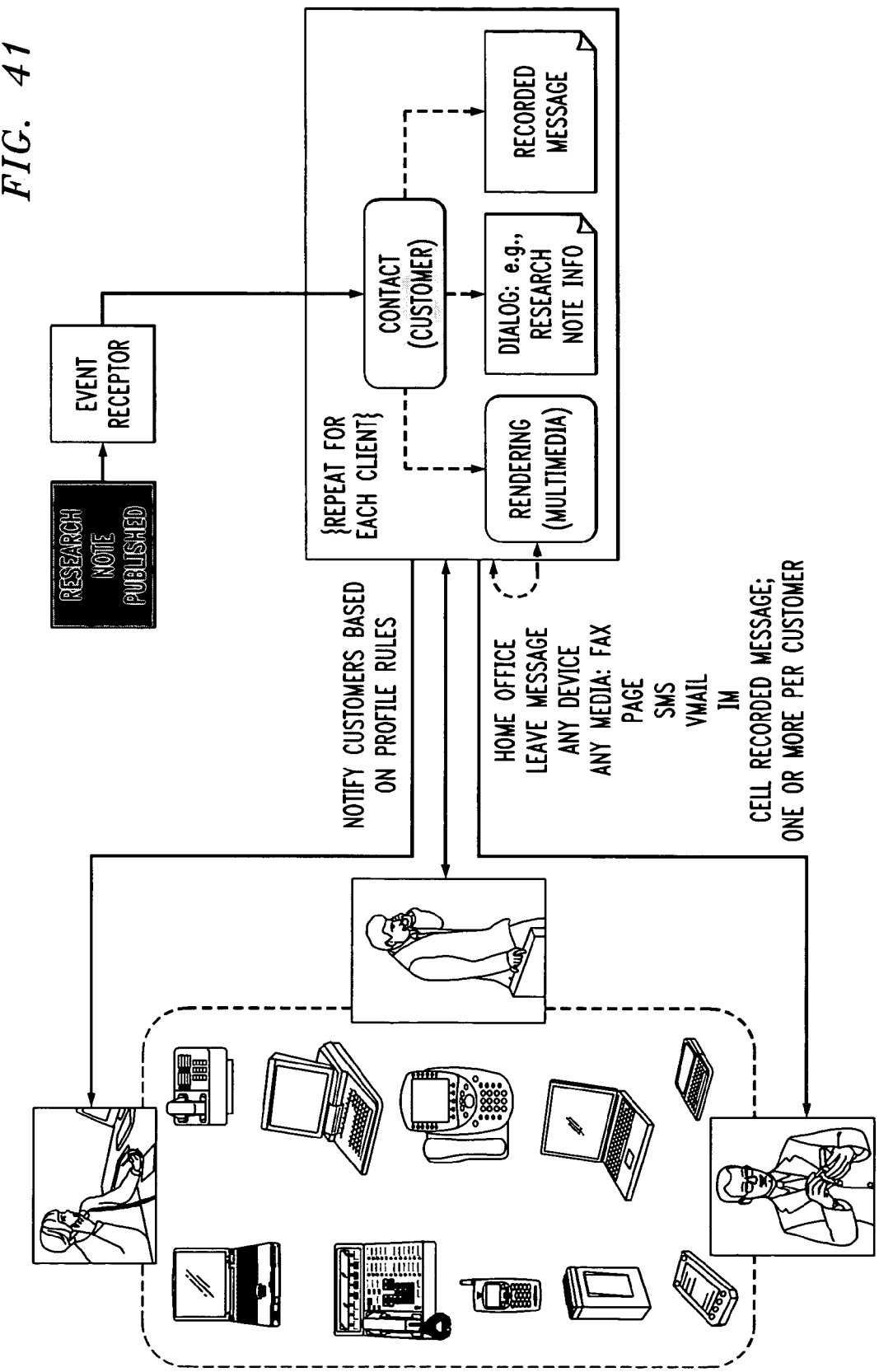

FIG. 41 shows a research alert process flow.

Again, it is to be understood that the particular process flows shown in the illustrative embodiments of FIGS. 11 through 41 are merely examples of the types of process flows that may be provided using the techniques of the present invention.

As noted above, a communications service in accordance with the invention can be configured in a given embodiment to provide one or more of the above-noted functions, features or advantages, but the invention is not required to include any particular arrangement of such elements.

Moreover, as mentioned previously, the invention can be implemented at least in part in the form of one or more software programs storable in a memory or other machine-readable storage medium of a system processing element, and executable by a processor of the system processing element.

The above-described embodiments of the invention are intended to be illustrative only, and numerous alternative embodiments within the scope of the appended claims will be apparent to those skilled in the art.

What is claimed is:

1. An apparatus comprising:
a storage device for storing a software program;
a processor coupled to the storage device;
wherein the processor is operative to execute a composite communications service in response to a request by a requestor, wherein the composite communications service is expressed as a communications services flow comprising a designated sequence of communications services;
wherein the communications services flow comprises a first service for selecting a telecommunications session recipient by consulting a database;
wherein the communications services flow comprises a second service for initiating a telecommunications session between the requestor and the telecommunications session recipient;
wherein the communication services flow comprises a third service that triggers the execution of a fourth service when the second service fails to initiate a telecommunications session with the telecommunications session recipient;
wherein the fourth service transmits a notification to the telecommunications session recipient that indicates that a telecommunications session with the recipient is requested; and
wherein the fourth service receives an asynchronous reply to the notification.

2. The apparatus of claim 1 wherein the communications services flow executes in a first execution environment on a processing element comprising the processor and memory, and a given one of the communications services executes in a second execution environment on another processing element.

3. The apparatus of claim 1 wherein the composite communications service comprises at least one other composite communications service.

4. The apparatus of claim 1 wherein the composite communications service comprises at least one business data service.

5. The apparatus of claim 1 wherein:
the communications services are inserted as generic design elements in a business process software program; and
the generic design elements comprise templates having respective communication functions associated therewith.

6. The apparatus of claim 1 wherein the communications services flow identifies one or more of Alert, Conference on Demand, Escalate, Interaction Monitoring and Recording, Interrupt, Locate, Message, Multichannel Access, Multichannel Inbound, Multichannel Route communications services.

7. The apparatus of claim 1 wherein a given one of the communications services is stored in a processing element that is separate from a processing element which comprises the processor and memory and executes the communications services flow.

8. The apparatus of claim 2 wherein the first and second execution environments are associated with different processing elements.

* * * * *